INVENTOR
GAROLD A. KANE
BY
ATTORNEYS

Sept. 25, 1962   G. A. KANE   3,055,180
CONTROL SYSTEMS
Filed Oct. 22, 1958   24 Sheets-Sheet 2

INVENTOR
GAROLD A. KANE
BY
ATTORNEYS

INVENTOR
GAROLD A. KANE

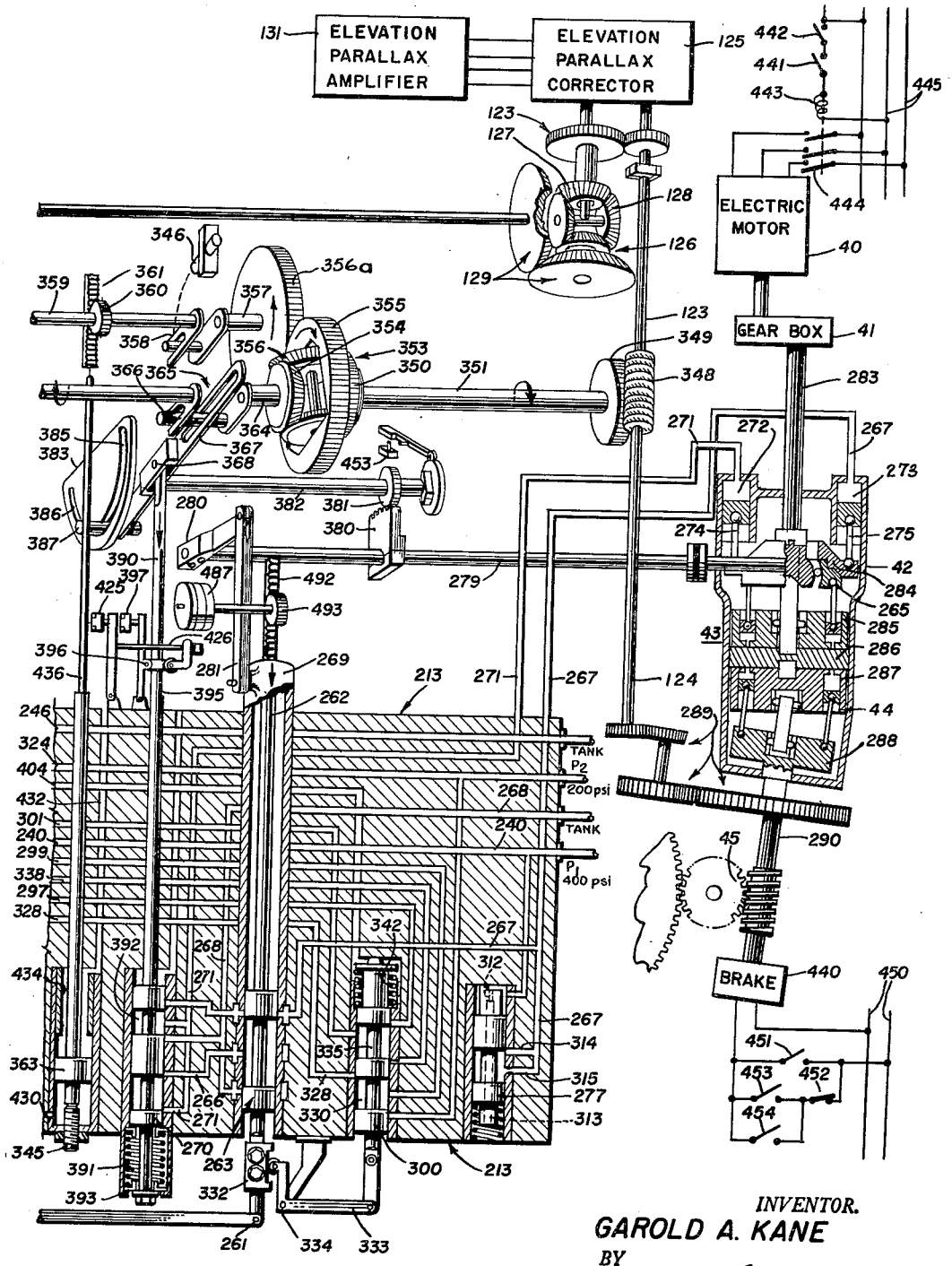

Sept. 25, 1962          G. A. KANE          3,055,180

CONTROL SYSTEMS

Filed Oct. 22, 1958          24 Sheets-Sheet 7

GAROLD A. KANE
INVENTOR.

BY

ATTORNEYS

GAROLD A. KANE
INVENTOR.

Sept. 25, 1962  G. A. KANE  3,055,180
CONTROL SYSTEMS

Filed Oct. 22, 1958  24 Sheets-Sheet 9

INVENTOR
GAROLD A. KANE
BY *G. D. O'Brien*
*Q. Baxter Warner*
ATTORNEYS

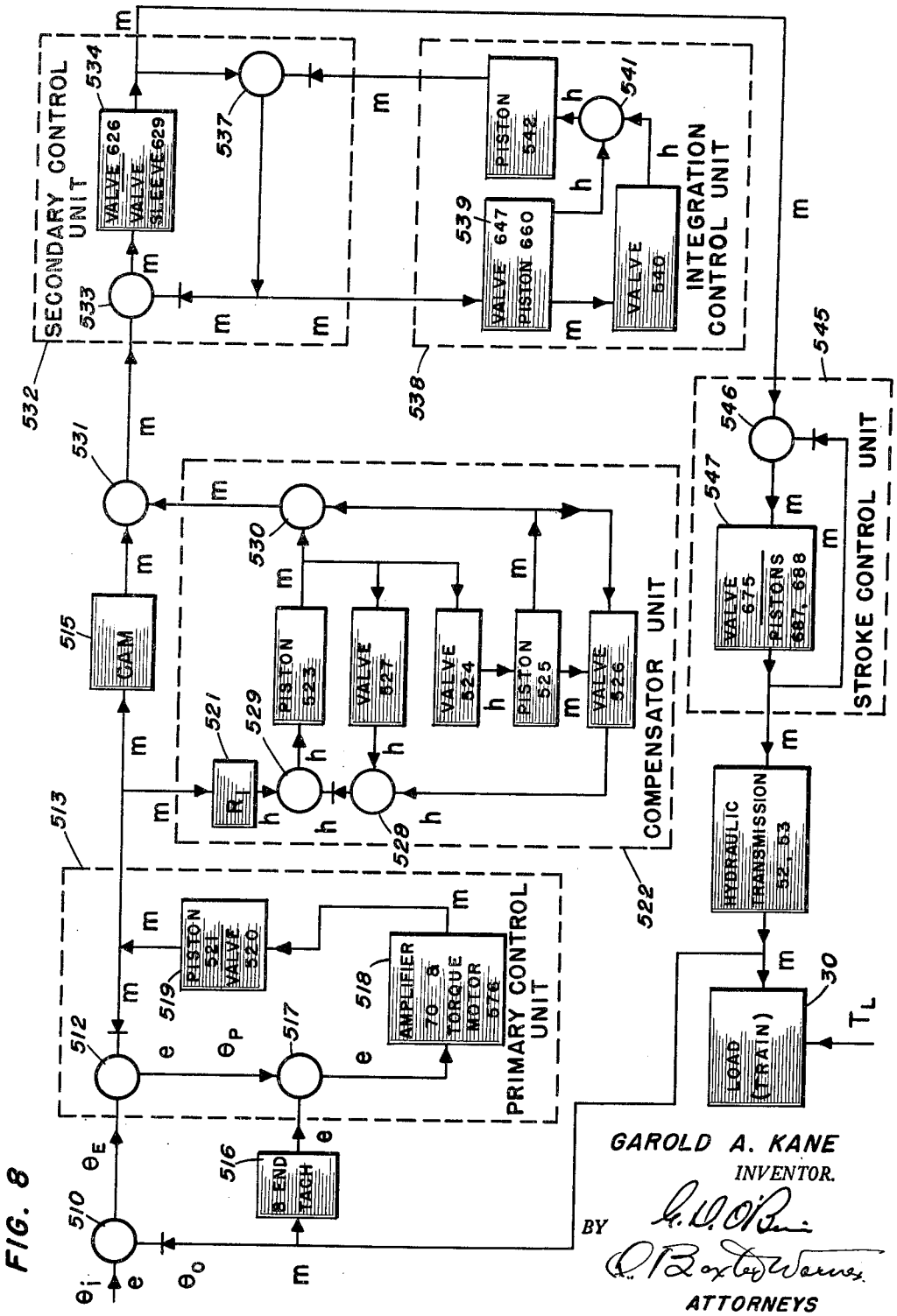

Sept. 25, 1962  G. A. KANE  3,055,180
CONTROL SYSTEMS
Filed Oct. 22, 1958  24 Sheets-Sheet 15

LOG OF FREQUENCY

INVENTOR
GAROLD A. KANE

BY

ATTORNEYS

Sept. 25, 1962 G. A. KANE 3,055,180
CONTROL SYSTEMS
Filed Oct. 22, 1958 24 Sheets-Sheet 16

INVENTOR
GAROLD A. KANE
BY
ATTORNEYS

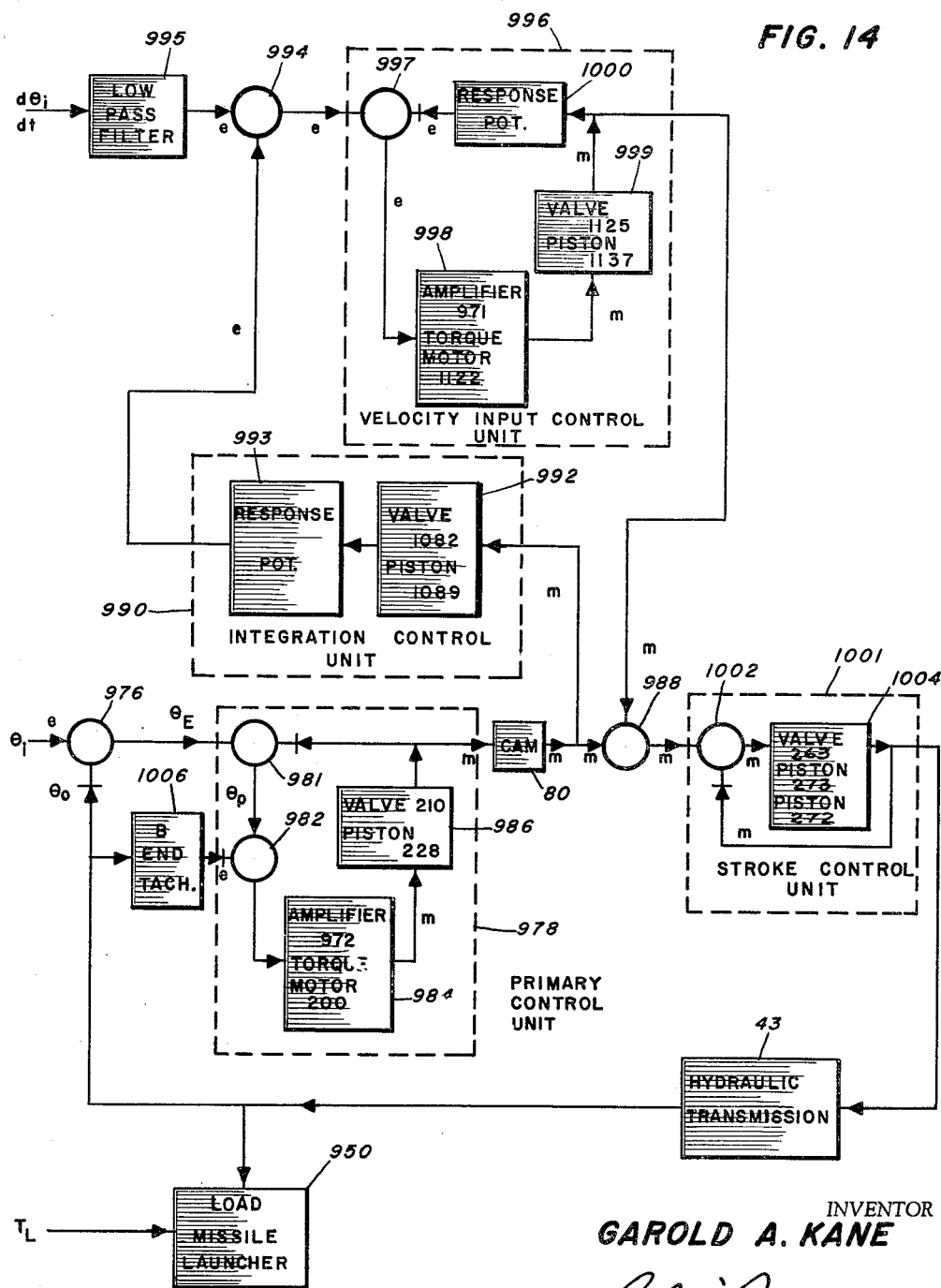

INVENTOR
GAROLD A. KANE

Sept. 25, 1962 G. A. KANE 3,055,180
CONTROL SYSTEMS
Filed Oct. 22, 1958 24 Sheets-Sheet 19

INVENTOR
GAROLD A. KANE
BY
ATTORNEYS

Sept. 25, 1962 G. A. KANE 3,055,180
CONTROL SYSTEMS
Filed Oct. 22, 1958 24 Sheets-Sheet 21

INVENTOR
GAROLD A. KANE

United States Patent Office 3,055,180
Patented Sept. 25, 1962

3,055,180
CONTROL SYSTEMS
Garold A. Kane, Minneapolis, Minn., assignor, by mesne assignments, to the United States of America as represented by the Secretary of the Navy
Filed Oct. 22, 1958, Ser. No. 769,049
27 Claims. (Cl. 60—53)

This invention relates generally to servo control systems and more particularly to servo control systems for driving an object such as a gun mount or a missile launcher in correspondence with a reference input, known commonly as a gun or launcher order signal.

Positional correspondence of naval armament with order signals derived from target-locating devices has effectively been secured in the past by systems of the type disclosed in G. A. Kane Patent No. 2,679,138 issued May 25, 1954. In such systems, an hydraulic transmission transforms a nearly constant speed power of an electric motor to a controlled variable-speed, reversible power for driving the training or elevating gear assemblies of the gun mount. By varying the stroke of a variable stroke hydraulic pump which is incorporated with a constant-stroke hydraulic motor in the transmission, the gun is driven in either train or elevation as a function of the positional disagreement between it and the gun order signal. As the stroke, more specifically, is adjusted at a rate determined by the error and its first derivative, while the output velocity of the mount is directly proportional to the stroke, it results that the output velocity is determined substantially by the error and its first integral with respect to time. In systems of the above type, the open-loop stroke control presents an inherent lag or response delay in its dependence upon an error rate term. Added to this delay are the inaccuracies of an error-rate determination. The simple error, integral-of-error type of control, moreover, does not compensate for imperfections, such as compressibility and leakage of the hydraulic fluid, nor for compliance in the output shaft, especially the output shaft in a high inertia rotatable assembly. In synchronizing to new gun orders, such systems have a response which may be characterized by an exponential curve. Thus, a maximum acceleration of the gun mount is achieved only at an initial instant in consequence of which considerable time elapses before synchronization is achieved. Similarly, exponential deceleration of the mount by limit stop mechanisms and interference eliminating mechanisms require that such mechanisms be set to operate well in advance of a limit or obstruction to secure a timely response of the mount.

Performance characteristics now commonly required of ordnance positional control systems have advanced substantially beyond the practicable capabilities of systems constructed pursuant to the cited patent. For example, a gun mount may now serve as a base for a so-called Gunar target-tracking system and thus will partially determine the position of the Gunar radar antenna. For overall stability of the gun fire control system and mount under conditions of ship's roll, firing disturbances and the like, the positional control system must of necessity meet exacting stability criteria. In addition, target speeds continue to increase to the point where effective gun laying requires optimum control system performance.

Positional control systems are also presently finding application in missile guidance systems for driving missile launchers in train and elevation. Sufficiently accurate correspondence to a radar guidance beam must be secured in order that a launched missile may be "captured" in the beam. For missile launchers, speed of synchronization is particularly essential as the launcher must synchronize to loading position and back to a beam-capture position before ready to launch another missile. In certain instances, a critical frequency exists at which movements of the launcher must be attenuated lest the connection between a missile and the booster by which it is supported on the rails of the launcher should be broken. Further, it has been found that missiles in the course of launching may be "thrown" beyond control of a guidance beam despite a high degree of positional correspondence of the launcher and guidance beam, due to lack of correspondence in their angular velocities. Accordingly, a highly accurate determination of velocity error as well as positional error is necessary to insure beam capture of a launched missile.

An object of the present invention is to provide new and improved servo control systems for driving a load device in accurate correspondence with order signals.

Another object of this invention is to provide such systems having a high performance despite relatively high inertia loads such as are offered by gun mounts, missile launchers and like ordnance.

Another object of the invention is to provide such systems affording a high accuracy in positioning a load despite load disturbances, widely varying order signals, or feedback into a Gunar-type fire control system.

Another object is the provision of a new and improved servo control system in which the departure of an hydraulic transmission from ideal performance are effectively compensated as is compliance in the output shaft.

A further object is to provide a new and improved mechano-hydraulic regulator for a positional control system combining sensitivity with ruggedness and reliability.

Another object is to provide such a regulator whereby highly accurate determinations of time intervals and derivatives may be represented by displacements, such displacements being transmitted substantially free of lags and other distortion.

Still a further object of the invention is to provide a servo control system capable of driving a load with a sustained maximum acceleration during synchronizing operations, a smooth transition to an exponential change of acceleration occurring as synchronization is reached, whereby the load velocity may be altered in a substantially optimum manner.

A further object is the provision of new and improved limit stop and interference eliminating mechanisms for servo control systems by which sustained maximum deceleration of the load may be achieved to minimize the necessary anticipation of limit stops and interference zones.

Yet a further object is the provision of new and improved servo control systems which may be synchronized to new order signals in a minimum time without hunting and more particularly to provide such systems which may serve to synchronize a missile launcher between tracking order signals and load-position order signals.

Another object of the invention is to provide new and improved servo control systems for naval armament by which highly accurate correspondence with order signals is effectively secured in the presence of rolling and pitching of a ship carrying such armament.

Another object of the invention is the provision of servo control systems for training and elevating a missile carried by a launcher with a substantial freedom from movements of a frequency critical to the structural design of the missile in launching position.

Still another object of the invention is the provision of a control system for a missile launcher whereby its positional and velocity errors are accurately compared with tolerable limits for insuring beam capture of a missile after launching.

Yet a further object of the invention is to provide new and improved servo control systems for training and elevating ordnance equipment, characterized by a high order of accuracy, reliability, stability, ruggedness, compactness, safety and adjustability for optimum performance.

These and other objects of the invention are attained, in part, by providing servo control systems of a new and improved design utilizing piston-valve linkages for securing positional correspondence between a load and order signals in a manner which relates load velocity to the positional error as well as to its time integral. A power drive such as a variable stroke hydraulic transmission is employed which affords ready adjustment of output velocity, as by stroking the velocity adjusting element of such transmission. The velocity adjusting element is subject to closed-loop control in accordance with the positional error and at least its first integral, as may be manifested by displacement of a valve element.

The integral is derived from a valve-piston combination wherein provision is made for neutralizing the integration in response to positional or velocity errors in excess of prescribed values. Thus, when synchronizing to a new order signal, output velocity is controlled as a function of positional error but integration of the error is neutralized, whereby synchronization may be accomplished without overshoot or hunting. The function of positional error is, however, non-linear, i.e., of substantially parabolic character to achieve a constant and generally maximum acceleration and deceleration during synchronization. This function is manifested by a cam having rising and falling parabolic contours on either side of a short constant-lead contour. The cam is positioned by a closed-loop control in correspondence with positional errors within limits determined by the stopping distance of the load from its maximum velocity. While for positional errors occurring in normal operation the constant-lead contour provides linear response, under conditions of synchronization the parabolic contour produces a maximum acceleration to full speed followed by maximum deceleration substantially into correspondence with the new order signal. Provision is made for limiting not only acceleration and deceleration but also velocity of the load to prescribed maximum values as may, for example, be necessary to the safety of personnel aboard a gun mount or similar load.

To preclude travel of the load beyond limit stops or into interference zones, limit stop and interference zone mechanisms incorporate a similar function-representing element for achieving constant, maximum decelerations of the load. In the instance of training over an interference zone, provision is also made for controlled upward acceleration to the height of the zone to be cleared and then return to the elevation required by the elevation order signal when the zone is cleared.

As a safeguard, starting of the control system is interlocked with control elements to insure that the system when started will be initially stationary and ready for proper operation.

In one embodiment of the invention, a servo control system is provided which is adapted for driving a gun mount in train and elevation, responsive to gun order signals. Such order signals may be derived alternatively from a selected remote gun director, from a Gunar fire control system, or from a selected local manual control station. In the train regulator or control system are incorporated derivative-taking piston-valve-linkage combinations serving to compensate for leakage flow and compressibility of the hydraulic transmission fluid as well as for compliance in the training gear assembly. While displacements are transmitted by mechanical linkages, hydraulic power amplification is employed to minimize loading back through such linkages.

In another embodiment of the invention there is provided a control system adapted for driving a missile launcher in train and elevation responsive to launcher order signals. Such order signals may be derived alternatively from a selected remote director or a load director. The order signal of the load director serves to bring the launcher into its load position for receiving a missile and an attached booster. From the remote director not only is a positional order signal derived but also a velocity order signal. While the positional order signal is applied to the closed-loop control for adjusting the position of the non-linear cam to reflect any positional disagreement of the load, the velocity order signal is furnished to a velocity input control unit for combination with the first integral of positional error. Introduction of the velocity order signal in this manner serves three purposes, namely, (1) to afford synchronization with dynamic positional order signals, even those representing a substantial velocity, with the same accuracy as may be achieved with a static positional order signal, (2) to reduce substantially the forward gain of the system at the frequency of mechanical resonance for the missile in relation to its booster, and (3) to improve the performance of the system without impairing the high order of system stability, especially for synchronization to and from the load order signal.

In order to inhibit launching of a missile under conditions which are unfavorable to capture in a radiated guidance beam, provision is made for detecting positional and velocity errors of the system with a high degree of accuracy. To this end, a derivative-taking valve-piston-linkage combination is employed for operating a firing cut out switch or similar device.

The invention together with others of its objects and features will be more fully perceived by reference to the following detailed description of representative embodiments thereof, taken in conjunction with the accompanying drawings, in which:

FIGS. 3a, 3b, 3c and 3d are a schematic diagram of the elevation control system;

FIG. 8 is a block diagram of the train control system employed in the gun laying system of FIG. 1;

FIG. 14 is a block diagram of the elevation control system for the missile launcher of FIG. 13;

Figure 1:
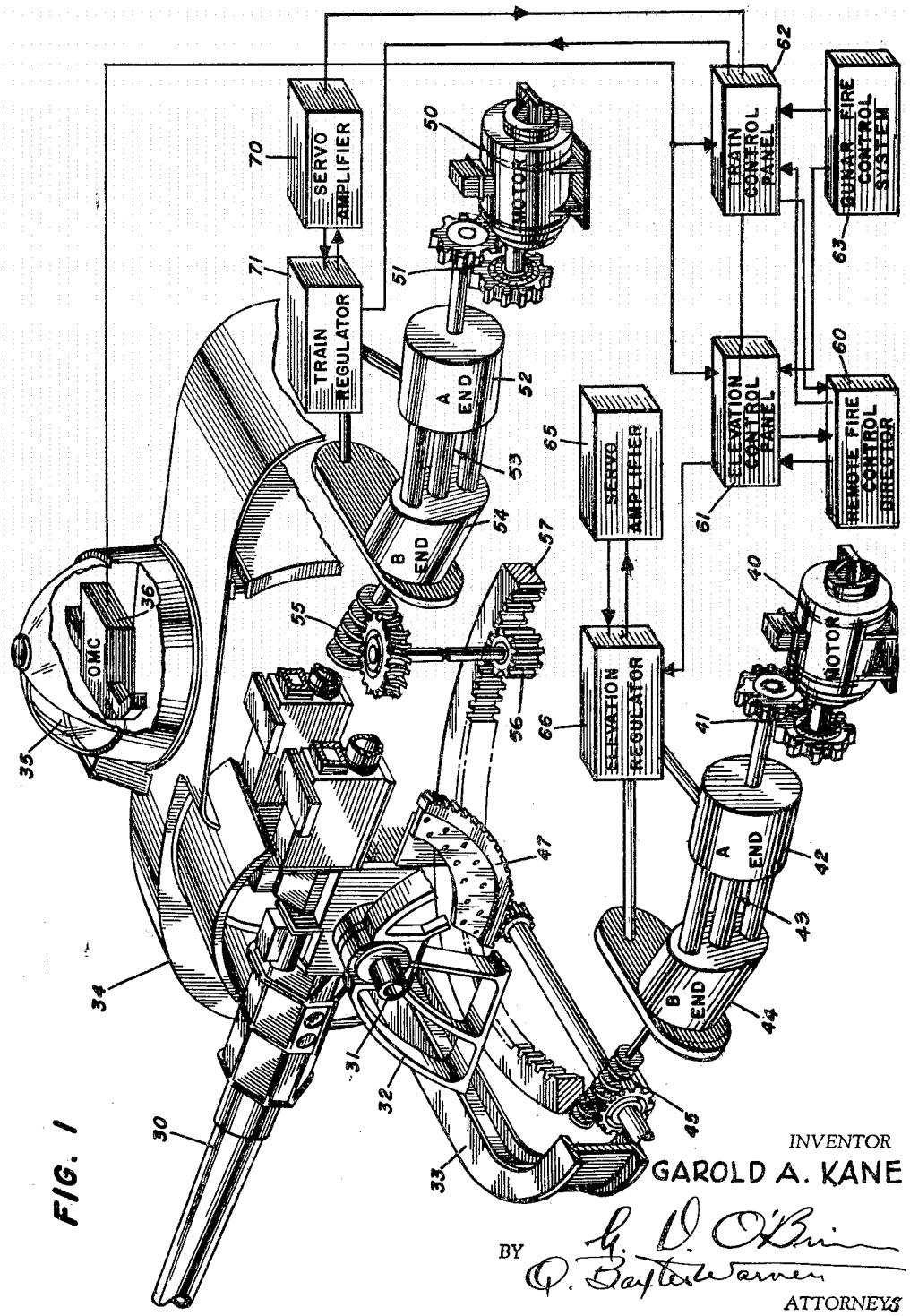
FIG. 1 is a diagrammatic representation of a gun laying system in accordance with the present invention.

While the present invention is directed to control systems, the description of a typical system to be controlled will be helpful to an understanding of the features of the invention and will render more clear the relationship of the various parts. Thus, control systems of the type contemplated in the present invention are particularly adapted for use with relatively heavy ordnance equipment such as a naval gun 30 shown in FIG. 1. Gun 30 is mounted on trunnions 31 for elevating or depressing, trunnion supports 32 being mounted on a base ring 33 which is rotatable relative to a supporting structure, such as a ship, for left and right training of the gun 30. The base ring 33 also serves to support a gun house 34 which accommodates one or more gunners in local control stations, such as the right local control or one-man-control (OMC) station 35. In this control station 35, a manually operated OMC unit 36 is provided, which is the subject of a more detailed description hereafter.

Characteristically, the rotary inertia of the gun 30 about its trunnion axis is substantially less than the rotary inertia of the gun together with the gun house about the vertical axis for rotation in training. Thus, where similar power means are employed in the elevation and training drives, the elevation power means is lighter and may require a less complicated controller or regulator. While the operation of the respective power drives under normal conditions is essentially independent, their operation is closely interrelated under such conditions as in encountering an interference zone necessitated by the presence of obstacles in the line of fire.

The elevation drive means comprises motor 40, such as a substantially constant speed electric motor of the squirrel-cage induction type, coupled through gear reducer 41 to the so-called A-end 42 of reversible, variable-speed hydraulic transmission 43. The A-end 42, as well as the so-called B-end 44 in fluid connection with it are further described hereafter, their characteristics being well known in the art. It may be observed, however, that the A-end 42 is an hydraulic, variable-stroke, axial, parallel piston pump, while the B-end 44 is an hydraulic fixed-stroke, axial parallel piston motor. The pumping rate of the A-end 42 is governed by the variable position of a tilt plate. The B-end drive shaft is in driving connection through worm 45 with a so-called elevating arc 47 co-rotatably secured to the gun 30.

Correspondingly, the train power drive comprises an electric motor 50, which may be a larger version of electric motor 40, a gear reducer 51 for coupling the motor to A-end 52 of the train hydraulic transmission 53, B-end 54 of the hydraulic transmission, and a suitable gear connection to the base ring 33. This gear connection may comprise, for example, a worm 55 in driving connection with the B-end drive shaft and coupled through a training pinion 56 to a training circle 57. The training circle 57 is secured to the fixed support such as the framework of a ship, while the train drive means, as well as the elevation drive means, is effectively supported on the base ring 33 for rotation relative to the training circle 57.

To provide train and elevation gun orders to direct the aiming of gun 30, one or more remote fire control directors 60 are provided which are usually associated with radar target-seeking equipment including an antenna (not shown) substantially displaced by a fixed distance from the gun 30. The elevation order signal drive from director 60 is supplied to an elevation control panel 61 and the training order signal is similarly supplied to a train control panel 62. The elevation and train control panels 61, 62 are likewise supplied with elevation and train order signals, respectively, from the one-man-control unit 36. In addition, elevation and train order signals derived from a so-called Gunar fire control system 63 are supplied to the respective panels 61, 62. It will be understood that a Gunar fire control system 63 incorporates a target-seeking radar antenna mounted on the gun housing 34 as well as computing apparatus for ballistic corrections.

The panels 61, 62 serve not only for selection of a single set of elevation and train gun orders but also incorporate starting and stopping controls and safety controls, certain of which are more completely described below. Interconnection is provided between the panels 61, 62, which, for the purposes of the present invention, may be considered restricted to circuitry for the interference zone mechanism.

The selected elevation order signal is supplied to the regulator 66 where the order signal is compared with the elevation response and the difference signal is supplied to the elevation servo amplifier 65. Both the amplifier 65 and regulator 66 are described in detail hereafter, together with the interconnections of the regulator 66 with the A-end 42 and B-end 44 whereby the velocity or speed and direction of gun elevation is controlled.

Similarly, the train order signal is supplied from the train control panel 62 to the train regulator 71 where the signal is compared with the train response and the difference signal is supplied to the train servo amplifier 70. The description of these portions of the train controller is placed subsequent to a description of the components in the elevation controller, as the elevation controller is simpler and more readily understood. Like the elevation regulator 66, the train regulator 71, is coupled to the A-end and B-end of the hydraulic transmission to control the driving velocity and direction, in this instance, the training of the gun 30.

Figure 2:
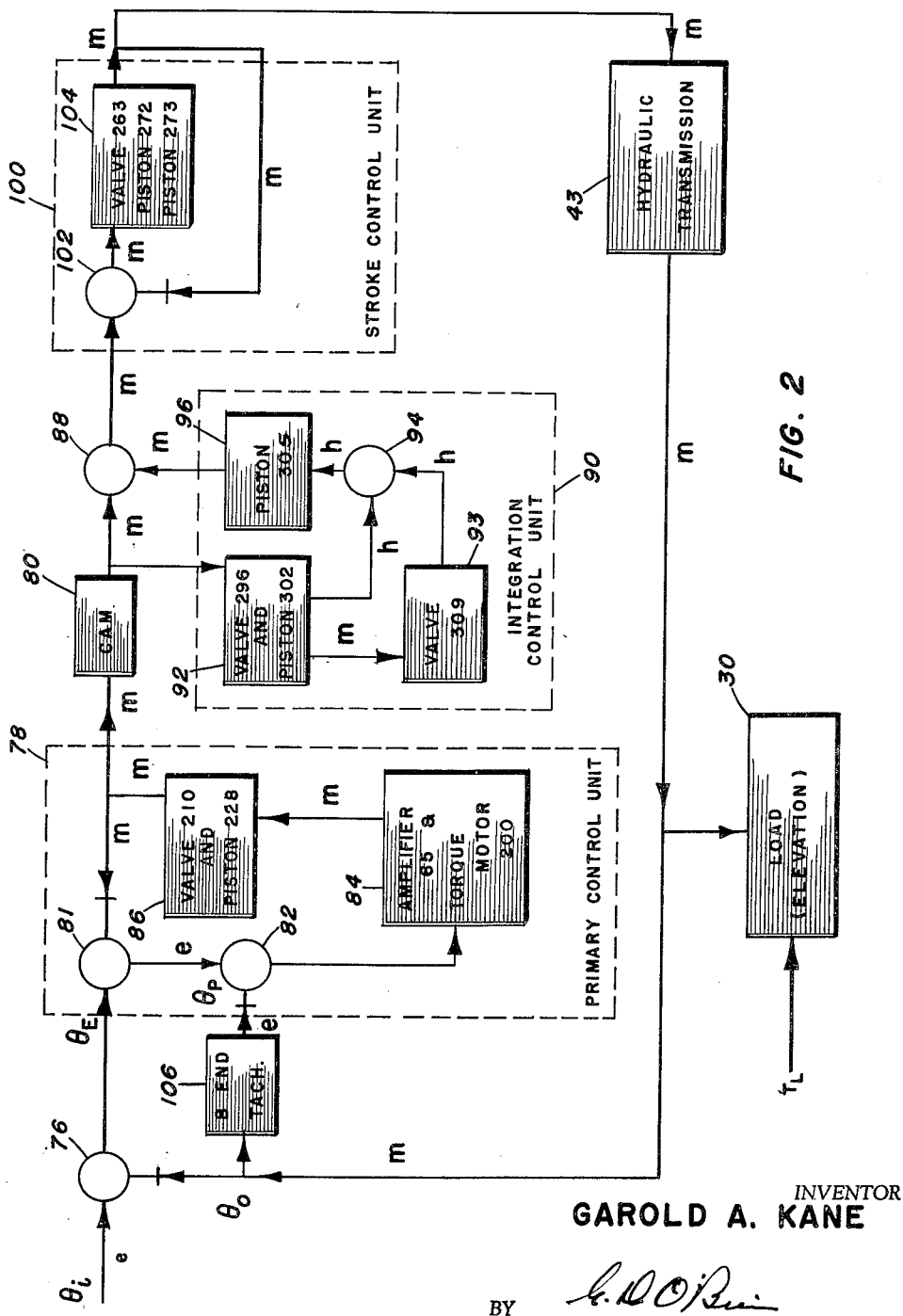
FIG. 2 is a block diagram of the elevation control system employed in the gun laying system of FIG. 1.

Referring now to FIG. 2, the elevation control system is shown in block diagram form for normal operating conditions of full compensation. The input elevation order signal $\theta_i$ is compared in differencing means 76 with a signal $\theta_o$ representing output position of the gun mount, in this case, the elevation of the gun 30. Whereas the input signal $\theta_i$ represents the desired elevation of the gun 30, the output $\theta_o$ represents the actual elevation position. Accordingly, there is derived from the differencing means 76 an error signal $\theta_E$. The direction of information flow associated with the signals is represented by arrows, the barred arrow for the output signal $\theta_o$ signifying that the negative of its value is combined with the input signal $\theta_i$ to obtain the error signal $\theta_E$. There are also employed the letters $e$, $m$ and $h$ serving to identify the associated signal as electric, mechanical or hydraulic, respectively. Thus, the input signal $\theta_i$ is in electrical form and the output signal $\theta_o$ in mechanical form. The error signal $\theta_E$ is manifested by the flux axis of a magnetic field, this magnetic field being generated by the electric signal $\theta_i$ and angularly displaced by the mechanical signal $\theta_o$. It will be understood that the character of the signals is identified merely to facilitate an understanding of the exemplary embodiments of the invention and not in limitation of its principles.

Responsive to the error signal $\theta_E$ is a primary control unit 78 which serves to position a cam 80 in accurate correspondence to the error signal. Accuracy is ensured by the use of a closed servo loop in the primary control unit responsive to the difference between the system error signal $\theta_E$ and the mechanical position of the cam 80. This difference is developed by error measuring or differencing means 81 which serves to convert the mechanical inputs into an electrical output signal $\theta_D$. This signal $\theta_D$ is coupled through differencing means 82 and to a servo amplifier and torque motor, designated generally 84. In a manner developed more fully hereafter, the amplifier serves to energize the torque motor for actuating a valve 210 and piston 228 assemblage 86 by a mechanical effort. Through amplification afforded by the amplifier and the hydraulic interrelation of the valve and piston assemblage 86, a mechanical positioning of the cam 80 is effected, as well as actuation of the differencing means 81.

Within the limits of operation for which the block diagram of FIG. 2 is representative, the cam 80 provides a mechanical displacement linearly related to the system error signal $\theta_E$, applying this displacement to summing means 88 as well as to an integrating control unit 90. The integrating control unit 90 serves to introduce integral compensation to the system error signal derived from cam 80, and to this end develops a mechanical displacement corresponding to substantially the weighted sum of the first and second integrals of the system error $\theta_E$ (such error being represented by the mechanical position of cam 80). More particularly, cam 80 actuates a valve and piston assemblage 92, displacing the valve mechanically to control oil flow to the piston and displace the same in accordance with the first integral of $\theta_E$. Movement of the piston in assemblage 92 is hydraulically transmitted through summing unit 94 to piston 96 to render a component of its displacement proportional to the first integral of $\theta_E$.

While this hydraulic output of assemblage 92 corresponds with the first integral of the system error signal $\theta_E$, the position of the piston in assemblage 92 is mechanically transmitted to valve 93, displacing the same correspondingly at the first integral of $\theta_E$. Valve 93 controls an additional flow of oil to piston 96 to displace it by a further component which then represents the second time integral of $\theta_E$. The final displacement of piston 96 by the hydraulic signals representing the first and second integrals of error is, therefore, a linear summation of the first and second integrals. By a mechanical transmission of the displacement of piston 96 and of cam 80 to summing means 88, a linear combination of the error signal $\theta_E$ and its first and second integrals is manifested.

There is derived from the summing means 88 a mechanical displacement manifesting this combination signal. Such signal is converted by a stroke control unit 100 into a positional control effort applied to the stroke mechanism of the A-end 42 of the hydraulic transmission 43. It is a notable feature of this invention that the A-end of the hydraulic transmission 43 has its stroke determined accurately by the closed servo loop of the stroke control unit 100, thereby to directly determine the velocity imparted to the load by the hydraulic transmission. Such accurate control of the A-end stroking is achieved with a servo control loop in the stroke control unit 100 by which the position of the tilting plate or other stroke control element is compared and brought into correspondence with the mechanical signal derived from summing means 88.

The comparison is accomplished in differencing means 102 to which is applied both the mechanical signal derived from summing means 88 and a mechanical signal representing the position of the A-end tilting plate. In mechanical form, the difference between the output of summing means 88 and the position of the tilting plate is applied to a valve and piston assemblage 104. The output of this assemblage 104 is a mechanical effort directly coupled to the A-end tilting plate of the hydraulic transmission 43 to determine its position. Thus, the velocity output of the hydraulic transmission 43 is determined in accordance with a linear summation of the mechanical signal derived from cam 80, the first integral of this signal and the second integral of this signal. The addition of the integral compensation will be shown hereafter to have a very beneficial effect upon the accuracy of the system. The mechanical effort derived from the B-end of the hydraulic transmission 43 includes, in addition the torque applied to the load (gun 30 in elevation), a mechanical signal which, with a parallax correction (which may be disregarded for the present), is the output signal $\theta_0$. For improved accuracy, this output signal $\theta_0$ energizes a B-end tachometer 106 to generate a signal representing the angular velocity of the gun in elevation. This generated electrical signal is applied to the differencing means 82 of the primary control unit 78 to modify the electrical signal in the amplifier of unit 84.

In addition to the control effort applied to the load by the hydraulic transmission 43, a torque $T_L$ is experienced by the load arising from windage, friction, firing torque, and other environmental effects which may be encountered, for example, in a ship-board installation. The torque $T_L$ constitutes a disturbance applied to the system which affects both system performance and stability. As will be apparent from the description of the system which follows, the disturbing effects occasioned by the torque $T_L$ are readily overcome while a highly accurate correspondence of the gun elevation angle to the input signal $\theta_1$ is dynamically maintained.

*Elevation Primary Control Unit*

Referring now to FIGS. 3a, 3b, 3c and 3d, there is shown in detailed schematic form the gun elevation control system in which features of the present invention are incorporated. Exemplifying a source of gun order signals for this elevation control system are the remote fire control director 60 (FIG. 3b) and means 110 for converting the mechanical output of the director 60 to electrical signals representing coarse and fine manifestations of the gun order signal. Switch 111, which is incorporated in the elevation control panel 61, provides a means for selectively applying these fine and coarse manifestations of the gun order signal to the elevation control system.

The signal converting means 110 comprises, more particularly, a 1-speed (1X) synchro transmitter 112 and a 36-speed (36X) synchro transmitter 113 mechanically coupled to shaft 114 of the director 60, respectively, by 36:1 worm and worm wheel 115 and 1:1 pinion gears 115a, both of which are driven by output shaft 114. The rotors of synchros 112, 113 are thus rotated in a 1:36 ratio to represent coarse and fine versions of the gun order angle developed by the remote fire control director 60, the coarse version being designated $\theta_1$. By energizing the rotors from an electrical source such as a synchro supply line 116, potentials are induced in the output lines 117, 118 connecting with the 3-phase stator windings, respectively, of the synchro transmitters 112 and 113. When the switch 111 is closed, these induced potentials are applied to the stator windings of corresponding 1-speed and 36-speed synchro receivers 120, 121 to provide an electrical input signal $\theta_1$ to the elevation control system.

The synchro receivers 120 and 121 together comprise the differencing unit 76 (FIG. 2) in one aspect and the differencing unit 81 in another aspect. To this end, the stators of receivers 120, 121 are rotably mounted for mechanical displacement in accordance with the displacement of the B-end 44 (FIG. 3d). Mechanical driving connection between the B-end 44 and the stators of synchro receivers 120, 121 (FIG. 3b) is afforded by a gear train 123 (FIG. 3c) including a shaft 124 in driving connection between the B-end 44 and an elevation parallax corrector 125. Gear train 123 further comprises a planetary transmission 126 including a sun gear 127 in direct driving connection with shaft 124 and spider gears 128 driven by the output of the elevation parallax corrector 125. In linear correspondence with rotation of the B-end output shaft (ignoring any parallax), output gear 129 of the planetary transmission 126 drives the stator of 1X synchro receiver 120 relative to the stator of 36X synchro receiver 121 in 1:36 ratio through a speed reducer 130 similar to the speed reducer 115. The elevation parallax corrector 125 and its associated elevation parallax amplifier 131, which serve to introduce a parallax correction through the planetary transmission 126, are in themselves conventional in design and their details of construction are not necessary to an understanding of this invention. For ease of comprehension, the parallax correction will be ignored and the rotational displacement of the stators will be considered to correspond simply with the gun elevation response as determined by the rotation of the B-end output shaft.

In accordance with the well known characteristics of synchro receivers, the angular position of the transmitter rotor determines the angular position of the magnetic field axis in the synchro receiver relative to the stator windings when such windings are energized. By angularly displacing the stator windings mechanically in accordance with the B-end response, the net displacement of the magnetic field in the synchro receiver relative to the rotor zero position represents the system error $\theta_E$, that is, the difference between the input signal $\theta_i$ and the output signal $\theta_o$. However, while the position of the magnetic field in a fixed frame of reference represents the system error, provision is made for rotating the rotor of each synchro receiver 120, 121 whereby the amplitude of the potential induced in the rotor actually depends upon the difference between the system error represented by the orientation of the magnetic field and a mechanical feedback developed in the primary control unit 78 and represented by the rotor displacement. The manner in which this mechanical feedback is derived will be better understood as the primary control unit 78 is more fully described.

*Elevation Primary Control Unit 78*

The function of the primary control unit 78, as has been pointed out in connection with FIG. 2, is to translate the system error signal $\theta_E$ represented by the magnetic field orientation in the synchro receivers accurately into a mechanical displacement of the cam 80. The participation of the synchro receivers 120, 121 (FIG. 3b) in the primary control unit lies in the development of a cam positioning signal $\theta_p$ responsive both to the magnetic field orientation and to mechanical feedback in the form of synchro rotor displacement. Coarse and fine versions of this cam positioning signal $\theta_p$ are induced in lines 134 and 135 connecting with the rotors of synchro receivers 120, 121, respectively.

By means of these lines 134, 135, the signal $\theta_p$ representing the error in positioning of cam 80 is supplied to the input of an elevation servo amplifier 65 (FIG. 3a) and more particularly to a synchro changeover circuit 138 at the input of the amplifier 65. The line 134 from the 1-speed synchro receiver 120 connects across potential divider resistors 139, 140. The signal developed across resistor 140 is applied to the control grid of an amplifying device 141 of the triode type with reference to ground, cathode resistor 142 serving to afford a D.C. bias. The amplified output signal of the triode 141 is coupled through potential divider capacitors 143, 144 to the control grid of a similar triode 145. The output of the triode 141 is also coupled via blocking capacitor 146, potentiometer 147 and resistor 148 to one pole 149 of a double throw relay 150. Setting of the potentiometer 147 effectively determines the amplification gain of the 1X synchro signal when the same is selectively coupled by the relay to the remainder of the amplifier. In the grid-cathode circuit of triode 145, parallel connected diode 152 and resistor 153 form a clamp circuit developing a sufficient D.C. charge on capacitor 144 to clamp the negative-going peaks of the A.C. signal on the control grid to ground potential. The control grid signal is also biased by the potential developed across variable cathode resistor 154 which, with resistor 155, is effectively a potential divider across the B+ supply adjustable to prevent actuation of the relay 150 in the absence of a signal on the control grid of triode 145. In a typical adjustment, a positive signal on the grid of triode 145 in the presence of an error $\theta_p$ exceeding 2½° causes sufficient plate current to flow to energize the relay 150. Upon energization, contact is made with the pole 149 to apply the 1X synchro signal to the control grid of an A.C. amplifier 158.

Figure 3A:
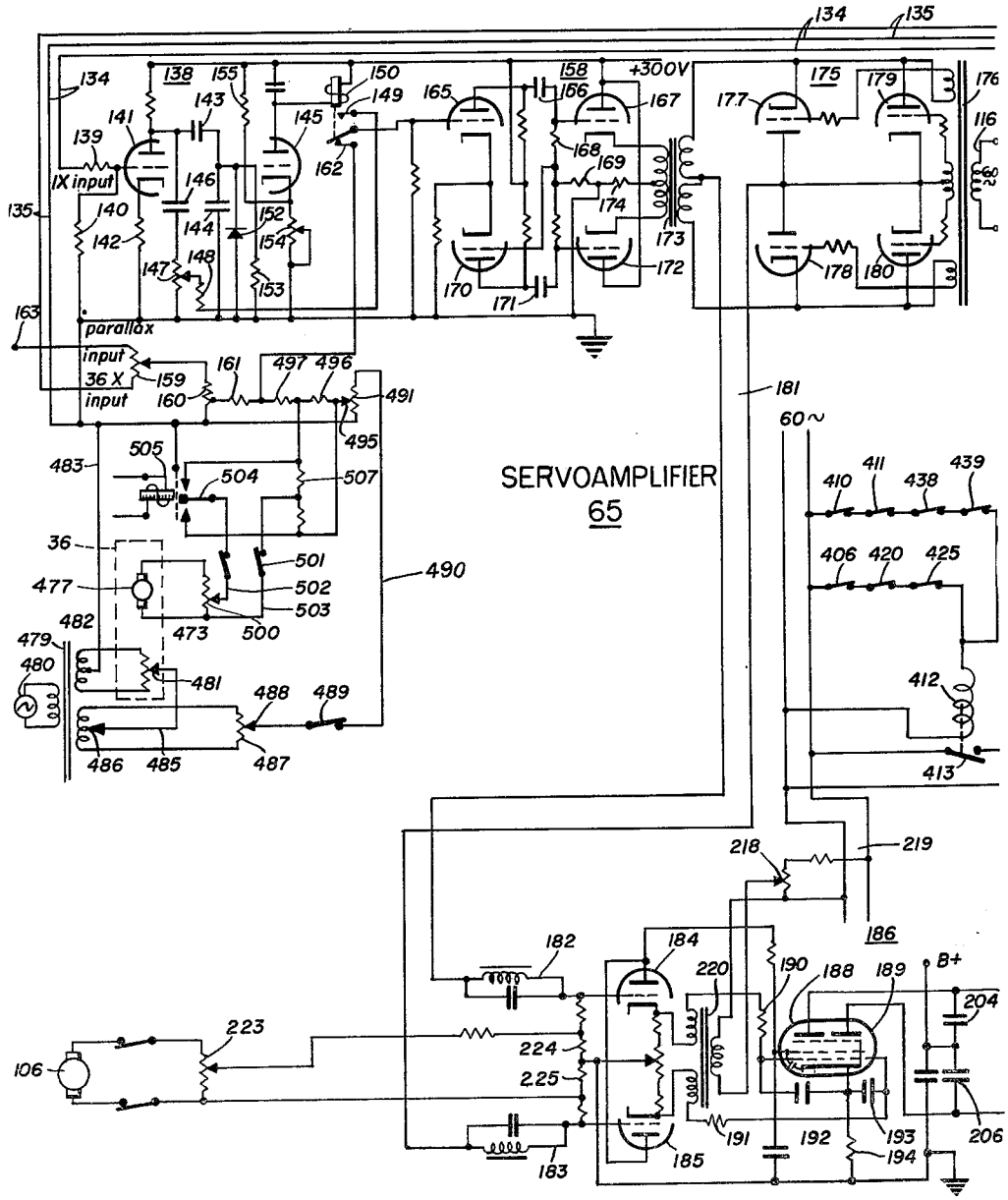

Such an error as 2½° will, in the usual practice of the invention, occur only during synchronization between one input gun order signal and another. Under normal, non-synchronizing conditions, therefore, the relay 150 serves to couple the 36X synchro signal to the A.C. amplifier 158. This 36X synchro signal is derived from an input network connected by line 135 to the output of 36X synchro receiver 121. The potential developed in the rotor of the 36X synchro receiver is applied through gain adjusting potentiometers 159, 160 and potential divider resistor 161 to pole 162 of relay 150, which is contacted in the de-energized state of the relay. It may be observed that the potentiometer 159 has connection as well to an input terminal 163 for adjustment of the gain of an elevation parallax error signal applied to this terminal 163 and derived from the elevation parallax amplifier 131 (FIG. 3d). Potentiometer 160, on the other hand, serves for adjustment of the gain of the 36X synchro signal. Other portions of the input network (FIG. 3a) relate to the one-man-control signal input and will be described hereafter.

Considering now the A.C. amplifier 158, the signal derived from the relay 150 with reference to ground is amplified and converted to a push-pull balanced output. Thus, the signal at the movable contact of relay 150 is applied to the control grid of triode 165 to develop an amplified signal which is coupled by capacitor 166 to the control grid of triode 167. In inverted relation, the signal is also coupled by potential divider resistors 168, 169 to the triode 170 to drive the same in phase inverting relation to the triode 165. The output of triode 170 is thus in phase opposition to the output of triode 165 and is coupled via capacitor 171 to the control grid of triode 172. The push-pull triodes 167, 172 are connected in balanced, cathode-driving relation to the primary winding of transformer 173, the primary winding having a midtap connection through cathode resistor 174 to ground.

Figure 3B:
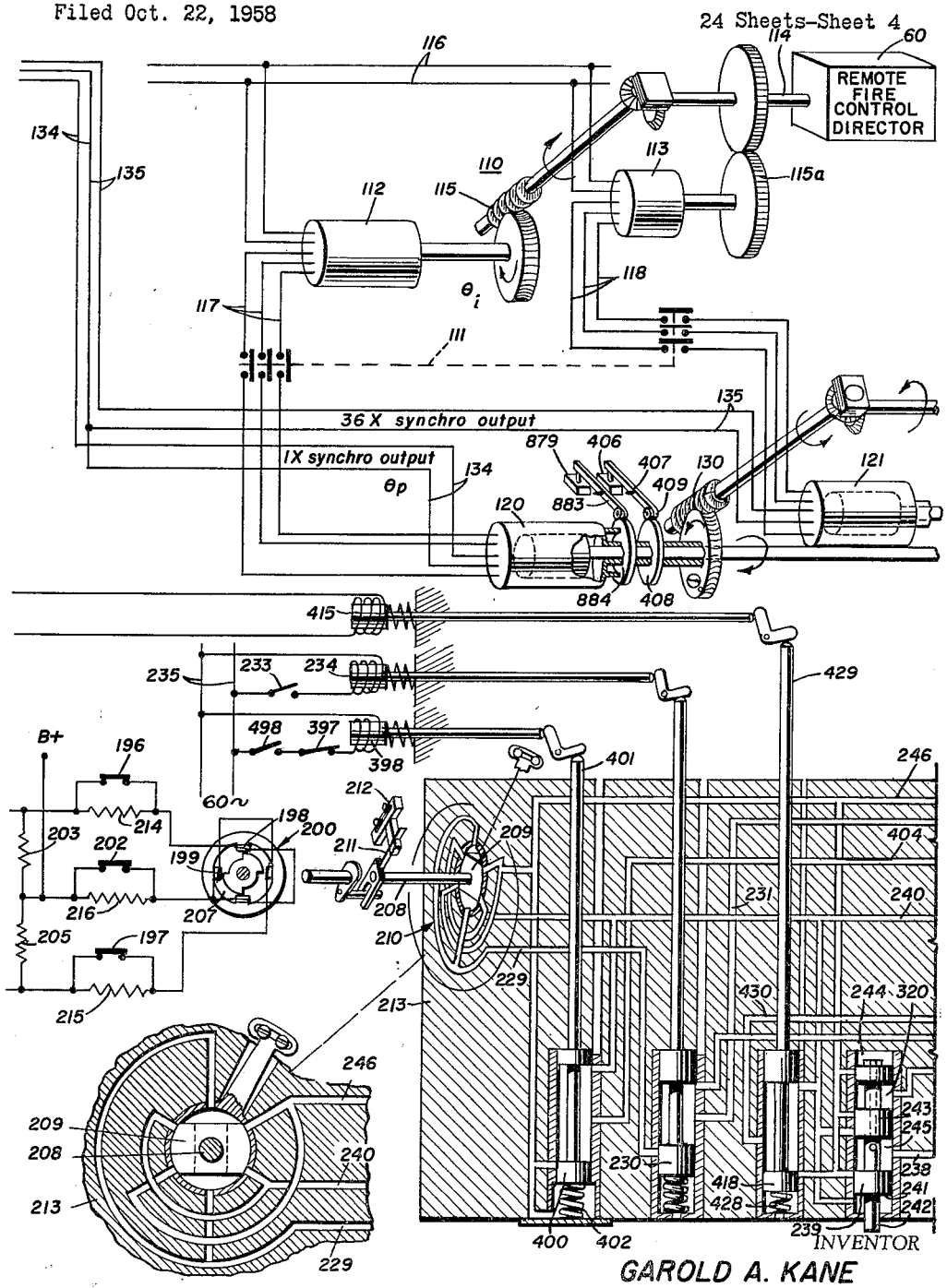

The secondary winding of transformer 173 is connected in balanced driving relation to a demodulator 175. In order that the demodulator 175 may provide a D.C. version of the A.C. signal derived from the A.C. amplifier 158, the demodulator 175 is supplied with a reference input signal, such as a 60 cycle timing wave from supply 116, which is coupled by transformer 176 to the grid-cathode circuits of triodes, 177, 178 and 179, 180. Such triodes are connected in reversely poled, balanced relation with respect to the secondary winding terminals of transformer 173. A balanced D.C. output is thus obtained on output line 181, in an evident manner, which is smoothed in filters 182, 183 for application to the respective control grids of input triodes 184, 185 in D.C. amplifier 186. These tubes 184, 185 serve as a balanced, cathode-driving stage for driving pentodes 188, 189 of a power amplification stage. To this end, the cathodes of the respective triodes 184, 185 are connected through resistors 190, 191 to the control grids of the respective pentodes 188, 189, capacitors 192, 193 serving to bypass high frequency signals to ground through cathode bias resistor 194. The output of the pentodes 188, 189 are coupled through first and second relay contacts 196, 197 to respective sets of transverse windings 198, 199 of a torque generator 200 (FIG. 3b). These windings 198, 199 are connected in common through relay contacts 202 to a positive voltage supply terminal B+. Paralleled resistor 203 and capacitor 204 connected across the output of pentode 188 and paralleled resistor 205 and capacitor 206 across the output of pentode 189 serve as filters to prevent sudden changes in the current supplied to the torque generator 200.

When the pentode 188 is conducting, current is supplied to windings 198 to aline rotor 207 with the poles of the torque generator upon which windings 198 are wound. Similarly, when pentode 189 is conducting, current is supplied to windings 199 to aline the rotor 207 with the other poles. The amount of current, and hence the torque applied to the rotor, is dependent upon the signal applied to the control grids of the pentodes 188, 189.

The rotor 207 of torque generator 200 is mechanically connected by shaft 208 to the rotor 209 of rotary valve 210. This rotary valve 210 forms a portion of the valve and piston assemblage 86 (FIG. 2) of the primary control unit 78. In order that angular displacement of the rotor may be in linear proportion to the output of the servo amplifier and hence to its input, a bias spring 211 is secured at one end to the shaft 208 and at the other end to an adjustably positioned clamp 212. The clamp 212 is adjusted so that the valve rotor will be in neutral position when no current is flowing in the windings 198 and 199. To protect the windings 198, 199 against excessive currents such as might occur during synchronization, resistors 214, 215, and 216 are connected to bypass the respective relay contacts 196, 197, and 202 when such are opened by conditions giving rise to excessive signals. It may be observed that the rotary valve 210 directly influences the operation of the remainder of the hydraulic system.

The hydraulic system is largely disposed within a valve block 213 having recesses for receiving spool type valves as well as rotary valve 210. The lands of these valves may be line-to-line, underlapped or overlapped in relation to the ports which are controlled, the ports of the spool valves being in the form of rectangular slots so that the flow is proportional to the amount of underlap for a given pressure differential. To prevent valves of the system from sticking or exhibiting excess hysteresis, a dither signal is supplied by variable attenuator 218 from A.C. supply line 219 to the primary of transformer 220, the secondary windings of which are connected in the respective output circuits of cathode followers 184 and 185. By suitably adjusting the amplitude of the dither signal, the valves may be oscillated at a high rate but through a small amplitude without affecting the positioning of the load, the standard 60 cycle frequency being suitable for a gun positioning system.

There is also introduced into the servo amplifier 65 and ahead of the torque generator 200 an error signal representing the angular velocity or rate of the gun in elevation. This output rate signal $\dot{\theta}_o$ is derived from a tachometer 106 (FIG. 3a) an adjustable potential divider 223 being connected across the tachometer to apply the rate feedback signal across resistors 224, 225 in the grid-cathode circuits of triodes 184, 185, respectively. In accordance with the adjustment of the potential divider 223, the signal derived from the tachometer 106 and representing the rate of rotation of the gun in elevation servies to modify the operation of the primary control unit 78 so that the position of cam 80 corresponds, not to $\theta_e$ alone, but to $\theta_e$ less a small fraction of $\dot{\theta}_o$. As may be demonstrated mathematically this modified response minimizes the positional error of the system, especially at a low frequency which may be selected to correspond with the ship roll frequency.

Figure 3C:
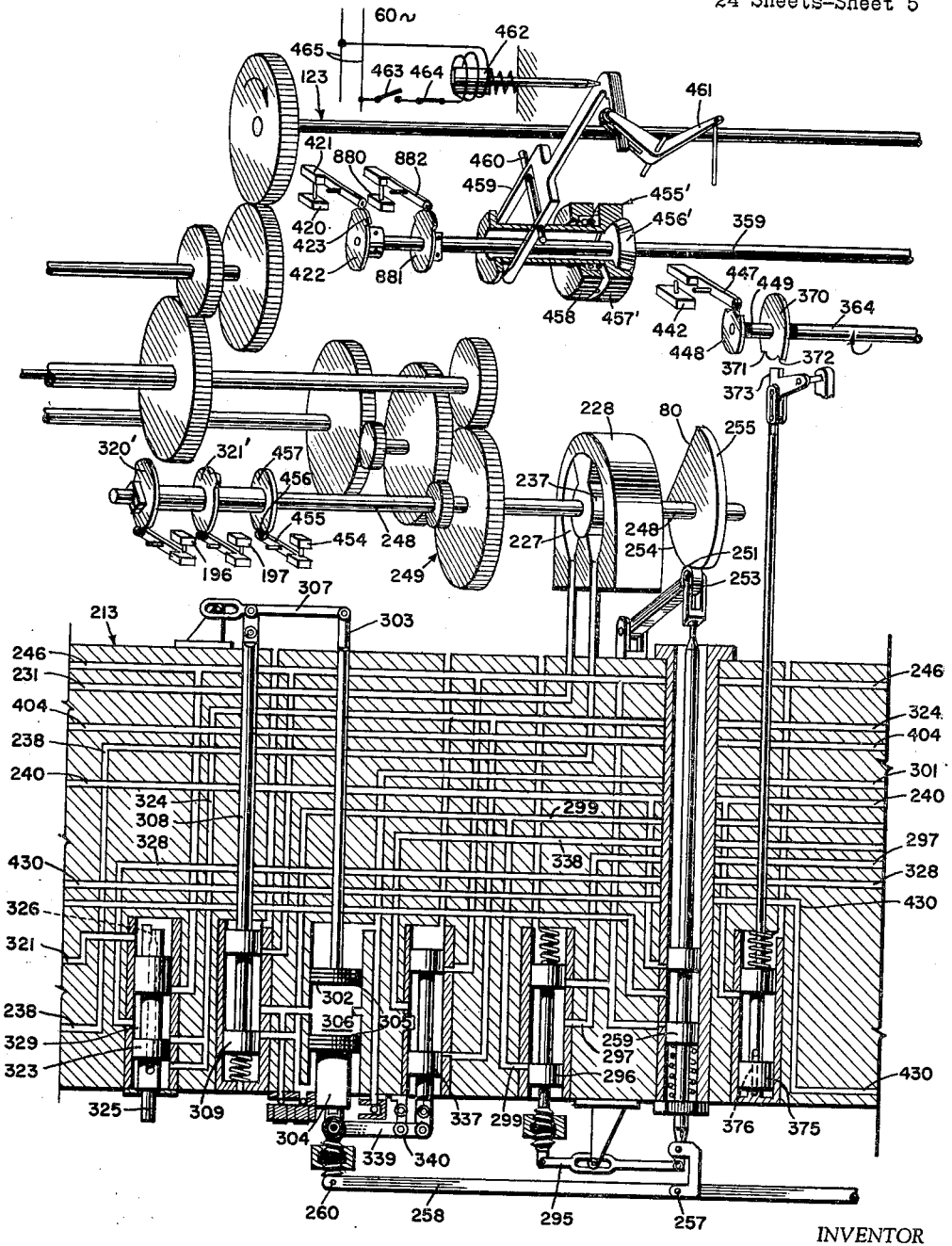

To optimize the performance characteristics of the gun positioning system, it is found desirable to operate in a linear mode for the ordinary, low-valued errors and in a non-linear mode for large errors, such as occur in synchronization. Transistions between these two modes of operation are effected by the non-linear cam 80. To position the cam 80 accurately in correspondence with the positional error, within prescribed limits, the rotary valve 210 (FIG. 3b) controls the introduction and discharge of hydraulic fluid filling one chamber 227 of a rotary piston 228 (FIG. 3c). Communication is established through conduit 229, valve 230 and conduit 231. As shown, communication is interrupted by the lower land of valve 230 which is of the underlapped two-land spool type. However, starting the system into operation serves to close relay contacts 233 connecting solenoid 234 with a 60 cycle supply 235 whereby the spool valve 230 is moved downwardly to place the conduits 229 and 231 in communication through its chamber.

Rotary piston 228 has a second chamber 237 in communication via conduit 238 with valve 239 which serves as a pressure divider. To obtain a pressure dividing action, hydraulic fluid at a high pressure $P_1$ is supplied via conduit 240 from a suitable regulated source to the exposed lower face 241 of the valve 239 from which plunger 242 extends, while the pressure in conduit 238 is applied through bore 243 of the valve 239 to the upper exposed face 244 of the valve. In accordance with the ratio of the areas of faces 241, and 244, with a pressure of 400 p.s.i. acting on area 241 a pressure of 200 p.s.i. will normally be applied to area 244 with a result that the valve will normally be at equilibrium. Valve movement is provided for by porting fluid into the intermediate chambers of the valve to upset this balance of pressures and areas.

Assuming, for example, that the pressure $P_1$ is 400 p.s.i., the pressure supplied to the rotary piston chamber 237 will be 200 p.s.i. inasmuch as the upper and lower lands defining valve chamber 245 are spaced in so-called "line-to-line" relation with ports connecting with the high pressure conduit 240 and with a tank or zero pressure conduit 246, respectively. With the pressure in chamber 237 of rotary piston 228 maintained at a fixed intermediate value $P_2$, such as 200 p.s.i., raising or lowering of the pressure in chamber 227 relative to the pressure $P_2$ will cause the piston to rotate clockwise or counter clockwise correspondingly. Since the rotary valve 210 is slightly underlapped with its lands controlling admission of fluid through circular ports from the high pressure line 240 and the tank pressure line 246, the pressure in conduit 229 will have a value $P_2$ only when the rotary valve is in its neutral position. That is to say, when the modified error signal applied to the servo amplifier 65 is zero so as to produce no displacement of the rotary valve 210 from neutral, the rotary piston 228 remains motionless. When an error exists (requiring movement of the gun in elevation) cam 80 is driven through shaft 248 by the rotary piston 228 clockwise or counter clockwise in dependence upon whether the required movement is to raise or depress the gun.

To ensure that the cam 80 will be stopped in a position accurately representing the modified system error, the shaft 248 also serves to transmit a mechanical feedback signal through gear train 249 to the rotors of synchro receivers 120, 121 (FIG. 3b). The feedback is degenerative in the sense that the rotors are moved to a position yielding substantially a zero input signal to the servo amplifier 65. The angular displacement of the rotors thus corresponds with the angular displacement between the order signal and the output position or gun elevation angle as modified, of course, by the rate feedback signal. Within the limits of rotation of the cam 80, then, it will take an angular position representing the modified system positional error. It may further be noted that, as the hydraulic fluid entering or leaving chamber 237 of the rotary piston 228 during rotation of the piston must pass through the port of valve 239 which is exposed by the upper or lower lands of the valve chamber 245, the displacement of valve 239 is proportional to the speed of rotation of the rotary piston 228.

*Elevation Stroke Control Unit 100*

Figure 4:
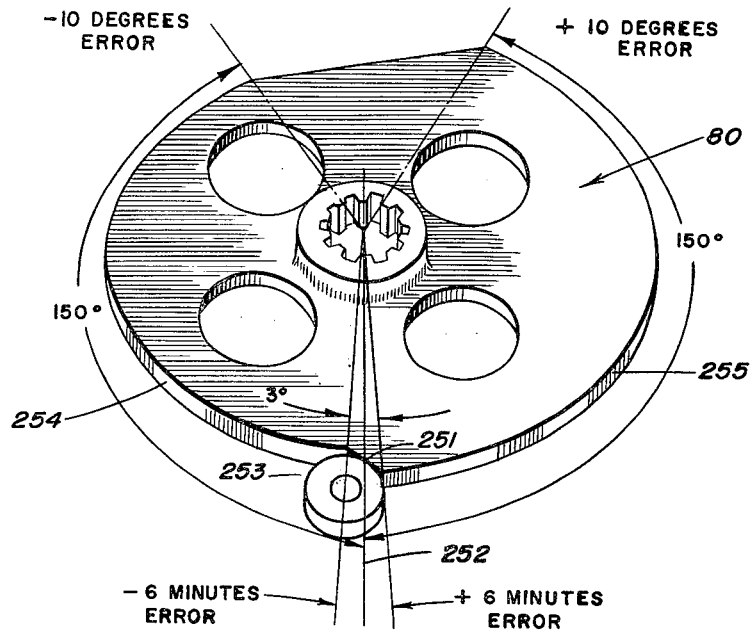
FIG. 4 is a plan view of a two-mode, non-linear cam employed in the control system.

The elevation stroke control unit 100 serves by mechanical and hydraulic interconnections to stroke the A-end of the elevation hydraulic transmission 43 thereby to determine the speed and direction with which the gun is driven in elevation. The amount of stroking is determined primarily by the angular displacement of cam 80, such that, for normal operation, the rate of change of acceleration of the gun is determined by the cam position. Considering then the configuration of cam 80, which may be observed more readily in FIG. 4, there is a constant lead contour 251 extending on either side of the neutral position, indicated by line 252, through equal small angular increments. In the absence of large errors which occur during synchronization, cam follower roller 253 engages the constant lead contour 251 for a linear translation of the rotary motion of the cam 80. In a practical application, the constant lead contour 251 may extend through an angle on either side of the neutral position 252 corresponding to a positional error of 6 minutes, that is, 1/10 of a degree. With a suitable gear ratio in the gear train 249 (FIG. 3c), however the actual angular extent of the constant lead contour 251 may be, for example, 15 times as great, or 1½° on either side of neutral. The constant lead contour is pitched in a clockwise direction so that roller 253 moves outwardly from the cam axis with clockwise rotation of the cam. Clockwise of the constant lead contour 251 is a parabolic contour 254 of diminishing radius extending through 150°, for example, to represent a minus 10° error. Counter-clockwise of the constant lead contour is a parabolic contour 255 of increasing radius extending through a like angle to represent a positive 10° error. A positive error, it may be noted, is taken to represent an error requiring an upward movement of the gun and a negative error, the contrary.

Considering for the present only the linear displacement of the cam follower 253, such displacement is seen to result in a like displacement of center point 257 (FIG. 3c) of stroke control lever 258, center point 257 being connected by the plunger of valve 259 to the cam follower roller 253. Left end point 260 of the stroke control lever 258 is displaced in accordance with the output of the integration control unit 90 and is assumed stationary for the present. Accordingly, the center pivot point 257 of the lever 258 is pivoted about left end point 260 by displacement of the cam follower and produces a double displacement of the right end point 261 (FIG. 3d) which is connected with the plunger 262 of valve 263. Stroke control lever 258 affords, therefore, a linear coupling between the cam 80 and the valve 263.

Valve 263 serves to control the speed of the gun in elevation by hydraulically adjusting the angular position or tilt of a so-called tilting plate 265 (FIG. 3d) in the A-end 42 of the transmission. To this end, the valve 263 is of the two-land spool type controlling the flow into conduit 266 by selectively admitting hydraulic fluid from high pressure line 240 via conduit 267 or discharging hydraulic fluid to tank through conduit 268. The lands of valve 263 have a line-to-line spacing with respect to ports for the conduits 267, 268 formed in a slideable valve 263 which encloses the valve sleeve 269. As illustrated, conduit 266 is normally in communication through the lower chamber of valve 270 with a conduit 271 connecting with the larger of two stroke controlling pistons 272, 273. Such pistons 272, 273 are connected by respective piston rods 274, 275 to the tilting plate 265 at mutually opposite equally spaced points on either side of the axis of tilt. Whereas the pressure in large stroking piston 272 may be varied above or below the pressure P₂, the pressure in the small stroking piston 273 is fixed at P₁ by communication through the conduit 267 and a drilled passage at 312 of flow regulating valve 277 to the conduit 240 which connects with the P₁ pressure supply. Assuming that pressures of 400 and 200 p.s.i., respectively, correspond to $P_1$ and $P_2$, the large stroking piston 272 suitably has twice the area of small stroking piston 273 but the same lever arm so that the pistons are in balance when the valve 263 is in line-to-line position with respect to the ports which it controls. Except for the use of stroking pistons 272, 273 to vary the angle of the tilting plate 265, the A-end 42 and B-end 44 of the hydraulic transmission are of conventional design.

Before considering the hydraulic transmission further, the stroking of the tilting plate 265 is observed to have a correspondence with the displacement of valve 263 obtained by mechanically coupling the tilting plate 265 through tilting plate shaft 279, crank arm 280 and link 281 to the valve sleeve 269. Through this mechanical coupling, the valve sleeve 269 is translated in accordance with changes in the angular position of the tilting plate 265, the tilting plate shaft 279 being secured to the tilting plate along the tilting axis. Thus, there is provided a mechanical, degenerative feedback completing a servo loop between the valve 263 and the tilting plate 265 whereby the tilting plate is stroked in accordance with the error between its actual position and a position exactly corresponding with the position of the valve 263.

Considering now the manner in which the stroking of the tilting plate 265 controls the elevating or depressing speed of the gun, the A-end 42 is seen to have a drive shaft 283 co-rotatively coupled to a socket ring 284 which, in turn, is rotatable within and tilted with the tilting plate 265. Also co-rotative with the drive shaft 283 is A-end cylinder barrel 285 carrying pistons stroked by the rotation of the tilting plate 265 when off of neutral. Hydraulic fluid pumped from the cylinder barrel 285 passes through valve plate 286 into a cylinder barrel 287 in the fixed stroke B-end 44. Admission of hydraulic fluid into pistons of the cylinder barrel 287 from the valve plate 286 communicates a driving torque to socket ring 288 rotatable at a fixed tilt or angle to turn B-end drive shaft 290 at a speed determined by the stroking of tilting plate 265. Rotation of the output drive shaft 290 is coupled through a train 289 of spur gears to the B-end response shaft 124, thus applying feedback through the servo loop back to the synchros 120, 121.

Recapitulating, it will be observed that the forward loop including the primary control unit 78, cam 80 and stroke control unit 100 have a linear operation for small errors serving to adjust the elevating or depressing of the gun in correspondence with the modified system error. Such correspondence is ensured by means of the degenerative feedback coupling from the B-end drive shaft 290 to the synchro stators.

*Integration Control Unit 90*

While it was assumed for purposes of describing the stroke control unit 100 that the left end point 260 of the stroke control lever 258 is fixed, in actuality such point 260 is displaced to afford first and second integral compensation for improved performance characteristics of the main servo loop. Input to the integration control unit 90 is through pivoted link 295 connecting the plunger of valve 259 to the plunger of a two-land spool type valve 296 (FIG. 3c). The upper land of this valve 296 controls communication of conduit 297 with conduit 246 at tank pressure, while the lower land controls communication of hydraulic fluid at pressure $P_2$ in conduit 299 with the conduit 297. Accordingly, the neutral value of pressure in conduit 297 is one-half $P_2$ or 100 p.s.i. It may be observed, however, that $P_2$ pressure is present in conduit 299 only under normal operating conditions, that is, in the absence of large errors occasioned by synchronizing and when the gun is free of limit stops.

The conduit 297 communicates through the upper chamber 335 of valve 300 (FIG. 3d) and conduit 301 with the upper or plunger side of piston 302. Hence, valve 296 controls the flow of oil to the upper piston chamber and thereby controls the amount of travel of piston 302 in accordance with the time integral of the valve displacement. Plunger 303 extending upwardly from piston 302 is of smaller diameter than plunger 304 which extends downwardly from piston 305. Between the two pistons 302, 305, which are arranged for travel in a common cylindrical bore formed in the valve block 213, there is a column 306 of hydraulic fluid serving to transmit the displacement of upper piston 302 to the lower piston 305. Whereas the plunger side of piston 302 is exposed to pressure which is normally 100 p.s.i., the plunger side of piston 305 is normally maintained at 200 p.s.i., that is, $P_2$ pressure by communication with conduit 299. Accordingly, the effective upper area of piston 302 is made double that of piston 305 on the plunger side, so that the pistons will be subject to balanced forces when the pressure acting on piston 302 is 100 p.s.i.

Since displacement of piston 302 is the integral of displacement of the control valve 296, displacement of the left end point 260 is an integral function of the displacement of center point 257 for the stroke control lever 258. Otherwise stated, displacement of point 260 varies as the time integral of displacement of point 257, since piston 302 is moved as the time integral of the rate of flow of hydraulic fluid through conduit 297 and such flow rate is directly proportional to the displacement of valve 296 with the use of rectangular valve ports. In order that the integration control unit 90 may aid the cam follower 253 in displacing the right-hand end point 261 of stroke control lever 258, valve 296 is arranged, as described, to move upwardly when center point 257 moves downwardly, draining hydraulic fluid from the chamber above piston 302, thereby causing left end point 260 to rise. Taking the center point 257 as the pivot for the stroke control lever 258, rising movement of the left end point 260 is seen to cause falling movement of the right end point 261. Hence a small error represented by clockwise displacement of cam 80 causes right end point 261 to move downwardly with the center point 257 and downwardly yet further with the upward movement of left end point 260. The integration control unit, therefore, serves to emphasize or increase stroking for small errors, particularly for errors of moderate frequency.

To provide an additional displacement of the left end point 260 as a function of the second integral of the center point displacement, plunger 303 for piston 302 connects with an end of link 307 remote from its pivoted end to actuate plunger 308 for valve 309, which is pivotally connected to link 307 at an intermediate point. Since piston 302 moves as an integral function of the center point displacement, the proportionate movement of plunger 308 is likewise an integral function of the center point displacement. Movement of plunger 308 is, however, a fixed fractional proportion of movement of plunger 303. Like the valve 296, valve 309 is a two-land valve with the upper and lower lands spaced for line-to-line control of the port for the tank conduit 246 and the port for the $P_2$ pressure conduit 299, respectively. If the piston 302 moves downwardly from its neutral position, in which it is shown, valve 309 introduces additional fluid into the column 306 of fluid intermediate pistons 302, 305 at rate proportional to displacement of valve 309.

In consequence, the trapped column 306 intermediate pistons 302, 305 is expanded by a displacement longitudinally of the piston axes which is proportional to the integral of displacement of valve 309. Since displacement of valve 309 is proportional to the first integral of center point displacement for the stroke control lever 258, the additional displacement of left end point 260 caused by the action of valve 309 corresponds with the second integral of the displacement of center point 257. In other words, left end point 260 is displaced as the weighted linear sum of the first and second integrals of the center point displacement to produce an equal component of displacement of the right end point 261 by rotation of lever 258 about its center point 257. It may be noted that the valve 309 controls both an increase and a decrease in the length of the fluid column 306 between pistons 302, 305 and that such displacement is governed by displacement of piston 302 and affects a displacement of piston 305 correspondingly.

Mention will be made later of arrangements for disabling the integration control unit 90 in the presence of large synchronizing errors and during limit stop operation.

Summarizing briefly, the gun order signal is impressed as a voltage upon the stator windings of synchro control transformers 120, 121, such windings being angularly displaced in accordance with the B-end response, that is the gun elevation angle, thereby developing a magnetic field having a direction representing the gun elevation error. By means of the primary control unit 78, including servo amplifier 65, torque motor 200, rotary valve 210 and rotary piston 228, the rotors of synchro transformers 120, 121 are set transverse to these magnetic field directions to yield a substantially zero input signal to the servo amplifier, while at the same time the cam 80 is positioned angularly in substantial correspondence with the gun elevation error. The B-end tachometer 106, however, injects a rate feedback signal corresponding to the angular velocity of the gun in elevation into the primary control loop negatively with respect to the signal which is amplified and demodulated in the servo amplifier 65. In consequence, low frequency errors, and particularly errors due to rolling of the ship and occurring at the so-called roll frequency, may be specifically minimized by appropriate adjustment of the rate feedback loop. Displacement of cam 80 within the angular limits of its constant lead contour 251 is translated linearly into displacement of center point 257 for stroke control lever 258. In addition to the directly produced displacement of the right end point 261, there also results an additional displacement representing the compensating integral signal output of the integration control unit 90.

The displacements mechanically combined by the stroke control lever 258 characterize the summing unit 88 of FIG. 2 and produce a displacement of plunger 262 for valve 263 relative to the valve sleeve 269. In proportion to such relative displacement and in dependence upon its sense, there results a flow into or out of the large piston 272 to produce a corresponding angular displacement of the tilting plate 265. Exact correspondence between the stroking of the A-end 42 and displacement of the right end point 261 of the stroke control lever is established when the sleeve 269 is displaced by mechanical feedback identically with the displacement of plunger 262, to maintain the valve 263 in its line-to-line or neutral position. In practice, the gun error variations results in corresponding variations in the position of cam 80, right end point 261, and the tilting plate 265 so that the angular velocity of the gun in elevation varies with the weighted sum of the gun error (as modified by rate feedback), and its first and second integrals. It may be noted that the two-land valve 263 affords a particularly simple and effective control of the tilting plate position, through the use of the large and small pistons 272, 273 and the mechanical feedback to the valve sleeve 269.

*Elevation Saturation Control*

Under various conditions, the velocity or acceleration, or both, required of the gun by the elevation order signal exceeds safe limits. Safety limits may be required for reasons of structural strength or to prevent overloading of the elevation drive motor. (For the train drive, safety limits may depend upon the ability of gun operators to withstand acceleration forces while manning the one-man-control stations 36, especially where such stations are appreciably off the axis of the training circle 57.) A particular instance where excessive velocity and acceleration may occur is upon synchronization from one director or source of gun order signals to another. Assuming, for example, that the director 60 is furnishing gun order signals in tracking a given target and a second director (not shown) is generating gun orders in tracking a second target, effective application of fire power requires that the gun respond to the new gun order and synchronize with it in a minimum time. While in normal operation the gun error may remain within plus or minus 6 minutes of elevational arc, for example, the error signal at the instant of synchronization is proportional to the angle between the existing gun elevation and the new gun order and, hence, may be exceedingly large. The error may readily exceed the plus or minus 10° limits of the cam 80, for example. In order to bring the gun into correspondence with a new gun order signal in a minimum time, smoothly and without danger to personnel or equipment, the following five conditions are satisfied during synchronization:

(1) The velocity of the gun is so limited that the gun cannot elevate at greater than a predetermined saturation speed which may be approximately 30° per second.

(2) The acceleration of the gun in elevation is limited so as not to exceed a predetermined saturation acceleration which is, for example, 80° per second in a second.

(3) The integration control unit is effectively locked while the gun is travelling at a maximum velocity so as to hold the left end point 260 of stroke control lever 258, such point 260 being returned to its neutral position as synchronization is achieved.

(4) Deceleration of the gun is commenced in anticipation of synchronization when the gun error is, for example approximately 7° away from correspondence with the new gun order, that is, within the range of cam 80.

(5) The gun is decelerated linearly at a predetermined maximum limit of, for example, approximately 60° per second in a second, until the gun error is reduced to, say, plus or minus 6 minutes, whereupon the rate of deceleration is decreased exponentially to zero.

To fulfill condition (1), the travel of the stroking pistons 272, 273 is limited, thereby to limit the angular displacement of the tilting plate in either direction. Since the angular displacement of the tilting plate directly determines the speed of the B-end output shaft, the gun cannot elevate or depress at a rate greater than that corresponding to the limits of tilting plate displacement in either direction. In a typical design, full displacement of the tilting plate provides a saturation velocity of 30° per second.

To fulfill condition (2), valve 277 is arranged to control the maximum rate at which oil can flow to and from the large and small stroking pistons 272, 273. To accomplish a regulation of the rate of inflow of hydraulic fluid, the valve 277 is of the two-land spool type and has a metering orifice 312 through which fluid from the $P_1$ pressure conduit 240 must pass, such orifice 312 being formed in the bore through the valve plunger connecting its upper and middle chambers so that the valve plunger is subject to a pressure differential proportional to the flow rate. The resultant force of this pressure differential acts upon the valve plunger in opposition to bias spring 313 to cause the upper land of the valve to control flow through the outlet port 314 into conduit 267. With a sufficient flow rate, outlet port 314 is completely closed and the flow rate is then limited to a fixed value by outlet choke port 315 communicating with conduit 267. Since inflowing oil for either the large piston or the small piston at $P_1$ pressure must be drawn from conduit 267, the restriction on flow into conduit 267 imposes a fixed minimum limit on the time for either of pistons 272, 273 to travel from zero to full stroke. Where that time is, for example, approximately ⅜ of a second, the acceleration achieved by stroking the tilting plate may reach a maximum of 80° per second per second. Valve 277 accordingly maintains the acceleration of the gun in elevation, under synchronizing conditions, at the saturation value of acceleration and no greater.

During deceleration, the valve 263 moves in a direction to restore the tilting plate 265 to its neutral position. The limitation on the returning movement of the tilting plate toward neutral is not, however, attributable to valve 277 but to the parabolic cam surface of cam 80 together with the limited rate of rotation of the cam. Since deceleration during synchronizing is at a constant rate of minus 60° per second per second, it will be apparent that the limitation to 80° per second per second characteristic of the valve 277 is not effective during deceleration. It will be recalled that the parabolic contours 254, 255 of cam 80 extend through arcs representing approximately plus or minus 10° gun error. When synchronizing through an angle substantially larger than 10°, the rotary piston 228 and cam 80 reach an angular limit or stop barring further travel. (At such instant, depending upon the direction in which the cam is turned, switch 196 or 197 is closed by the corresponding cam 320' or 321', each of which is co-rotatively secured to shaft 248. As seen in FIG. 3b, opening of switch 196 or 197 operates to reduce the current in the corresponding winding of the torque generator 200 to a safe value, thereby to eliminate overheating.

As the error signal ($\theta_p$) supplied to the torque generator rapidly diminishes with movement of the gun at a maximum rate toward the new gun order position, an error sufficiently small is reached when the rotary valve 210 supplies hydraulic fluid to the rotary piston 228 to move the piston way from its limit stop. In a typical design, the gun error signal at which the system thus anticipates correspondence of the gun with the new gun order signal is approximately 7°. As the gun elevation error closes toward zero, the cam 80 is rotated proportionately, while the cam follower 253 rides along the parabolic contour 254 or 255. Through the linkage between valves 263 and 259 afforded by the stroke control lever 258, movement of the cam follower roller causes the gun to decelerate at a constant rate of approximately 60° per second in a second. When the gun error reduces to plus or minus 6 minutes, the limits of the constant lead cam contour 251, a smooth transition occurs between constant deceleration and an exponential deceleration to zero. It may be observed that the new gun order to which the system is synchronized may have a given velocity component in addition to a different positional value. In this case, synchronization may occur at a point off the neutral position of cam 80.

In order that overshoot will not occur due to the added signal derived from the integration control unit 90, the integration control unit is neutralized during synchronization through relatively large angles. During the time that the rotary piston 228 takes to rotate and hit the stop at the end of its travel in response to a new gun order signal, its rate of rotation will exceed some value such as 7° per second, thereby producing a flow of oil through the chamber 245 of valve 239 to develop an unbalance of pressure through orifice 243 in the plunger 242. This unbalance of pressure is sufficient to displace the plunger through the amount of overlap of the upper or middle land defining chamber 320, thereby to drain oil from conduit 321 in communication with the tank via conduit 246. Conduit 321 opens upon the upper face of valve 323, applying a pressure which is opposed by pressure $P_2$ applied through conduit 324 to the lower face of valve 323. However, extension of plunger 325 from the lower face of valve 323 beyond the valve block 213 reduces the effective area upon which $P_2$ pressure is applied. Accordingly, except when conduit 321 is ported to tank through chamber 320, $P_2$ pressure applied through orifice 326 communicating with the opposite ends of valve 323 produces a net downward force maintaining valve 323 in the position illustrated. Thus, when conduit 321 is ported to tank pressure during rapid rotation of rotary piston 228 occasioned by synchronization, the net downward force is replaced by a net upward force causing lower land of valve 323 to cut off communication of conduit 328 with the conduit 324 at $P_2$ pressure. Then, as valve 323 passes upwardly through the line-to-line position, the upper land places conduit 328 in communication with conduit 246 at tank pressure, that is, zero pressure. The communication selectively afforded conduit 328 by chamber 329 of valve 323 between $P_2$ pressure and tank pressure is determined by the rotational speed of rotary piston 228. This selectively adjustable pressure in conduit 328 is, in turn, communicated through chamber 330 of valve 300 to conduit 299 which supplies actuating pressure to the integration control unit.

Hence, when rotary piston 228 turns at a rate exceeding a predetermined value, such as 7° per second, as it will during synchronization through a relatively large angle, the rate of flow through chamber 245 of valve 239 causes porting of the upper face of valve 323 to tank, moving valve 323 upwardly by the pressure differential across its orifice 326 to place conduit 328 and hence conduit 299 at tank pressure. The lack of $P_2$ pressure to displace either piston 302 or 305 prevents functioning of the integration control unit, so that end point 260 of the stroke control lever 258 is locked.

During the travel of rotary piston from neutral to its end limit and after the integration control unit is locked, the stroke control lever 258 is pivoted about point 260 by the cam follower 253 to stroke the valve 263. At nearly full stroke, linear cam 332 carried by plunger 262 of valve 263 acts upon link 333 pivoted at point 334 to stroke valve 300 downwardly to its lowermost position. For this purpose, cam 332 has a linear intermediate surface and equally raised end surfaces. The valve 300 is stroked downwardly as the valve 263 reaches the end of its travel. The land above chamber 330 cuts off conduit 299 from conduit 328, from which $P_2$ pressure has already been removed by valve 323, when engagement of rotary piston 228 with its limit allows valve 323 to stroke downwardly, thereby restoring $P_2$ pressure to conduit 328. Valve 300 prevents application of $P_2$ pressure to the integration unit via conduit 299. However, downward stroking of valve 300 by cam 332 also shifts communication of conduit 301 from conduit 297 to conduit 338 via chamber 335. Since conduit 301 communicates with the upper face of piston 302 while conduit 338 communicates with the control port of valve 337, stroking of servo valve 263 to its limit during synchronization effectively transfers control of the integrating control unit from the pilot valve 296 to the neutralizing valve 337.

Neutralizing valve 337 is of the spool type having its upper and lower lands spaced in line-to-line relation to the ports controlled thereby. When the valve 300 is in its bottom position, neutralizing valve 337 controls the communication of tank pressure in conduit 246 or $P_2$ pressure in conduit 324 with piston 302 by means of its upper and lower lands, respectively. It will be recalled that the pressure of hydraulic fluid in conduit 328 is restored to $P_2$ when rotary piston 228 reaches a limit. Valve 337 is displaced in accordance with the movement of rocker arm 339 which is connected at one end to plunger 304 of piston 305 and at the other end to valve 337, being pivoted at an intermediate point 340. Thus, if piston 305 is displaced from its neutral position, valve 337 is also displaced from its neutral or line-to-line position but in the opposite direction. Such displacement of valve 337 causes fluid flow in conduits 338, and 301 to displace piston 302 toward its neutral position. The locked column 306 of fluid is thereby restored to its normal height and piston 305 restored to its neutral position. As an example, consider a displacement of piston 305 downwardly from its neutral position just prior to synchronization. When valve 337 is placed in control of piston 302, its displacement upwardly by rocker arm 339 ports the upper face of piston 302 to tank pressure. Piston 302 accordingly moves upwardly, raising piston 305 to its neutral position. If the locked column 306 of fluid is longer than its normal length, piston 302 will move upwardly beyond its neutral position until the upper land of valve 309 ports a sufficient portion of the blocked column of fluid to tank pressure in conduit 246. Accordingly, whenever valve 263 reaches the end of its stroke in either direction, valve 337 is made operative to neutralize the integration control unit, that is, to move left end point 260 of the stroke control lever 258 to its neutral position.

Upon the occurrence of a large synchronizing error, then, valve 323 (FIG. 3c) first disables the integration control unit by disconnecting conduit 328 from $P_2$ pressure in conduit 324 and secondly valve 300 (FIG. 3d) switches control of the integration unit from valve 296 to the neutralizing valve 337. Neutralization of the integration control unit is accomplished preferably within the time taken by the rotary part of piston 228 to hit the stop at the end of its travel, a time, for example, of approximately ⅓ second. A short interval, such as 0.1 second, after rotary piston 228 reaches its limit, acceleration of the gun at a constant rate determined by valve 277 brings the gun to its maximum velocity determined by travel of the stroking pistons 272, 273 (FIG. 3d). The gun rotates at its maximum speed until approximately 7 degrees from correspondence with the new gun order, that is, until it is displaced by a small angle of anticipation from the desired position. Rotary piston 228 then moves away from its limit stop at a rate which is again effective to displace valve 323, continuing the cut-off of $P_2$ pressure from the integration control unit. At the same time the parabolic contour 254 or 255 of rotary cam 80 governs deceleration of the gun at a constant maximum rate by pivoting stroke control lever 258 about the neutralized end point 260 in a direction opposite to that occurring during acceleration. As the valve 263 is returned by the stroke control lever 258 toward its neutral position, valve 300 moves to its upper position under the action of spring 342 to restore control of the integrating unit to the valve 296. However, the integration control unit does not displace end point 260 from its neutral position because its communication with $P_2$ pressure through valve 323 is not restored until rotary piston 228 slows to a stop at its neutral position corresponding to zero gun error. Thus, when the gun comes into correspondence with the new gun order, the integration control unit is in its neutral position and ready for activation. Should the new gun order require an angular velocity of the gun in elevation, a very brief transient error may occur as the integration control unit is reactivated but synchronization will nonetheless be achieved with great rapidity and accuracy.

The foregoing discussion of synchronization has been concerned with synchronizing through large angles. It is possible for synchronization to occur through such a small angle, however, that the plunger of valve 263 does not travel to a limit. In this event valve 300 is not displaced downwardly to neutralize the integration control unit. Nonetheless, valve 323 will be displaced upwardly by the rapid rotation of the rotary piston 228 to hold the integration control unit at the position which existed at the time of switching. Depending upon the displacement of left end point 260 maintained by the integration control unit during the synchronizing period, a corresponding overshoot may occur. However, since the time of travel through a small angle is relatively short, such overshoot is of no practical consequence.

Summarizing, the control system of the present invention is seen to apply a predetermined maximum corrective effort to the gun or load in response to relatively large errors, such as are occasioned by synchronization, but provides linear control with integral compensation for accurately following continuously varying gun orders. In switching from linear to synchronizing operation, the amount of compensation introduced by the integrating system is first held constant for the period of acceleration and then restored to zero or neutral while the gun is traveling at its maximum velocity. As the gun decelerates at its maximum rate, the integration control unit is held at its neutral position.

*Elevation Limit Stop Mechanism*

While in conventional practice, a gun is provided with positive mechanical stops to prevent overtravel beyond the limits of arc incorporated in the design of the gun, the desirability of having the control system arranged to bring the gun smoothly to a stop at the limit of travel will be obvious. Over the permitted arc of travel which may, for example, be 85 degrees above horizontal and 15 below horizontal in elevation, it is desirable that the gun elevating mechanism be fully responsive to gun orders. Optimum limit stop operation is secured, therefore, when it becomes effective in just a sufficient time to bring elevation of the gun smoothly to a stop at the limit of travel.

In accordance with the present invention, anticipation of a limit stop is determined by a combination of the angular position of the gun with respect to the limit stop and the angular velocity of the gun. This combination is based upon maximum deceleration of the gun at a constant rate during limit stop operation, it being recognized that for every given angular velocity at the instant limit stop operation commences, there is a fixed travel of the gun during deceleration before complete stoppage is effected. The upper and lower limits are, moreover, adjustably set, namely, by threaded upper and lower limit stop screws 345, in valve block 213 and 346, respectively adjacent linkage 357 (FIG. 3d).

To introduce a signal mechanically representing the elevational position of the gun, the B-end response shaft 124 carries a worm gear 348 in mesh with worm wheel 349 for rotating a first differential gear 350 on shaft 351. The arrows applied to the various portions of the limit stop mechanism represent the directions of rotation as and after the gun is depressed into the lower limit stop. Differential 353 with which end gear 350 is associated serves to measure the angle remaining before the limit stop is encountered and allows the limit stop mechanism to remain effectively inoperative until the position necessary for anticipating the limit stop is reached. A second end gear 354 of the differential moves in correlation with the gun position when a limit stop is encountered. To effect coupling between the end gears 350, 354, spider gear 355 of the differential carries planet gears 356 in mesh with the end gears. When the gun is positioned away from the limit stops, the spider gear 355 is free to rotate gear 356a which is rotatively connected through a pin and slot linkage 357 to upper limit arm 358. The arm 358, in turn, is carried on shaft 359 co-rotatively with a pinion 360 which is in mesh with a rack 361. While the upper limit arm 358 is positioned to strike the upper limit stop screw 346 for arresting upward movement of the gun, the gun is assumed to be depressing in accordance with the rotation of parts indicated by the arrows. This indicated rotation of the rack and pinion is converted into a downward translation of lower limit piston 363 which is received in the valve block 213. When the piston 363 strikes the lower limit stop screw 345 which extends into the piston chamber, rotation of the spider 355 is arrested. Thereupon, end gear 354 rotates in one-to-one correspondence with end gear 350, although in the opposite direction.

End gear 354 is in driving engagement with limit-stop lead input linkage system at 365 through an eccentric pin 366 engaged in a slot of limit stop control lever 367. To effect the required combination of the lead input and a rate input representing angular velocity of the gun, the limit stop control lever 367 is pivoted at a point 368 intermediate the points at which the rate and lead inputs are applied. Actually, the lead input is applied at successive points along the slot which extends lengthwise of the lever 367. Normally, a cam 370 having a dwell between shoulders 371, 372 (FIG. 3c) is engaged by a latch 373 to confine the pin 366 to an arc of, for example 90°, the center position of the arc being at the illustrated position of the pin 366. This results from the application of $P_1$ pressure via conduit 240 to the chamber of spool-type piston 375 and thence through a port 376 in the piston to act upwardly on the piston and upon the latch 373. Accordingly, pin 366 acts upon the portion of the slot closest to the pivot point 368, moving outwardly in the slot at a point coinciding with the arcs for the pin moving about shaft 364 and the lever moving about point 368.

Figure 5:
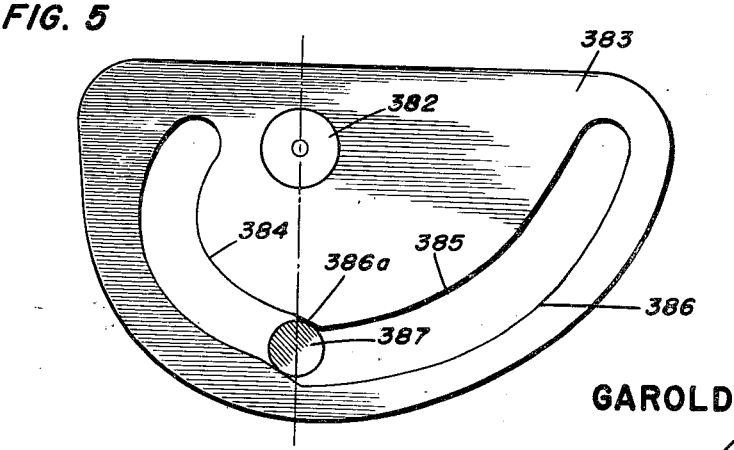
FIG. 5 is a plan view of a non-linear cam employed in the limit stop mechanism of the control system.

The rate input to the limit stop mechanism is taken off stroke response shaft 279, the position of which is governed by the disposition of the A-end tilting plate 265 and corresponds with the angular velocity at which the gun is driven in elevation. Through the meshing of sector gear 380 carried by shaft 279 and gear 381 carried by shaft 382, limit stop lead cam 383 is caused to rotate from its neutral position, which is illustrated, by an amount proportional to the angular velocity of the gun. The rotational displacement is clockwise or counter-clockwise (as shown) depending upon whether the gun is being elevated or depressed. Cam 383, as best seen in FIG. 5 has camming surfaces 384, 385 inwardly of a slot 386, which correspond in contour to the parabolic contours 254, 255 of rotary cam 80. Intermediate the parabolic contour is a constant lead contour 386a similar to contour 251 of cam 80. Thus, the surfaces 384, 385 have parabolic contours progressing outwardly from the axis of shaft 382 in a counter-clockwise direction, thereby continuously increasing in radial distance from the axis of shaft 382. Retained in the slot 386 for following action on the contours 384, 385 and 386a is a pin 387 carried at the end of limit stop control lever 367 opposite from the pin and slot connection. It may be noted that point 368 of the limit stop control lever 367 is a summing point in the sense that both the positional input from end gear 354 and the rate input from cam 383 displace the point 368 in the same direction for a given direction of gun movement into a limit stop. If the gun is being elevated, pin 387 is displaced upwardly toward the center of the cam by the counter-clockwise shift of cam 383 from its neutral position, thereby rotating pin 366 and spider gear 355 counter-clockwise and advancing upper limit arm 358 toward upper control limit stop screw 346 by a lead angle.

When the gun is depressing, cam 383 is displaced clockwise through an angle corresponding to the angular velocity, thereby displacing pin 387 downwardly and pin 366 upwardly. The greater the angular velocity, the greater the displacement, and hence the greater the lead or anticipation of a limit stop. The eccentric pin 366 is driven downwardly by the B-end response as the lower limit stop is encountered and rotation of spider 355 is arrested, thereby to displace the point 368 downwardly. It may be observed, however, that eccentric pin 366 is driven by the B-end response shaft 124 only when a limit stop is encountered, whereas cam 383 moves pin 366 continuously with variations in the amount and direction of angular velocity, as represented by rotation of shaft 279. Moreover, cam 383 is always rotated clockwise or counter-clockwise, respectively, after the upper or lower limit stop is encountered but in the limit stop operation is returned to its neutral position simultaneously with return of the tilting plate 265 to its neutral position. Accordingly, cam 383 may be considered as adjusting the lead in advance of a limit stop at which displacement of point 368 of lever 367 occurs, the amount of such lead being dependent upon the velocity of the gun and the direction, dependent upon the direction of gun travel.

The point 368 is pivotally connected to the upper end of plunger 390 secured to valve 270. It will be recalled that valve 270 is of the spool type having a lower chamber between middle and bottom lands serving to control communication of the stroke control valve 263 with the large stroking piston 272. These middle and bottom lands are spaced in underlapped relation to the ports for conduits 266 and 271 so that communication is not completely cut off until valve 270 moves an appreciable distance downwardly against the bias of spring 391. Although cam 383 moves continuously with variations in angular velocity of the gun, it may be observed that such movement does not displace the valve plunger 390 from the normal position maintained by spring 391, except when a limit stop is actually encountered. Instead, the limit stop lever 367 pivots about point 368 to turn the second end gear 354, causing the spider 353 to move in accordance with the difference in rotations of shafts 364 and 351. So long as the spider 355 is free to rotate, the bias spring 391 will maintain valve 270 in a position affording communication between the stroke control valve 263 and the large stroking piston 272.

Upper chamber 392 of valve 270 is in communication via conduit 271 with the large stroking piston 272. In the neutral, normal position of valve 270, the top and middle lands defining the upper chamber 392 are in overlapped relation with ports for conduits 267 and 268, respectively. Not until the valve 270 is displaced the distance required to close off communication between conduits 266 and 271 is communication established between conduit 271 and either $P_1$ or tank pressure, in dependence upon whether valve 270 is displaced upwardly or downwardly. It may be noted in this connection that bias spring 391 serves to hold valve 270 in its neutral position, since spring 391 acts in compression against collars which rest on shoulders defined by valve sleeve 393 in the neutral position but which are displaced by the valve 270 against the biasing action whenever valve 270 is off of neutral.

Upon encountering the lower limit stop in operation, rotation of the B-end response shaft 124 is coupled through the differential 353 to displace plunger 390 downwardly. The arc through which the gun may depress before coming to stop is automatically predetermined by the angular displacement of cam 383 in accordance with the velocity of the gun and the corresponding downward displacement of the rack 361 and piston 363 beyond what would be the displacement due to rotation of B-end response shaft 124 alone. Downward displacement of valve 270 cuts off large stroking piston 272 from the stroke control valve 263 and places valve 270 in control of stroking. Downward displacement of valve 270 ports conduit 271 and large piston 272 to tank pressure via conduit 268. The small stroking piston 273 accordingly displaces the tilting plate 265 as rapidly as the deceleration control valve 277 permits, namely, at a rate of approximately 60° per second per second in a preferred design. This rate of deceleration is maintained constant so long as the middle land of valve 270 uncovers the port for conduit 268.

Deceleration of the gun, however, produces a corresponding decrease in the gun velocity which is reflected in displacement of lead input cam 383 toward its neutral position. Thus, while continued downward movement of the gun results in downward movement of the eccentric pin 366 tending to move center point 368 of limit stop lever 367 downwardly, rotation of lead input cam 383 counter clockwise toward its neutral position tends to raise the point 368 of limit stop lever 367. As the neutral position of cam 383 is reached, the net displacement of point 368 is such that the upper and middle lands of valve 270 are raised to their overlapped, non-controlling position. At the same instant, the tilting plate 265 is restored to its neutral position and the gun is stopped. Constant lead contour 386a of cam 383 renders such stopping free overshoot and thus stabilizes the limit stop operation. A similar limit stop operation occurs upon encountering the upper limit stop screw 346. Transition between control of stroking by the stroke control valve 263 and by the limit stop valve 270 occurs when the center land of valve 270 is line-to-line with the ports which it controls.

With valve 270 in this line-to-line position and the tilting plate 265 in its neutral position, the gun is yet free to elevate in response to gun orders away from a limit stop. The compensating input afforded by the integration control unit is also neutralized for accuracy of response to gun orders requiring movement out of the limit stop. To ensure neutralization of the integration control unit during limit stop operation, a portion 395 of valve plunger 390 is appropriately contoured as a cam which acts through cam follower 396 (FIG. 3d) to open switch 397 in series between power supply 235 and solenoid 398 (FIG. 3b). Whereas solenoid 398 when energized maintains valve 400 in its downward position by acting through valve plunger 401 against bias spring 402, de-energization of solenoid 398 allows spring 402 to restore valve 400 to its upper position. Valve 400 is of the spool type having top and bottom lands disposed in a spaced relationship providing an alternately underlapped relation to port for conduit 404 with respect to the ports for conduits 240 and 246 carrying $P_1$ and tank pressures. Accordingly, when the limit stop mechanism is not operative, valve 400 places a conduit 404 connected with its control port in communication with tank pressure, while during a limit stop operation when switch 397 is opened, conduit 404 is supplied with $P_1$ pressure. As conduit 404 communicates with the upper face of valve 300 (FIG. 3d), application $P_1$ pressure via conduit 404 serves to move valve 300 to its downward position just as if that valve were actuated by cam 332 at the limits of travel for valve 263.

It will be recalled that valve 300, in moving to its downward position, transfers control of the integration control unit from valve 296 to neutralizing valve 337 whereupon left end point 260 of the stroke control lever 258 is restored to its neutral position. Thus, it will be seen that displacement of limit stop valve 270 from its neutral position not only serves to decelerate the gun for limit stop operation but also serves to effect neutralization of the integration control unit. Suitably, cam follower 396 (FIG. 3d) is adjusted to effect neutralization of the integration control unit only when valve 270 is displaced sufficiently to cut off control by the stroke control valve 263. When valve 270 is in line-to-line position with ports for conduits 266 and 268, switch 397 may be closed again to ready the integration control unit for response to gun orders corresponding to movement of the gun out of the lower limit stop. Such gun orders would result in downward movement of valve 263, uncovering the port for conduit 268 carrying tank pressure and thereby upsetting the line-to-line balance of valve 270 in favor of control of the tilting plate displacement by valve 263. Correspondingly for balance of valve 270 in the upper limit stop, the upper and lower lands of valve 270 are in line-to-line relation with the ports for conduits 267 and 271. A gun order requiring the gun to depress then produces upward movement of valve 263 porting conduit 266 to pressure $P_1$. The rise in pressure in the lower chamber of valve 270 then produces an unbalanced condition which is communicated to the stroking pistons to cause downward movement of the valve. Thus, in either case of a gun order tending to move the gun out of a limit stop, the limit stop valve 270 is unbalanced from its line-to-line position in a direction tending to restore control to the tilting plate stroke control valve 263. On the other hand, a gun order tending to move the gun further into a limit stop is ineffective.

*Elevation Interference Elimination Mechanism*

The interference elimination mechanism functions to prevent the gun from hitting any of the ship's structure. In elevation, the mechanism serves to prevent depressing the gun into an obstruction. To avoid training into an obstruction, the interference elimination mechanism serves to elevate the gun sufficiently to train over the obstruction and then to return the gun to the elevation required by the gun order. Normally, two zones of interference are required, commonly referred to as the Able and Baker interference zones. Conveniently they extend the same fixed angle above the lower elevation limit but through different training arcs, although provision may be made for multiple height zones, if desired. To coordinate control of the gun in train and elevation for smooth training over an interference zone, the interference elimination mechanism includes portions associated with both the elevation control system and the training control system.

Considering only those portions which are associated with the elevation control system, the position of the gun in elevation in relation to the Able and Baker interference zones is detected by switch 406 (FIGS. 3a and b) which is opened by cam follower arm 407 when cam 408 is rotated by the B-end response train 123 so that its raised portion 409 engages the follower. At the point in the B-end response train 123 with which the cam 408 is co-rotative, its rotation is in 1:1 relation with the angular position of the gun in elevation. Accordingly, the arcuate extent of the raised portion 409 represents the height of the interference zone. Assuming that the azimuth position of the gun corresponds with an interference zone, either of switches 410 or 411, (FIG. 3a) associated with the training control system will be open. Opening of switch 406 interrupts current supplied by electric source 219 to relay 412, thereby opening relay contacts 413. As relay contacts 413 are in a series circuit between source 219 and a solenoid 415 (FIG. 3b) serving to control valve 418, de-energization of solenoid 415 is seen to result from movement of the gun into an interference zone. Depending upon the velocity of the gun, a proportionately large lead angle is required through which the gun may be decelerated short of entry into the interference zone. To provide the necessary anticipation, switch 420 (FIG. 3a) in series with switch 406 is arranged for actuation by cam follower 421 (FIG. 3c) in response to the contour of cam 422. As may be seen in FIGS. 3c and 3d, cam 422 is co-rotatively secured to shaft 359 for rotation in accordance with the elevation angle, less a lead angle proportional to the displacement of cam 383 and hence proportional to the angular velocity of the gun. Cam 422 has a raised portion 423 positioned correspondingly to the raised portion 409 of cam 408 (FIG. 3b) but such raised portion 423 serves to open switch 420 before switch 406 is opened, in accordance with the required lead. A further switch 425 (FIG. 3a) in series with switches 406 and 420 serves to hold the solenoid 415 de-energized as long as the interference elimination mechanism is in operation. To this end, switch 425 is arranged to be opened by cam follower linkage 426 (FIG. 3d) whenever plunger 390 is moved downwardly from its neutral position. As downward movement of plunger 390 corresponds to entry of the gun into the lower limit, it may be stated that switch 425 is opened whenever the gun is in the lower limit, thereby to prevent premature termination of the interference eliminating operation.

The interference elimination mechanism operates in conjunction with the limit stop mechanism to establish an effective lower limit stop in the interference zones displaced a fixed angle above the regular lower limit. To actuate the limit stop mechanism for this purpose, valve 418 (FIG. 3b) is biased by a spring 428 to move upwardly when solenoid 415 is de-energized and releases its plunger 429. When the upper land of valve 418 moves upwardly to an underlapped position with respect to the controlled port, hydraulic fluid in conduit 240 at pressure $P_1$ is placed in communication with the lower face of piston 363 via conduit 430. Since the upper face of piston 363 is ported to atmospheric pressure through conduit 432, application of $P_1$ pressure via conduit 430 forces piston 363 upwardly against upper limit sleeve 434 in the piston chamber. As the point at which upward movement of piston 363 is arrested determines the elevation of the gun in traveling over or stopping above the interference zones, the length of sleeve 434 is preferably selected in accordance with the minimum necessary height of the interference zones. Acting through plunger 436, piston 363 forces rack 361 upwardly, thereby to rotate spider 355 in the direction contrary to the arrow, that is, counterclockwise.

The resulting operation of the limit stop mechanism is substantially identical to that which occurs when a lower limit stop is encountered. That is, end gear 354 rotates pin 366 counterclockwise forcing the slotted end of limit stop lever 367 downwardly until valve 270 is placed in control of the stroking pistons 272, 273. By this control, the gun is decelerated at a maximum rate to come to rest at the upper limit of the interference zone. Limit stop cam 383 again provides a lead angle corresponding to the velocity at which the gun is depressed to allow a sufficient arc for deceleration of the gun. The rate input to the limit stop lead cam 383 is in the same sense as in the above-described operation upon encountering a lower limit stop. That is, movement of the cam 383 follows clockwise rotation of the stroke response shaft 279 until communication of the large stroking piston 272 with tank pressure is cut off by upward movement of valve 270 with plunger 390. Just as in the case of the lower limit stop operation, the gun is free to train in this case, however, along the upper bounds of an interference zone. The elevation control system likewise is conditioned for immediate response to an elevation gun order which requires raising of the gun.

The interference elimination not only serves to prevent depressing the gun into an interference zone but also serves to raise the gun to the upper limit of an interference zone as the gun is trained through the azimuth angle of the zone. As an example, consider training of the gun sidewise toward interference zone B. While switches 410 and 411 are closed because the gun is not in the Able interference zone, switches 438 and 439 (FIG. 3a) open in anticipation of entry of the gun into the interference zone. Like switch 411 for the Able interference zone, switch 439 for the Baker interference zone is the first to open, since it is operated by a cam (described hereafter) moved in accordance with a suitable lead angle in advance of the azimuth position of the Baker interference zone. When switch 439 opens, switch 406 being opened due to depression of the gun below the height of the Baker interference zone, relay 412 is caused to de-energize solenoid 415, thereby to place hydraulic fluid at pressure $P_1$ in communication with piston 363. Upward movement of piston 363 in response to the pressure acts through rack 361 and pinion 360, and differential 353 to stroke valve 270 downwardly and serves, not to decelerate the gun, but to accelerate the gun upwardly at a maximum rate. As the A-end is stroked to increase the elevation velocity, the valve 270 is raised and valve sleeve 269 moves down. Then elevation is decelerated at a maximum rate until the gun is stopped at the upper limit of the Baker interference zone. Stopping occurs as the tilt plate returns to neutral and valve 270 is stroked downwardly to its balanced position. Raising of the gun to the upper limit in most instances occurs so rapidly that the gun need not be fully decelerated in azimuth but may continue to train along the upper limit of the Baker interference zone until the gun has trained just clear of the zone. At this instant, relay 412 is energized by closure of switches 410, 411, 438 and 439 to force valve 418 downwardly by operation of solenoid 415. With removal of hydraulic fluid at pressure $P_1$ from the lower face of piston 363, the gun is free to depress into correspondence with the elevation gun order and to continue training beyond the Baker interference zone. While traversing an interference zone along its upper limit, oscillation of the gun in elevation due to opening and closing of switches 406 and 420 is prevented by opening of switch 425 in response to any downward movement of valve plunger 390.

Elevation Starting and Stopping Mechanisms

In order to safeguard equipment and personnel, starting of electric motor 40 is precluded under certain conditions such as when the correct auxiliary pressures of hydraulic fluid are not available, under sustained overload conditions, when the B-end brake 440 is manually released, and when the hatch to the gun turret is not closed. Switches responsive to these various conditions may be appropriately connected in series with a starting switch 441, limit stop range switch 442 and solenoid 443 for controlling the main power relay 444 serving to connect electric motor 40 with a suitable 3-phase power supply 445 (FIG. 3d). The range switch 442 is normally closed but is opened when cam follower 447 engages the raised portion of cam 448 which is co-rotative with shaft portion 449 of shaft 364 on which cam 370 is carried. Cams 448 and 370 may have identical contours whereby normally closed switch 442 remains closed only when disengaged by actuator 447 and when the dwell of cam 370 defined as the minor arcuate distance betwen shoulders 371 and 372 is positioned in latch receiving adjacency to the latch 373. Accordingly, switch 442 provides assurance that the electric motor 40 wil not be started when the limit stop mechanism is outside its correct operating range.

The B-end brake 440 (FIG. 3d) is energized from an an electric power supply 450 when the elevation stowing pin (not shown) is secured to close switch 451. Setting of brake 440 closes a holding switch 452, the holding action of which is dependent upon closure of either switch 453 or 454 in parallel with one another and in series with switch 452. Switch 453 is closed when the A-end tilt plate 265 is off of neutral. Switch 454, on the other hand, is closed by cam follower 455 (FIG. 3c) when dwell 456 of cam 457, which is angularly positioned to correspond with the neutral position of rotary piston 228, does not receive the cam follower 455. This latter condition corresponds with the rotary piston 228 being off of neutral. Hence the B-end brake 440 can not be released except when the control system is neutralized.

In addition to the B-end brake, a limit stop brake 455' is provided (FIG. 3c) which utilizes the limit stop mechanism to prevent the gun from moving. The brake 455' includes a drum 456' co-rotatively secured to shaft 359 and a shoe 457' slidably but non-rotatively supported by collar 458 and resiliently urged into braking engagement with the drum 546'. To release the brake, forked operating lever 459 pivoted at 460 may either be manually actuated against the bias spring by arm 461 or electrically actuated by a solenoid 462. The limit stop brake 455' is normally released by energization of solenoid 462 through switches 463, 464 in series with power supply 456. Switch 463 may suitably be arranged to open when a power failure occurs likely to produce erroneous gun responses, while switch 464 may be opened to set the brake when the valve block is urged to remove entrained air. It will be appreciated that the limit stop brake 455' functions just as though the lower and upper limit stops were engaged simultaneously to resist movement of spider 355 in either direction. In consequence, the gun is locked against elevating or depressing.

*Elevation Regulator Characteristics*

Figure 6:
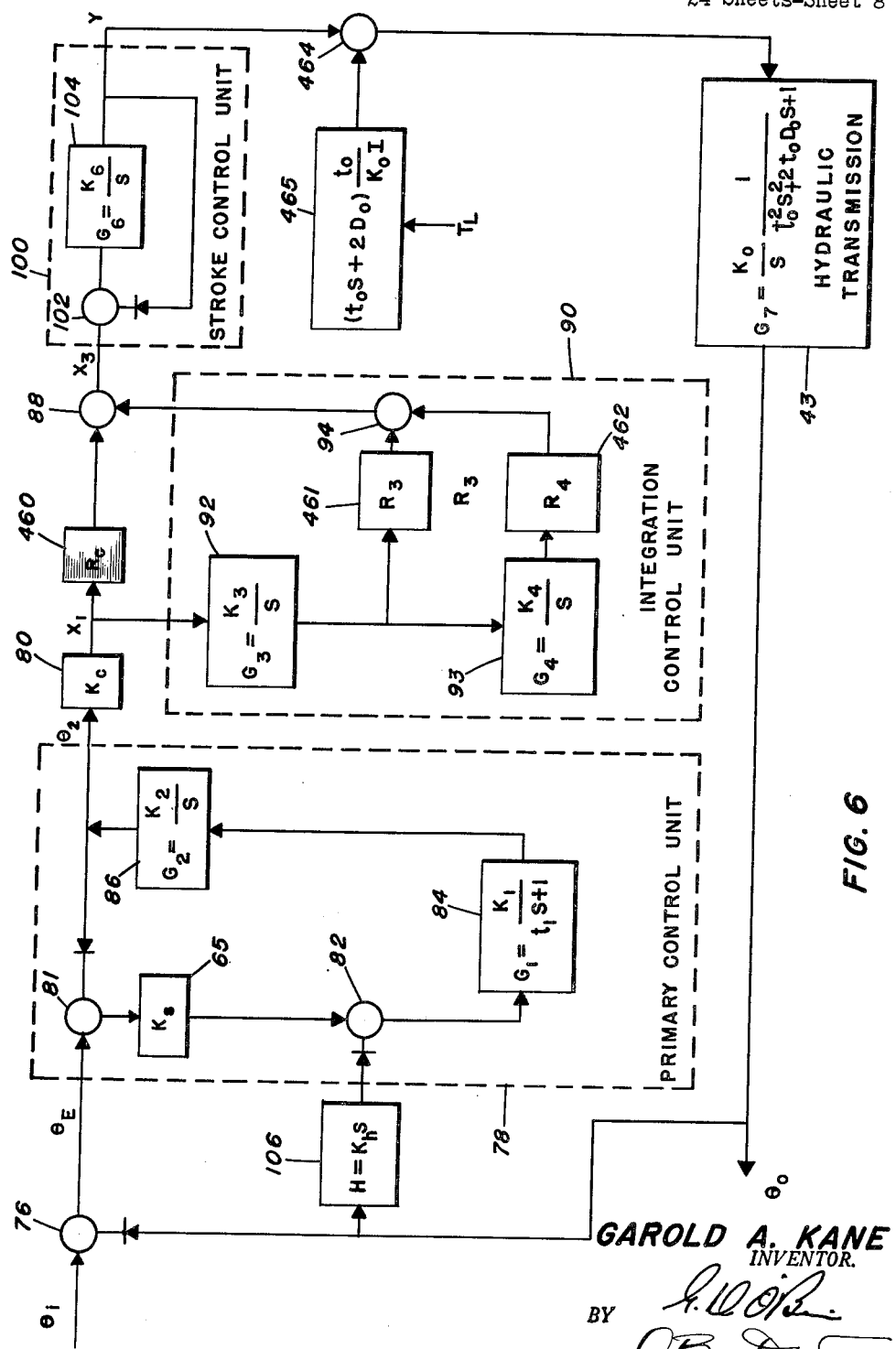
FIG. 6 is a block diagram, similar to FIG. 2, but representing the transfer functions of various components of the control system.

While the operational relationships betwen the various components have been described in conjunction with the foregoing structural description, for those skilled in the art the operation is more succinctly characterized mathematically in terms of the transfer functions $G(s)$ and $H(s)$ for the control and feedback elements, respectively, of the system. Referring now to FIG. 6, which for convenience of comparison is laid out similarly to FIG. 2, blocks representing the elements are labeled with their transfer functions expressed as Laplace transforms in which $s$ is the complex operator. Reference is made to such text books as "Transients in Linear Systems" by Gardner and Barnes, published in 1942 by John Wiley and Sons, and "Servo Mechanisms and Regulating System Design" by Chestnut and Mayer, published in 1951 by John Wiley and Sons, Inc., New York, for a full and complete discussion of Laplace transforms and transfer functions expressed in Laplace transform notation.

The elevation gun orer signal $\theta_i$ developed as the angular rotor position of 1X and 36X synchro generators 112, 113 is differenty combined in the respective 1X and 36X synchro control transformers 120, 121 with the output signal $\theta_o$ developed as an angular position of the synchro stators by the B-end response gear train 123, this differencing operation being indicated symbolically at 76. To establish correspondence between the angular position $\theta_2$ of the cam 80 and the error signal $\theta_E$, primary control unit 78 applies the difference $\theta_E$ minus $\theta_2$ derived from the synchros 120, 121 (represented at 81) to the servo amplifier 65. The difference signal is amplified linearly by a gain $K_s$ and combined differentially at 82 with the negative output rate feedback signal derived from tachometer 106. The transfer function H of the tachometer 106 is $K_h s$. The amplified difference signal reduced by the amount of tachometer feedback actuates the torque generator 200 to control displacement of the rotary piston 228 as an integral function of the signal applied to the torque motor. The introduction of a phase lag by the torque motor is represented in block 84 by the transfer function $$G_1 = \frac{K_1}{t_1 s + 1}$$

where the time constant $t_1$ may, in a preferred embodiment, be 0.005 second. The integrating characteristic of the rotary piston 228 under control of rotary valve 210 is represented in block 86 by the transfer function $G_2 = K_2/s$. The overall transfer function $G_E$ which expresses the relationship between $\theta_E$ and $\theta_2$ is (1) $$\frac{1}{t_1 t_2 s^2 + t_2 s + 1}$$

while the transfer function $G_b$ relating the signal $\theta_2$ to the tachometer feedback signal is equal to $$\frac{1}{Ks} G_E$$

The signal $\theta_2$ derived from the primary control unit 78 is, for small errors, subject to a linear translation effected by cam 80, whereby displacement of the center point 257 of the stroke control lever 258 expressed as $x_1$ equals $K_c \theta_2$. A linear relationship in accordance with the law of the lever exists between the displacement $x_1$ of the center point 257 and displacement $x_3$ of the right end point 261, the proportionality being expressed by the coefficient $R_c$ (block 460).

The displacement $x_1$ of the center point 257 also constitutes an input to the integration control unit 90 by effecting a proportional displacement of integration control valve 296. In consequence, piston 302 is displaced as an integral function of the center point displacement, represented in block 92 by the transfer function $G_3$ equaling $K_3/s$, while the displacement of piston 302 acting through the locked column 306 of hydraulic fluid serves to displace the left end point 260 of stroke control lever 258. The corresponding displacement of the right point 261 of stroke control lever 258 is related to displacement of piston 302 by the ratio $R_3$ represented in block 461. Displacement of piston 302 further serves through linkage 307 and valve 309 to lengthen or shorten the locked column 306 of hydraulic fluid in accordance with an integral function of the displacement. This second integration is represented in block 93 by the transfer function $G_4$ equaling $K_4/s$. Change in the dimension of the locked column is related to displacement of the right end point 261 by ratio $R_4$ represented in block 462. Summation of the integral displacements in unit 94 with the direct displacement at unit 88 is thus accomplished, in fact, by the stroke control lever 258.

Plunger 262 and sleeve 269 of valve 263 are represented symbolically by differencing means 102. The displacement of the plunger in accordance with displacement $x_3$ of right end point 261 produces a rotation of the tilting plate 265 by stroking pistons 272, 273 as an integral function of the difference in position of the plunger 262 and sleeve 269. This integral function is represented in block 104 by the transfer function $G_6$ which is equal to $K_6/s$, the feedback loop indicated schematically as extending about the block 104 representing the mechanical feedback through stroke response shaft 279 and link 281. The output Y of the stroke control unit 100, which is the displacement of the stroking pistons, is represented schematically as applied to summing means 464. To this summing means 464 the torque $T_L$ is effectively coupled by means represented in block 465 as having the transfer function $$(2) \quad (t_o s + 2D_o)\frac{t_o}{K_o I}$$

where $t_o$ in the preferred embodiment is 0.01 second, $D_o$ is 0.30, $K_o$ is 240 radians per second per inch, and in the same application $I$ is 0.6 slug feet.² This schematic representation of a separate input for load torque $T_L$ corresponds with the effect of the load reflected into the hydraulic transmission 43. This transfer function is seen to include a linear term and a time derivative term, the linear term being dominant. The combined effect of the load torque and the stroking of the tilt plate 265 is applied to the hydraulic transmission 43 which is represented as having a transfer function $G_7$ equal to $$(3) \quad \frac{K_o}{s} \frac{1}{t_o^2 s^2 + 2 t_o D_o s + 1}$$

account being taken of the compressibility of the hydraulic fluid. From the hydraulic transmission is then derived the output signal $\theta_0$ corresponding to the angular position of the gun in elevation.

From the block diagram, FIG. 6, to those versed in the art it may be seen that the complete system transfer function, including the feedback loop is, for $T_L = 0$, $$\frac{\theta_o}{\theta_E} = \frac{G_8}{1 + G_8 \frac{K_h s}{K_s}}$$

where $$G_8 = \frac{K_o K_c R_c}{s^3} \frac{1}{t_1 t_2 s^2 + t_2 s + 1} \frac{1}{t_o^2 s^2 + 2 D_o t_o s + 1}$$

$$\frac{1}{t_6 s + 1} \frac{s^2 + \frac{R_3}{R_c} K_3 s + \frac{R_4}{R_c} K_3 K_4}{1}$$

and where $$t_2 = \frac{1}{K_s K_1 K_2} \text{ and } t_6 = \frac{1}{K_6}$$

Typical numerical values are the following:

$K_o = 240$ radians per second per inch
$K_1 = .005$ radian per volt
$K_2 = 5000$ sec.⁻¹
$K_s = 8$ volts per radian $$\frac{R_3}{R_c} K_3 = 3.2 \text{ sec.}^{-1}$$

$$\frac{R_4}{R_c} K_3 K_4 = (3.2)^2$$

$R_c K_c = .0833$ inch per radian
$K_h = .02$ volt per radian per second
$t_o = .01$ second
$t_1 = .005$ second $$t_2 = \frac{1}{K_1 K_2 K_s} = .005 \text{ seconds}$$

$t_6 = .005$ second
$D_o = 0.30$

Elevation OMC System

For certain operations such as starting and stowing a gun, exercising, practice drill, testing, and controlling the gun under emergency conditions when director gun orders are not available, the gun may be positioned in accordance with signals derived from the one-man-control unit 36 (FIGS. 1, 3a and 7) located within the gun house 34. Included with the one-man-control unit in either the left or the right local control station are a telescope and a target acquisition sight (not shown) with which the operator may determine the required amount and sense of the control effort to be applied to the gun.

Figure 7:
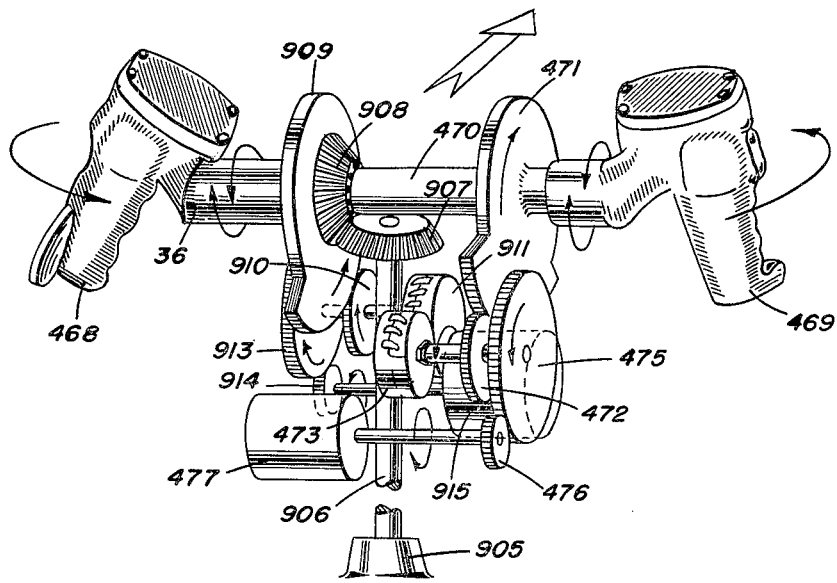
FIG. 7 is a diagrammatic view of a one-man-control unit for the gun laying system of FIG. 1.

The control unit 36, as illustrated in FIG. 7, comprises left and right hand grips 468 and 469 co-rotatively secured to a horizontal shaft 470 which may be journaled in a suitable casing (not shown). Rotatable with the hand grips and shaft 470 is a gear 471 meshing with gear 472 for driving an elevation control potentiometer 473 in proportion to rotation of shaft 470 about its own axis. Through a gear 475 co-rotative with gear 472 and meshing with gear 476, an elevation tachometer 477 is driven at a rate corresponding to the rate of rotation of hand grip shaft 470 about its own axis. Other portions of the control unit 36 are related to the train OMC system and will be described under that heading.

Referring now to the circuit diagram of FIG. 3a, the control unit 36 is indicated within dotted lines as including the potentiometer 473 and the tachometer 477. The potentiometer 473 is connected across a secondary winding of transformer 479, the primary winding of which is connected to an A.C. source 480 such as a source of 60 cycle current. In order that the potential wiper 481 of potentiometer 473 may be zero at its mean position, center tap 482 of the secondary winding is connected to ground by conductor 483. Depending upon the direction in which hand grips 468, 469 are rotated to raise or depress the gun, the potential developed between the wiper 481 and ground will be of one phase or an opposite phase. The arrows shown in FIG. 7, it may be noted, represent the direction of rotation for depressing the gun (and training left).

Wiper 481 of potentiometer 473 (FIG. 3a) is connected by conductor 485 to mid tap 486 of another secondary winding for transformer 479. Across this secondary winding is connected a potentiometer 487 having a wiper 488 connected through switch 489 by conductor 490 to one terminal of a potentiometer 491, the other terminal of which is grounded. As seen in FIG. 3d, the wiper 488 of potentiometer 487 is driven by gear rack 492 formed on the upper end of plunger 262 and in mesh with driven gear 493. Since movement of plunger 262 is directly proportional to stroking of the A-end tilting plate 265, potentiometer 487 may be referred to as the stroke response potentiometer. Potentiometer 487 then develops a potential difference between wiper 488 and mid tap 486 which is proportional to the velocity of the gun in elevation, the phase of this potential difference being determined by whether the velocity occurs in raising or depressing the gun.

To achieve the desired local control of the gun, the stroke control potentiometer 473 and stroke response potentiometer 487 are connected so that the speed in elevation of the gun is proportional to the rotation of hand grips 468, 469 about shaft 470 from their mean position. This is achieved by controlling the position of wiper 488 in a sense resulting in substantially a zero potential difference applied via conductor 490 to the input of servo amplifier 65. To complete this input connection, tap 495 of potentiometer 491 is connected through resistors 496 and 497 in series to relay contact 162 which is selectively coupled by relay 150 to the input stage 165, 170 of the amplifier. When the one-man-control unit 36 is in operation, switch 489 is closed and order signal switch 111 (FIG. 3b) is opened. Since there is, therefore, no signal applied to the control grid of tube 141, the relay 150 is in its de-energized state affording connection between contact 162 and the control grid of tube 165. Energization of the servo amplifier 65 by an error signal representing the difference between the stroke control signal and the stroke response signal results, as was the case with the elevation remote control system, in production of a torque by the torque generator 200 serving to control the positioning of rotary cam 80 and of valve 263, eventually to control stroking of the A-end 42. While displacement of rotary cam 80 under remote control serves to introduce integral compensation from the integration control unit, in local operation the integration control unit is neutralized. This is accomplished by opening of switch 498 (FIG. 3b) in the energizing circuit of solenoid 398 whenever the control system is switched to local operation. Just as with switch 397 responsive to limit stop operation, opening of switch 498 de-energizes solenoid 398 to allow valve 400 to be moved by spring 402 to its upper position. In this upper position, hydraulic fluid in conduit 240 at pressure $P_1$ is placed in communication through conduit 404 with the upper face of valve 300 to force such valve to its lower position whereupon control of the integration control unit is transferred from valve 296 to neutralizing valve 337. Movement of valve 263 is therefore directly proportional to movement of center point 257 for stroke control lever 258 in response to positioning of rotary cam 80.

From the tachometer generator 477 is derived a D.C. signal which is called aided tracking or the aided tracking signal. Since this aided tracking signal is generated by the tachometer in response to rotation of the hand grips about their horizontal axis, the aided tracking signal is proportional, not to the required speed of the gun in elevation, but to the required acceleration of the gun in elevation. The sense in which this aided tracking signal is applied to the servo amplifier 65 is such as to aid the local control station operator by imparting to the gun a lead angle for tracking a target.

Since the tachometer generates a D.C. signal which is supplied across the terminals of potentiometer 500, converter means are employed to derive a corresponding A.C. signal for amplification in the A.C. amplifier 158. Thus, that portion of the tachometer output picked off by the wiper of potentiometer 500 is supplied through double pole switch 501 via conductors 502, 503, conductor 502 connecting with reed 504 of converter 505 having the usual A.C.-energized coil for vibrating the reed 504 between alternate contacts. These alternate contacts of the converter 505 are connected to respective terminals of a potential divider 507, the mid-tap of which is connected by conductor 508 to one terminal of the tachometer 477. In accordance with the operation of convertor 505, there is developed across potential divider 507 an A.C. aided tracking signal representing an adjusted proportion of the tachometer output. This A.C. aided tracking signal is applied across resistor 496 in suitable phase relation to the error signal tapped off potentiometer 491 by wiper 495.

In operation, the local control station operator rotates hand grips 468, 469 in either the depressing or elevating direction by an amount displaced from their neutral position corresponding to the speed at which the gun must elevate to remain on target. If the hand grips are rotated to depress the gun at increasing rates of speed, lagging of the gun in elevation behind the target being tracked is minimized by the addition of the aided tracking signal to the error signal. That is, the aided tracking signal increases the stroking of the A-end tilting plate beyond that required by the error signal by an amount proportional to the rate of rotation of the hand grips to obtain the required vertical acceleration of the gun. When the direction of hand grip rotation is reversed, the aided tracking signal is reversed, corresponding to decleration of the gun.

*Train Regulator*

Simultaneously with positioning of the gun in elevation, the gun laying system of this invention serves to move and position the gun in azimuth in accordance with a gun train order. Referring to FIG. 1, it will be recalled that the gun 30 rotates about trunnions 31 in response to the gun elevation order, while the entire gun mount including the gun and gun house 34 rotates relative to the training circle 57 in response to gun train orders. Consequently, the rotational inertia in training may be approximately 4 times as great as in elevating. Because of this increased inertia in training, the compliance or torsional strain in the hydraulic transmission and gearing and shafting between the B-end output shaft of the training gear assembly and the mount structure tends to result in a lag in the position of the gun in training behind the gun train order. The train regulator serves to overcome this lag by derivative compensation and is also modified in relation to the elevation regulator to handle the higher power of the training gear assembly. A further modification is required to provide, in an exemplary embodiment, a total rotation of 720 degrees in train, that is, a complete rotation in either direction from the normally stowed position.

Referring now to FIG. 8, which is a block diagram representation of the train control system similar to the diagrammatic representation of the elevation control system in FIG. 2, the input signal $\theta_1$ is shown applied to differencing means 510. Applied to the differencing means 510 in opposing relation is the output signal $\theta_o$ representing positional feedback from the B-end response gear train. From the differencing means 510 is derived the system error signal $\theta_E$ which is applied to a second differencing means 512. As in the diagram of FIG. 2, the symbols $e$, $m$, and $h$ are associated with the arrows representing the direction of energy flow to indicate, respectively, the electrical, mechanical or hydraulic character of the energy transmitting medium.

Differencing means 512 may be considered a part of the train primary control unit 513 and serves to develop an error signal $\theta_p$ representing any lack of correspondence between the position of cam 515 and the system error signal $\theta_E$. The desired positional correspondence is, however, modified by introduction of inverse tachometric feedback in the cam positioning control loop of the primary control unit 513. A B-end tachometer 516 is responsive to the positional output signal $\theta_o$ to apply its electrical signal output to the differencing means 517 to which the primary control error signal $\theta_p$ is applied. The diminished error signal is applied in electrical form to an assemblage 518 including train servo amplifier 70 and a torque motor to derive a mechanical output for operating hydraulic means 519 including rotary valve 520. Valve 520 hydraulically controls movement of rotary piston 521 which serves mechanically to position cam 515 and also to supply an inverse feedback signal to the differencing unit 512. The automatic control loop of the primary control unit for positioning the cam 515 is thus of the closed type, similar to the control loop of the elevation primary control unit 78 (FIG. 2).

Because of the larger inertia of the gun in training than in elevation, first and second derivative compensation is provided in the train control system by a compensator unit 522. The input to compensator unit 522 from primary control 513 is derived from a quantity of hydraulic fluid flowing to or from rotary piston 521 of hydraulic means 519 in primary control unit 513, which provides a mechanical output quantity which is related by proportionality constant $R_1$ to the mechanical position of cam 515. This relationship is shown graphically by the additional usage of reference character 521 in compensator unit 522. This flow of hydraulic fluid establishes a pressure differential, as represented by differencing means 529, effective to develop in piston 523 a mechanical effort to displace valve 524. Hydraulic fluid controlled by valve 524 displaces piston 525 which in turn mechanically displaces valve 526. The output effort of piston 523 also displaces a valve 527. In summing means 528, hydraulic fluid controlled by valves 526 and 527 is combined for degenerative application to differencing means 529. At the same time, the mechanical outputs of pistons 523 and 525 representing, respectively, error acceleration and error rate are combined in summing means 530 for application to summing means 531 as a compensation signal. The functioning of the compensation unit 522 will be better understood by reference to the description hereafter of a practical embodiment wherein a single piston valve 527 also serves the functions of summing means 528, piston 523 and valve 524, while piston 525 is incorporated in piston valve 526.

In the summing means 531, the compensation signal is combined with a signal representing the position of cam 515 to form an input signal to which secondary control unit 532 is responsive, this input signal being applied to differencing means 533 in the secondary control unit. Secondary control unit 532 serves essentially as a mechanical amplifier incorporating inverse feedback in its control loop. In the forward transmission path of the control loop, the secondary control unit has an assemblage 534 including a valve and also a valve sleeve, mechanical positioning of which sleeve constitutes the output of the stroke control unit. The signal represented by the position of this valve sleeve is applied to summing means 537 in the feedback loop which introduces negative feedback to the differencing means 533. The feedback control loop thus completed ensures correspondence of the mechanical output of the secondary control unit with its input, except as modified by the signal derived from the integration control unit 538.

This integration control unit 538 includes a valve and piston assemblage 539 responsive to the positional output of summing means 537 to transmit to a valve 540 a mechanical signal representing the first integral of its input and to transmit to summing means 541 a hydraulic signal also representing the first integral. A hydraulic signal derived from valve 540 and representing the second integral is combined in summing means 541 with the signal representing the first integral to correspondingly displace a piston 542 serving mechanically to introduce the integral compensation signal to the summing means 537 in the secondary control unit 532. In this manner, the integral compensation signal is introduced into the negative feedback loop of the secondary control unit.

From the secondary control unit 532 is derived a mechanical signal representing the desired velocity of the gun in training, which is supplied to stroke control unit 545. Stroke control unit 545 also serves as a mechanical amplifier and functions to adjust the stroke of the A-end 52 of the train hydraulic transmission 53. To insure correspondence between the input and output of stroke control unit 545, it includes a negative feedback loop, the negative feedback signal being applied together with the input signal to differencing means 546. From the means 546 is derived a mechanical signal which is applied to an assemblage 547 including a stroke control valve and stroking pistons.

The train hydraulic transmission 53 serves to drive the gun mount or load in training at a velocity determined by stroking of its A-end and from the output of the hydraulic transmission is derived the B-end response output signal $\theta_o$.

*Train Primary Control Unit 513*

Broadly, the train primary controller resembles the elevation primary controller in comprising a synchro system, a servo amplifier, a D.C. torque generator, a rotary valve and a rotary piston coupled in that order to adjust the position of a non-linear cam in accordance with the error between the gun train order and the position of the gun mount in train. Like the elevation control system, the train control system has its primary control unit arranged to receive signals from the remote fire control director 60.

Figure 9A:
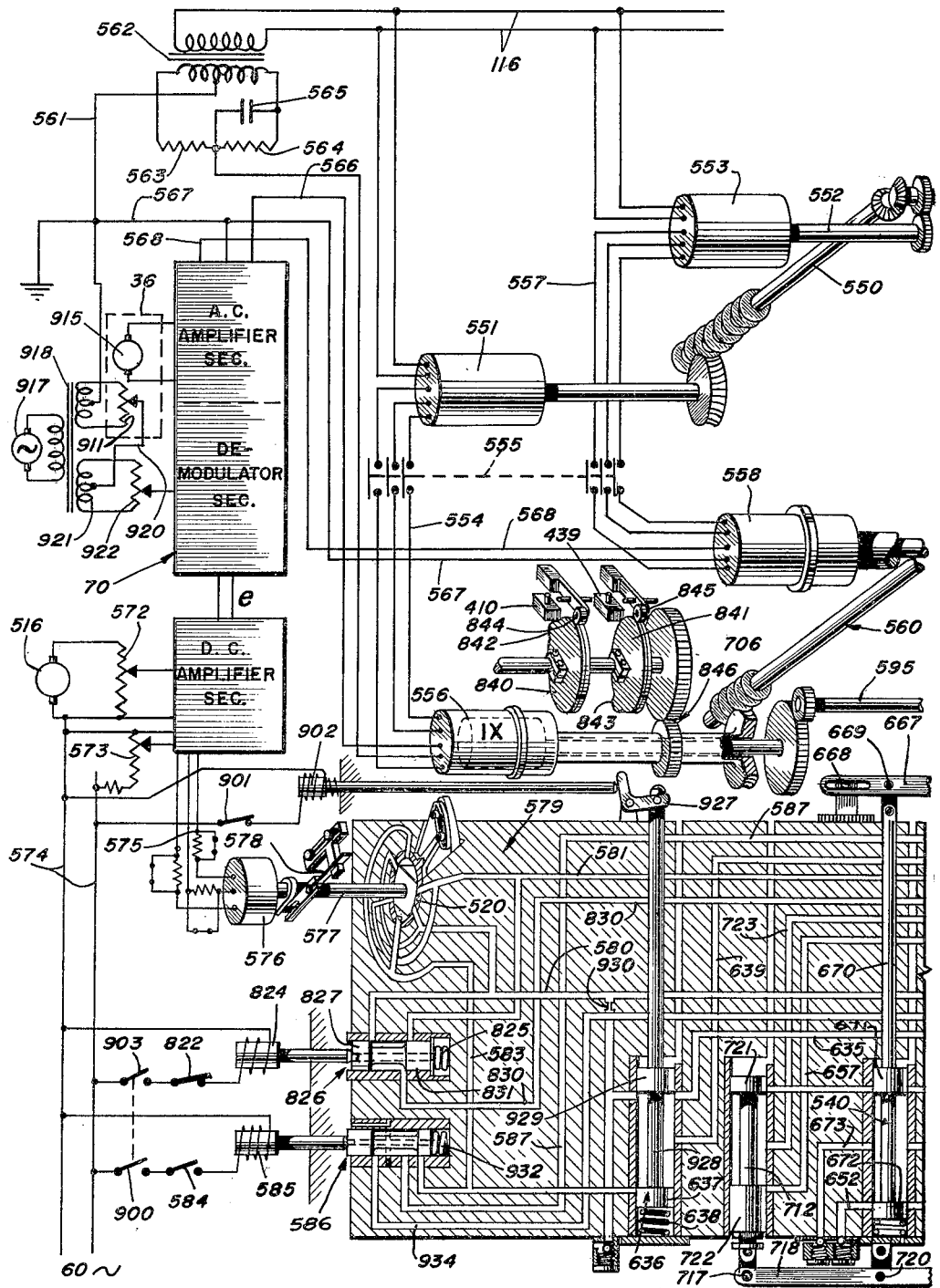
FIGS. 9a, 9b and 9c are a schematic diagram of the train control system.
Figure 9B:
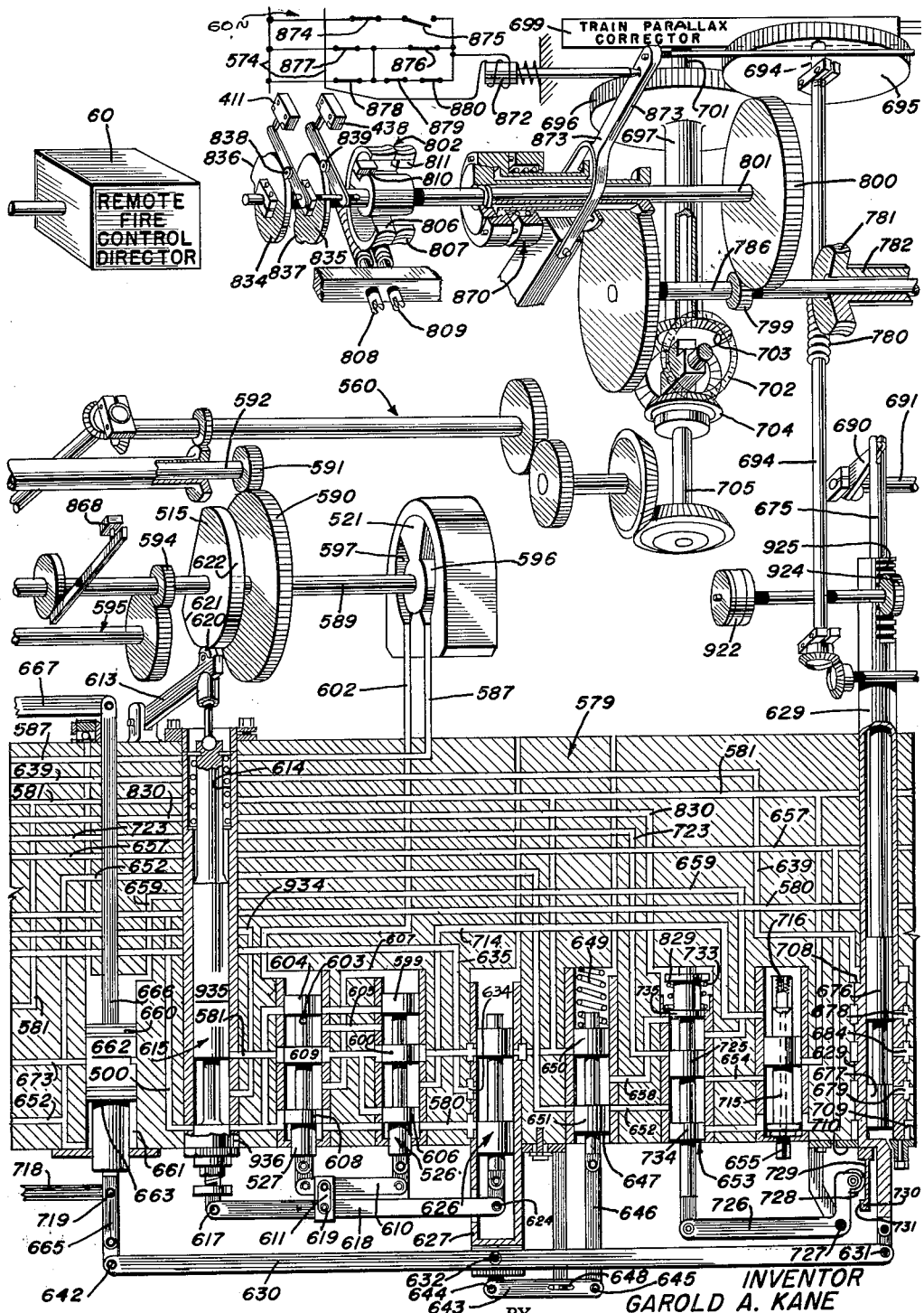

Referring now to FIGS. 9a and 9b, director 60 is mechanically coupled by 36:1 worm and worm wheel gear train 550 to the rotor of 1X synchro generator 551 and by 1:1 gear train 552 to 36X synchro generator 553. The rotors are electrically energized from a suitable power supply, such as a 60 cycle power line 116. Thus, a course gun order signal may be derived from synchro generator 551 and a fine gun order signal from generator 553. A three wire line 554 connects the stator of synchro generator 551 through switch 555 to the stator of a one speed synchro control transformer 556, while a three wire line 557 connects the stator of synchro generator 553 to the stator of 36-speed synchro control transformer 558. In further similarity to the elevation primary control unit, the switch 555 is closed for response to the fire control director 60, but is otherwise opened to open both synchro circuits.

The stator of the one speed synchro control transformer 556 is rotated in 1:1 correspondence with the position of the gun in train by means of B-end repsonse gear train 560. This same gear train 560 drives the stator of 36 speed synchro control transformer 558 at a 36:1 speed ratio. The rotors of the respective synchros 556 and 558 are driven at a 1:36 speed ratio in response to positioning of the cam 515 by rotary piston 521. Considering only the one-speed synchro 556 as exemplary of both synchros, the phase displacement of the electrical signals received from the synchro generator 551 representing the train gun order and the mechanical positioning of the stator by negative B-end response feedback via the gear train 560 serve differentially to displace relative to a fixed reference frame the magnetic field which induces a potential in the rotor of synchro 556. This differencing action corresponds with the function of differencing means 510 of FIG. 8. In accordance with the difference between this displacement of the magnetic field and the displacement of the rotor by negative feedback from the rotary piston 521, an electrical potential is induced in the rotor of synchro 556 which represents the $\theta_p$.

As is well known, the potential derived from a synchro control transformer which is dependent upon the training of a gun through a circle is subject to ambiguity at an angle displaced 180 degrees from the correct training angle. To avoid this ambiguity, which is known as "stick-off," a fixed bias signal, known as the anti-stick-off voltage is added to the potential derived from the one speed synchro of such magnitude that the signals from the one and 36-speed synchros vary in the same direction in the vicinity of zero degrees and 180 degrees. More particularly, an anti-stick-off voltage is supplied which causes the one speed synchro to produce a zero voltage at zero degrees and at 175 degrees, with the one speed stator shifted 2½ degrees with respect to the 36-speed stator. To introduce the anti-stick-off voltage with the correct phase, an anti-stick-off voltage supply circuit (FIG. 9a) is connected in series with the rotor of synchro 556 by conductor 561. A step-down transformer 562 connected to a suitable power supply such as line 116 provides the proper voltage between the mid-tap of the secondary winding and the mid-tap of a pair of potential dividing resistors 563, 564 connected across the secondary winding. To adjust the phase of the anti-stick-off voltage, the values of resistors 563, 564 are suitably selected, as is the capacitance of a capacitor 565 shunting resistor 564.

Conductor 566 connects the rotor of synchro 556 to the input circuit of the train servo amplifier 70 which is substantially identical to the above-described elevation servo amplifier 65. Conductors 567, 568 connect the rotor of 36-speed synchro 558 directly to ground and to the 36-speed input signal circuit for the amplifier 70. Whenever the gun is within 2½ degrees of the train gun order signal, it may be noted, the signal supplied the amplifier 70 from the 36-speed synchro 558 actuates the train control system.

The 1-speed or 36-speed signal, whichever is in control, is amplified in the A.C. amplifier section of the servo amplifier 70, detected in the demodulator section and the rectified version is further amplified in the D.C. amplifier section. Each of these sections may be identical to the corresponding sections of the elevation servo amplifier shown in FIG. 3a. In further similarity, inverse feedback from the tachometric generator 516 is adjustably coupled through potential divider 572 to the D.C. amplifier section to introduce the tachometer feedback signal degeneratively in the control loop of the primary control unit. A further variable potentiometer 573 couples an A.C. power supply such as 60 cycle line 574 to the D.C. amplifier section to introduce a dither signal serving to prevent valve sticking and to minimize lags.

By means of a three-wire line 575, the output of the servo amplifier 70 is supplied to torque generator 576, similar to elevation torque generator 200, to determine in approximately linear proportion the position of its output shaft 577 by overcoming the torque of bias spring 578.

The output shaft 577 serves to position rotary valve 520 in the train valve block 579, which may be arranged identically with rotary valve 210 in the elevation valve block 213. Thus, valve 520 is hydraulically underlapped to partially uncover ports communicating, respectively, with a source of $P_1$ pressure via conduit 580 and a return tank at zero pressure via conduit 581. In consequence, the pressure in line 583 connecting with the discharge ports for valve 520 is one-half the pressure $P_1$ or 200 p.s.i. when the valve 520 is in neutral position. A non-linear relationship exists between rotation of the output shaft 577 and the area of the circular ports uncovered by valve 520. The pressure in conduit 583 may, in accordance with such relationship be varied above and below 200 p.s.i. depending upon the signal applied by servo amplifier 70 to the torque generator 576.

When the train control system is responsive to gun orders from the remote fire control director 60, switch 584 is closed, energizing solenoid 585 from source 574 to move a two-position valve 586 for placing conduit 583 from valve 520 in communication via conduit 587 with the rotary piston 521. This train rotary piston 521 may be identical with the elevation rotary piston 228 and acts through shaft 589 to position not only the non-linear cam 515 but also gear 590 from which degenerative feedback is derived (FIGS. 9a and b). Such feedback is transmitted through gear 591 in mesh with gear 590 and coupled via shaft 592 with the rotor of 36-speed synchro control transformer 558. Degenerative feedback is also coupled from gear 594 on shaft 589 through gear train 595 to the rotor of 1-speed synchro control transformer 556.

*Train Compensator Unit 522*

While the pressure in piston chamber 596 with which conduit 587 communicates may vary under control of rotary valve 520 (FIG. 9a), the pressure in piston chamber 597 is regulated by the cooperative action of valves 526 and 527 (FIG. 9b). This pressure regulating function relates logically to the primary control unit 513 (FIGURE 8); the valves 526 and 527 also serve to generate a compensation signal which is introduced in the forward transmission path of the system. This compensation signal is substantially the sum of a signal proportional to the speed of the rotary piston 521 and a signal proportional to the acceleration of the rotary piston, valve 526 being moved to introduce the rate compensation signal and valve 527, the acceleration compensation signal.

Considering first the pressure regulating function, the upper surface of land 604 of valve 527 (FIG. 9b) is connected through conduit 602 to chamber 597 of rotary piston 521 and the effective lower surface of land 608 of valve 527 is connected to pressure $P_1$ in conduit 580. The effective area at the lower end of valve 527 is one-half the effective area at the upper end of valve 527 so that, in this respect, valve 527 is in part a two-to-one area piston. Hence, regardless of the motion of rotary piston 521, the pressure in chamber 597 remains at one-half the pressure $P_1$. If piston 521 rotates counterclockwise so that the volume in chamber 597 decreases, fluid would flow through conduit 602 into the uppermost chamber of valve 527 forcing valve 527 downward but, neglecting the small friction and inertia effect in valve 527, the pressure in chamber 597 would remain at one-half the pressure $P_1$. This condition would exist independently of the valve porting provided in valve 527 and 526 assuming no limit to the amount of travel possible in valve 527. The porting in these valves is provided so that it is not necessary to have unlimited travel in valve 527 and further to provide for the compensation signals to be introduced in the forward transmission path of the system.

To describe the arrangement of the valve porting and interconnections, let it be assumed that rotary piston 521 is accelerated counterclockwise to some fixed velocity value. As previously stated, valve 527 would initially move downward to accommodate the flow of fluid from chamber 597. It will be noted that this flow of fluid from chamber 597 may then, in part, flow through passage 603 in land 604 of valve 527 into the chamber between lands 604 and 609, and since valve 527 has then moved downward from its neutral position, the fluid in this chamber may then flow through the partially open port at the upper surface of land 609 to tank through conduit 581. Therefore, independently of the action, not yet described, of valve 526, valve 527 could move downwardly sufficiently far to accommodate the flow of fluid from chamber 597 through conduit 602 and passage 603 and through the partially opened port at the upper surface of land 609 to tank through conduit 581 so that an unlimited downward travel of valve 527 is not necessary to control the pressure regulating function.

To proceed further, it is necessary to understand the construction and control of valve 526. This valve is constructed so that its ends form a two-to-one area piston. The area of the upper surface of land 599 is twice the effective area of the lower surface of land 606. The lower surface of land 606 is exposed to pressure $P_1$ in conduit 580 so that the pressure which exists in the upper chamber above land 599 must at all times be one-half the pressure $P_1$. The flow of fluid to and from the upper chamber of valve 526 is controlled by the displacement of valve 527 from its neutral position. If valve 527 is stroked downwardly from its neutral position, pressure from conduit 580 forces fluid past the partially opened ports at land 608 through conduit 607 to the upper chamber of valve 526 forcing this valve downward. If valve 527 is stroked upwardly from its neutral position, fluid flows from the upper chamber of valve 526 through conduit 607 to tank conduit 581 through the partially opened port at the lower surface of land 609.

The rate of flow to or from the upper chamber of valve 526 and consequently the velocity of movement of valve 526 is, therefore, determined as substantially a linear function of the displacement of valve 527 from its neutral position or, in other words, the position of valve 526 is a measure of the first integral of the position of valve 527.

The chamber in valve 526 defined between lands 599 and 600 connects to tank conduit 581 if the valve is displaced downwardly from neutral and connects to pressure $P_1$ in conduit 580 if the valve is displaced upwardly from neutral. This same chamber connects through channel 605 to the chamber in valve 527 defined between lands 604 and 609. Now it may be seen that, for the assumed operation of rotary piston 521, the flow of fluid from chamber 597 will initially result in a downward travel of valve 527 and a flow of fluid to tank conduit 581 through the partially opened port at the upper surface of land 609 as previously stated, but further, this downward displacement of valve 527 results in a downward velocity of valve 526 to that part of the fluid flow from chamber 597 may now also flow through channel 605 to tank conduit 581 through the partially opened port at the upper surface of land 600. So long as valve 527 remains displaced downwardly from its neutral position, valve 526 continues to move downwardly. Therefore, after the time during which rotary piston 521 is operating at a constant velocity, the entire flow of fluid from chamber 597 is accommodated through channels 602, 603 and 605 to tank conduit 581 through the partially opened port at the upper surface of land 609. After such time valve 527 has necessarily returned to its neutral position, stopping further movement of valve 526.

Accordingly, for this constant velocity operation of piston 521, valve 526 is displaced downward from its neutral position so that the entire flow of fluid from chamber 597 flows to tank conduit 581 through the partially opened port at the upper surface of land 600. It is thus apparent that the displacement of this valve 526 from neutral is a measure of the velocity of piston 521 and further that valve 527 is displaced from its neutral position only when the velocity of piston 521 is changing. The displacement of valve 527 is therefore a measure of the acceleration of piston 521.

Summation of the mechanical displacement of valves 526 and 527 (FIG. 9b) to obtain a compensation signal is effected by link 610 pivotedly connected to the valves at their projecting ends and having a pivotal connection with a displacement transmitting link 611 at a point which is substantially more remote from the end connecting with valve 526 than from the end connecting with valve 527. That is to say, link 611 is displaced considerably more by a given displacement of valve 527 than by an identical displacement of valve 526, thus emphasizing the portion of the compensation signal representing acceleration of the rotary piston 521.

It may be noted that, within limits, the displacement of rotary piston 521 corresponds with system error $\theta_E$, so that displacement of link 611 is, within such limits, dependent upon the first and second derivatives of the system error.

The compensation signal derived from the compensator unit 522 is additive with the signal from cam 515. To derive a signal from cam 515, a cam follower 613 (FIG. 9b) has its roller urged against the contoured surface of cam 515 by bias spring 614 and transmits its displacement through valve plunger 615 to left end point 617 of a summing link 618. Connecting link 611 applies a displacement representing the compensational signal to an off-center pivot point 619 of the link 618.

As before stated, cam 515 may be similar to cam 80 of the elevation control system and thus may have a central constant lead contour 620, a parabolic contour 621 falling therefrom, and a parabolic contour 622 rising therefrom. Hence, if the rotary piston 521 rotates clockwise, left end point 617 of link 618 will be moved with cam follower 613 downwardly. At the same time pivot point 619 will be raised by upward movement of valves 526 and 527 necessary to supply the required hydraulic fluid to piston chamber 597. Since, if pivot point 619 remained fixed, downward movement of left end point 617 would produce upward movement of right end point 624, it will be evident that upward movement of pivot point 619 adds to the upward movement of right end point 624.

The primary purpose of the compensator unit is to add a signal which will require an additional response from the hydraulic transmission when the gun is moved suddenly thereby to overcome the lag attributable to compliance in the shafts and gear train connecting the B-end 54 of the hydraulic transmission to the gun mount. Absent the compensation signal, the gun mount would lag behind the gun order an appreciable amount corresponding to torsional deflection in the shafts and gearing created by the application of large torque necessary to overcome the high inertia of the gun mount in training.

*Secondary Control Unit*

In order that the valves 526 and 527 may be substantially free of any loading which might produce inaccuracy in their derivative taking, the right end point 624 of link 618 is pivotally connected to valve plunger 626 (FIG. 9b) which is freely slidable in a movable valve sleeve 627, being exposed to atmospheric pressure on either end face. Valve plunger 626 is of the two-land type with a line-to-line spacing relative to an upper port of sleeve 627 having communication with tank pressure in conduit 581 and a lower port having communication with hydraulic fluid at the pressure $P_1$ existing in conduit 580.

Valve plunger 626 is displaced in accordance with the actuating signal derived from cam 515, the first derivative of the actuating signal represented by displacement of valve 526, and the second derivative of this actuating signal represented by displacement of 527, the actuating signal and the derivative signals being summed by the link 618 to produce a corresponding displacement of the valve plunger 626. To ensure a corresponding displacement of stroke controlling valve sleeve 629, stroke control lever 630 is connected pivotally at its right end point 631 to the valve sleeve 629 and at its center point 632 of the valve sleeve 627 to produce follow up movement of the valve sleeve 627 by degenerative feedback. Accordingly, the pressure of hydraulic fluid communicated through choke orifice 634 from the chamber of valve 626 and through a connecting conduit 635 is determined by the amount of underlap produced by differential movement of the valve plunger 626 relative to the valve sleeve 627. When the follow up action has moved the ports of sleeve 627 into a line-to-line or balanced position with respect to the lands of plunger 626, such pressure will be one-half the pressure $P_1$, or 200 p.s.i.

When the train control system is in condition for response to gun orders from the remote fire control director 60, two-land valve 636 (FIG. 9a) is moved to its upper position by bias spring 638 to place conduit 635 in communication through the valve chamber with the exposed upper face of valve sleeve 629 via conduit 639. Since this upper face has twice the area of the lower face of sleeve 629 which is exposed to $P_1$ pressure communicated via conduit 580, any departure of the pressure in conduit 639 from one half $P_1$ pressure, or 200 p.s.i., corresponding to a departure of plunger 626 and sleeve 627 from their balanced position will move valve sleeve 629. As an example, consider the instance of a right training gun order which causes rotary piston 521 and cam 515 to rotate clockwise and to produce an upward movement of valve plunger 626. The port which places the valve chamber in communication with tank pressure in conduit 581 is thereby underlapped or opened to reduce the pressure in conduits 635 and 639, whereupon the valve sleeve 629 moves upwardly. As the valve sleeve 629 moves upwardly, it carries the right end point 631 of lever 630. Assuming that left end point 642 of lever 630 at which the integration signal is introduced remains fixed as a fulcrum, central point 632 of link 630 moves upwardly a proportionate amount correspondingly to raise the valve sleeve 627. Upward movement of the points 631 and 632 is continued until the valve sleeve 627 is restored to line-to-line or balanced position with respect to the valve plunger 626. In other words, so long as the left end point 642 remains fixed, the valve sleeve 629 is positioned in correspondence with the valve plungers 626 by the degenerative follow-up action applied to valve sleeve 627.

*Integration Control Unit 538*

As stated above, left end point 642 of link 630 (FIG. 9b) is moved in correspondence with the signal derived from the integration control unit whereby a summation of the integration signal with the actuating signal, its first and its second derivatives may be effected by stroke control lever 630. Whereas in the elevation control system the integration control unit 90 is made responsive to the actuation signal from the cam, in the train control system the integration control unit 538 is made responsive to the weighted sum of the actuation signal, its first and its second derivatives. Since the valve plunger 626 is displaced in accordance with this sum, it follows that the valve sleeve 627 is similarly displaced, as is ensured by the follow-up servo action. The input signal to the integration control unit may be derived from the valve sleeve 627 utilizing a link 643 pivotally connected at one end 644 to sleeve 627 and at the other end 645 to link 646 connected with valve 647 for reciprocal movement thereof. Link 643 is fulcrumed at an intermediate point 648 whereby downward movement of sleeve 627 results in upward movement of valve 647, valve 647 serving to convert the mechanical input to the integration control unit into a variable pressure hydraulic signal.

Valve 647 is a two-land, variable position valve which is biased downwardly by means of spring 649 with a light force sufficient to ensure take up of lost motion in the linkage. Upper land 650 of valve 647 controls a port communicating with tank pressure in conduit 581, while the lower land 651 controls a port having communication through valves 653 and 655 to a source of pressure $P_2$, which is in a preferred embodiment 200 p.s.i., via conduit 657. The chamber of valve 647 located between the upper and lower lands 650, 651 communicates via conduit 658 with the upper chamber of valve 653 and thence via conduit 659 with the upper face of a piston 660 (FIG. 9b). With valves 653 and 655 in the position illustrated in FIG. 9b, stroking of valve 647 from its neutral or line-to-line position correspondingly varies the pressure applied to the upper face of piston 660 from a mean value of 100 p.s.i. or one-half the pressure $P_2$.

Mounted in the same cylinder bore 661 with piston 660 but in spaced opposing relation is a piston 663. The space intermediate pistons 660 and 663 is filled with a column 662 of hydraulic fluid. When the pressure applied to the upper face of piston 660 is 100 p.s.i., it is exactly balanced by pressure applied to the lower face of piston 663 having half the area, such pressure being derived via conduits 652, 654 and 657 from the source of $P_2$ pressure at 200 p.s.i. The pressure acting upwardly on the lower face of piston 663 is transmitted via the locked column 662 of hydraulic fluid. An unbalance of forces arises, however, when the pressure applied to the upper surface of piston 660 departs from 100 p.s.i. as will occur when valve 647 is stroked by movement of the valve sleeve 627. Since departure of valve 647 from its neutral position produces a corresponding rate of flow of hydraulic fluid to or from the conduit 659 communicating with the upper surface of piston 660, displacement of the piston 660 is the time integral of the departure of valve 647 from its neutral position. To the extent that such displacement is transmitted through the column 662 of hydraulic fluid to the lower piston 663 and thence by a link 665 to the left end point 642 of summing link 630, such left end point 642 is stroke in accordance with the time integral of displacement of the center point 632 of the link.

The length of the column 662 of hydraulic fluid is, however, variable in a manner similar to that previously described in connection with the elevation integration control unit, whereby variations in the length of the column from its mean value adds a second integral term to the displacement of the left end point 642. To this end, there extends from the upper face of piston 660 a rod 666 pivotally connected at its upper end above the valve block with the right end of a link 667 pivoted at its left end 668 (FIG. 9a). At an intermediate point 669 of link 667, the upper end of the stem portion 670 for valve 540 is pivotally connected. Accordingly valve 540 is stroked a fixed fraction of the displacement of piston 660 or by an amount representing the first time integral of the input signal to the integration control unit. Valve 540 is a variable position, two-land valve, the upper land 671 of which controls a port communicating with tank pressure in conduit 581, the lower land 672 controlling a port communicating via conduits 652, 654 and 657 with a source of $P_2$ pressure at 200 p.s.i. As the lands 671 and 672 are spaced for line-to-line control of these ports and thereby of the pressure in the valve chamber which communicates via conduit 673 with the column 662 of hydraulic fluid, stroking of valve 540 determines the rate at which fluid flows into or out of the column of fluid 662 correspondingly to displace piston 663. Hence, the mechanical linkage of piston 660 to valve 540 and the hydraulic connection of valve 540 to the column of hydraulic fluid or oil between the pistons 660 and 663 adds to the displacement of the left end point 642 of link 630 a term corresponding to the second time integral of the displacement of its mid point 632.

It will be recalled that valve sleeve 627 which is pivotally connected to mid point 632 is forced to take a position corresponding to that of valve plunger 626 by follow up action through the valve sleeve 629. However, displacement of the left end point 642 of link 630 in accordance with the signal derived from the integration control unit does displace valve sleeve 627 from its position corresponding to that of valve plunger 626, since valve sleeve 627 is not restrained while valve sleeve 629 is restrained. Once sleeve 627 is displaced relative to plunger 626, however, the hydraulic coupling between the valve plunger 626 and the valve sleeve 629 results in movement of the valve sleeve 629 to restore the valve sleeve 627 to a line-to-line or balanced position with respect to plunger 626. The net effect of a displacement of left end point 642 by the integration control unit is, therefore a corresponding displacement of the valve sleeve 629 connecting with the right end point 631, as if the mid point 632 of the summing link were a fixed fulcrum. Thus it is that the input to the stroke control unit 545 is the summation of the actuating signal derived from cam 515, the first and second derivatives of the actuating signal derived from the compensator unit 522 and the first and second integral of these combined signals, namely, the actuating signal and its first and second derivatives.

*Stroke Control Unit 545*

The purpose of the secondary controller is to stroke the A-end 52 of the hydraulic transmission by an amount proportional to displacement of the valve sleeve 629. In effect, the stroke control unit serves as a feedback amplifier for positioning the tilting plate of the A-end without imposing an appreciable load on the valve sleeve 629. Whereas the valve plunger 263 is moved, in the elevation stroke control unit (FIG. 3d), and the valve sleeve 269 partakes of follow-up action, in the train stroke control unit (FIG. 9b) valve sleeve 629 is moved and valve plunger 675 partakes of follow-up action.

Valve plunger 675 is of the two-land, variable position type, upper and lower lands 676 and 677 being spaced, respectively, to control ports communicating with conduits 678 and 679. Conduit 678 is connected with a fluid return tank and is at zero pressure, while conduit 679 connects through a full-sized, controlled port and a choked, uncontrolled port with the middle chamber 680 of valve 681. Valve 681 will be described more fully hereafter but may be understood for the present to serve as a connection between conduits 679 and a conduit 683 communicating with $P_1$ pressure, that is, a source of hydraulic fluid at 400 p.s.i. Hence, in the line-to-line position of sleeve 629 and plunger 675, conduit 684 communicating with the chamber between lands 676 and 677 is held at a pressure of one-half $P_1$ or 200 p.s.i. Conduit 684 communicates through the upper chamber of a three-land valve 685 with a conduit 686 connecting to large stroking piston 687 associated with the A-end 52. Small stroking piston 688 connects via conduit 689 and valve 681 with a source of $P_1$ pressure, just as does conduit 679.

The A-end 52 and B-end 54 of the train hydraulic transmission 53 may be substantially identical with the A-end 42 and B-end 44 of the elevation hydraulic transmission 43 except for such modifications as are required by the higher inertia and different driving arrangement of the gun mount in train. Accordingly, the tilting plate for the A-end of the train drive is held in a position corresponding to displacement of valve sleeve 629 when a pressure of 200 p.s.i. is communicated to the large stroking piston 687 via conduits 684 and 686, as will occur when the plunger 675 is in a balanced position with respect to the valve sleeve 629. Such correspondence is obtained for every position of the valve sleeve 629 by pivotally connecting the upper end of plunger 675 to a crank arm 690 positioned by A-end tilt plate shaft 691. This mechanical connection affords a degenerative feedback path for transmitting a signal to displace the plunger 675 an amount representing the position of the A-end tilt plate.

To illustrate the operation of the stroke control unit, assume the condition of training to the right which is produced by upward movement of the valve sleeve 629. Conduits 684 and 686 (FIG. 9c) are ported to $P_1$ pressure through the chamber of valve plunger 675 and conduit 679, thereby increasing the pressure in large piston 687. The tilting plate of the A-end 52 is rotated in a direction to increase the velocity of the gun mount in right train and correspondingly rotates the A-end tilt plate shaft 691. Crank arm 690 fixed to shaft 691 raises the valve plunger 675. When valve plunger 675 has been raised a distance equaling the upward displacement of the valve sleeve 629, the lower land 677 of valve plunger 675 closes the port communicating with $P_1$ pressure and restores the pressure in the large stroking piston 687 to 200 p.s.i. Since the large and small stroking pistons are now in force balance, the tilting plate is held in a position determined by displacement of valve sleeve 629. The valve plunger 675 is, therefore, held in line-to-line position with the valve sleeve 629 by the mechanical feedback. For left training, the movements are opposite and produce a decrease in pressure in the large stroking piston 687 below 200 p.s.i. until the valve plunger 675 has moved into correspondence with the new position of the valve sleeve 629.

Train Positional Feedback

To ensure positional correspondence between the gun mount in train and the train gun order signal, B-end response gear train 560 couples the B-end 54 of the train hydraulic transmission with the stators of synchro control transformers 556 and 558. Just as in the elevation control system, the B-end response gear train rotates the stators of the synchro control transformers first by an amount to reduce the potential induced in the rotors by the gun order signal to zero in anticipation of correspondence of the gun mount with the gun order signal, then by an additional amount corresponding to the angular displacement of rotary piston 521 from its neutral position. This further rotation induces a potential of opposite polarity which results in energization of the torque generator 576 to supply pressure fluid for returning the rotary piston 521 to its neutral position, at the same time bringing the rotors of the synchro control transformers into such correspondence with the stators as to nullify the potential induced in the rotors.

For this purpose, the B-end response gear train 560 comprises a shaft 694 (FIG. 9b) carrying a gear 695 which is in mesh with a gear 696 carried by a hollow shaft 697. Shaft 694 also provides a mechanical input to train parallax corrector 699 which is electrically coupled to train parallax amplifier 700. Corrector 699 and amplifier 700 may be of conventional design serving to introduce through an output shaft 701 the parallax correction required by the displacement of the gun mount from the target tracking station. The parallax output shaft 701 extends through the tubular shaft 697 to support spider gears 702 on a transverse axis. So long as parallax output shaft 701 is fixed, spider gears 702 couple an input gear 703 connected with hollow shaft 697 to an output gear 704 corotative with shaft 705. The coupling affords 1:1 correspondence although producing an opposite direction of rotation. A differential rotation between input gear 703 and output gear 704 is produced by rotation of the parallax correction shaft 701. The net rotation of shaft 705 is transmitted by the remainder of the B-end response gear train to the 36-speed synchro control transformer 558 and thence through step-down gearing 706 to the stator of 1-speed synchro control transformer 556.

Train Saturation Controls

The portions of the train control system which are described above serve to position the gun with minimum dynamic errors in response to a continuously varying gun order signal. In transferring from one source of gun order signals to another, however, large errors will generally result which must be reduced as rapidly as possible for optimum performance. Safety of personnel and equipment requires that both the velocity and the acceleration of the gun in train be limited to prescribed saturation values during synchronizing between gun order signals. Accordingly, provision is made for limiting the speed and acceleration of the gun mount to values less than would result from a continuing linear response to the large error signals.

Maximum velocity of the gun mount in train is limited by the travel of valve sleeve 629 which is correspondingly limited. To limit the maximum velocity of the mount in right train to approximately 40 degrees per second, for example, an annular shoulder 708 formed on the valve sleeve 629 engages the valve block at the top of the recess receiving the valve sleeve when the valve sleeve has been stroked an amount which produces a displacement of the A-end tilting plate corresponding to a gun velocity of about 40 degrees per second. In the left train, an oppositely facing annular shoulder 709 engages a cap 710 secured to the valve block to limit the sleeve travel to an amount producing displacement of the A-end tilting plate corresponding to about 40 degrees per second velocity of the mount. The follow-up action of the valve plunger 675 responsive to rotation of the A-end tilting plate shaft 691 ensures that the A-end tilting plate will not be angularly displaced beyond the prescribed limits. Since the velocity of the mount in train is proportional to the angular displacement of the tilting plate in accordance with the characteristics of the hydraulic transmission, the velocity of the mount is therefore effectively limited to prescribed saturation values.

To limit the maximum acceleration of the mount, the flow of oil to the large or small stroking piston 687 or 688 is limited to a maximum rate by valve 681, which may be constructed and have an operation identical to valve 277 (FIG. 3d) of the elevation control system. Thus, valve 681 is stroked in accordance with the pressure differential created by flow of 400 p.s.i. oil through a choke at the entrance of a passage extending through the plunger and communicating with the chamber 680 between the lands. As the flow of this oil from the chamber 680 to either conduit 689 or 679 increases, the plunger moves downwardly to throttle the flow. Equilibrium is reached when the flow is just sufficient to displace the associated stroking piston at a rate producing the desired acceleration of the gun mount in train. As an example, the acceleration may be limited to a rate of approximately 70 degrees per second in a second when the maximum rate of oil flow just suffices for the stroking pistons to reach maximum stroke from zero stroke in approximately six-tenths of a second, in a preferred design. It will be recalled that the rate at which the stroking piston displaces the tilting plate determines the angular acceleration of the gun mount in accordance with the characteristics of the hydraulic transmission.

Train Synchronization Controls

In synchronizing to a new gun order signal, not only must the speed and acceleration of the gun mount in train be limited to prescribed saturation values, but also the integration control unit must be neutralized when synchronizing through large angles to prevent overshoot.

Merely as an example, a large angle may be taken for purposes of this description as greater than approximately 35 degrees, the slight overshoot occurring when synchronizing through small angles being of no practical consequence in view of the short time required for synchronization. Neutralization of the integration control unit is accomplished by means of valves 653 and 712 (FIGS. 9a and b) which correspond, respectively, with valves 300 and 337 of the elevation control system (FIGS. 3c and d) in construction and in operation. In addition, the integration control unit of the train control system is de-energized during the acceleration and deceleration periods of synchronization by means of valve 655 (FIG. 9b), which corresponds generally with valve 323 of the elevation control system (FIG. 3c).

To de-energize and hold the integration control unit 538 as the mount begins to synchronize through a large angle, valve 655 (FIG. 9b) is arranged to cut off communication of $P_2$ pressure via conduits 657, 654, and 652 from valves 647 and 540 (FIG. 9a) and piston 663 of the integration control unit when the speed of the mount in train reaches a prescribed value. To provide a measure of the error rate at which the integration control unit is held, lands 600 and 606 of valve 526 (FIG. 9b) are spaced in overlapped relation to ports each of which connect with tank pressure in conduit 581. Lands 600 and 606 define a chamber in communication via conduit 714 with the upper chamber of valve 655. Through the plunger of valve 655 extends a passage 715 having a choke orifice 716 at its upper end and placing the upper chamber in communication with $P_2$ pressure in conduit 657. In the normal, lower position of valve 655, its lower land is slightly underlapped with respect to the bottom port, thereby placing conduit 654 in communication with $P_2$ pressure in conduit 657. The integration control unit is thus supplied with oil at $P_2$ pressure or 200 p.s.i The upper land in this position is slightly overlapped with respect to a port communicating with tank pressure in conduit 581. Accordingly, a slight upward movement of valve 655 is sufficient to cut off $P_2$ pressure from the integration control unit and connect the unit instead with tank pressure, that is, with substantially zero pressure.

Whenever the valve 526 is displaced the amount by which the middle or bottom land overlaps its corresponding port, oil is drained from the upper chamber of valve 655 through conduit 714, thereby to produce a pressure differential across valve 655 urging upward movement thereof. Since such displacement of valve 526 is a measure of the first derivative of the system error, or the error rate, valve 655 is responsive to a predetermined error rate to cut off $P_2$ pressure from the integration control unit and to connect the unit instead with the tank or sump. So long as the error rate equals or exceeds the value at which land 600 or 606 of valve 526 ports the conduit 714 to tank, valve 655 is held in its upper position, cutting off $P_2$ pressure and preventing a response of the integration control unit to input signals applied via valve 647. However, valve 655 does not cut off $P_2$ pressure from integration neutralizing valve 712.

Such valve 712 is a two-land, variable position valve which is pivotally connected to the left end point 717 of link 718, the right end point 719 being connected via link 665 to the piston 663 and to the left end point 642 of link 630. To render valve 712 responsive to departure of piston 663 or left end point 642 from its neutral position, link 718 is fulcrumed at its mid point 720, the valve 712 therefore moving up when the piston 663 moves downwardly. Upper land 721 and lower land 722 of valve 712 are spaced to define a chamber in communication via conduit 723 with a port of valve 653, and spaced also for line-to-line control of ports communicating, respectively, with tank pressure in conduit 581 and $P_2$ pressure in conduit 657.

Valve 653 is of the three-land, variable position type, middle land 725 serving to control the port having communication with conduit 723. To actuate valve 653, its plunger is connected to one end of a crank arm 726 pivotally mounted at its elbow 727 and having a cam roller 728 at its other end. Except when the valve sleeve 629 is at either of its extreme limits of travel, cam roller 728 engages with the dwell portion 729 of a linear cam element 730 secured to the valve sleeve 629 and projecting from the valve block. At either end of the cam element 730 is a raised portion 731 which engages the cam roller 728 only when the valve sleeve 629 reaches an extreme limit of travel. Thus, the raised portion 731 of the cam element 730 may displace the cam roller 728 when the valve sleeve 629 is at a position corresponding to a velocity in train of 38 degrees per second, for example, or just slightly short of the extreme position corresponding to the saturation velocity of approximately 40 degrees per second.

When the valve sleeve 629 is in an intermediate position, as illustrated in FIG. 9b, a bias spring 733 holds valve 653 in its upper position and maintains roller 728 against the dwell portion 729 of cam element 730. In this upper position, middle land 725 and lower land 734 of valve 653 define a chamber in communication with conduit 652, middle land 725 being in underlapped relation to conduit 654 to admit $P_2$ pressure to this lower chamber and lower land 734 being in overlapped relation to a port having direct communication with $P_2$ pressure in conduit 657. Also, upper land 735 of this valve 653 is in underlapped relation to a port communicating with conduit 658, while middle land 725 is in overlapped relation to a port communicating with conduit 723. The upper chamber defined between upper and middle lands 735, 725 thus affords communication between conduit 658 and conduit 659, placing piston 660 under control of valve 647 for response to the input signal to the integration control unit 538. When the valve sleeve 629 moves substantially to a limit of its travel, cam roller 728 is displaced by a raised portion 731 of cam element 730 thereby to stroke valve 653 to its lower position. In this lower position, upper land 735 cuts off communication between valve 647 and piston 660, while middle land 725 moves to establish communication between neutralizing valve 712 and piston 660. In other words, the integration control unit is transferred from control by the sum of the actuating signal and its first and second derivatives to control by the neutralizing valve 712.

The neutralizing valve 712 is in a closed control loop and responds by displacement to any departure of left end point 642 of link 630 from its neutral position by varying the pressure in conduit 723 from its mean value of 100 p.s.i. While downward movement of the middle land 725 of valve 653 cuts off conduit 652 from $P_2$ pressure via conduit 654, lower land 734 establishes a new path of communication with $P_2$ pressure by uncovering a port directly in communication with conduit 657. Accordingly, if the left end point 642 of link 630 is displaced from its neutral position upwardly or downwardly, neutralizing valve 712 correspondingly raises or lowers the pressure in conduit 723 which, communicating through valve 653, moves piston 660 downwardly or upwardly by creating a differential pressure between the pistons 660 and 663. The piston 660 acting through locked fluid column 662 moves the left end point 642 back to its neutral position, whereupon neutralizing valve 712 moves to its neutral position to restore a pressure balance. So long as valve sleeve 629 is displaced an amount corresponding to a prescribed value close to the saturation limit, such as 38 degrees per second, the neutralizing valve 712 is in control of the integration control unit and causes movement of the left end point 642 toward its neutral position.

In a typical operation of synchronizing through a large angle, the stators of the synchro control transformers 556 and 558 have impressed upon them a new gun order signal representing a train position differing from the existing gun position by a large angle such as 35 degrees or more. A large error signal is accordingly applied to the servo amplifier which, acting through the torque generator 576 and rotary valve 520, causes rotary piston 521 to drive against its limit stop at its maximum rate. Left end point 617 of link 618 is stroked as cam 515 also rotates to its limiting position, and valves 526 and 527 are hydraulically stroked to positions representing the rate and acceleration at which the left end point 617 is stroked. Accordingly, plunger 626 is displaced by an amount representing the weighted summation of the actuating signal and its first and second derivatives. Hydraulically, the valve sleeve 629 is displaced and thereby strokes the A-end to obtain a corresponding velocity of the mount in train. Almost the moment that the rotary piston 521 moves from its neutral position, valve 526 is displaced sufficiently to vent the upper chamber of valve 655 to tank, thereby to cut off $P_2$ pressure from the integration control unit. The left end point 642 of link 630 is thereby held at a fixed position, which may be off of neutral. When the mount velocity reaches approximately 38 degrees per second as determined by displacement of valve sleeve 629, control of the integration control unit is transferred to the neutralizing valve 712 to bring the left end point 642 toward or to its neutral position. During this interval when velocity of the mount is increasing, the acceleration is maintained at its saturation limit of, say, 70 degrees per second in a second by the throttling action of valve 681 controlling the supply of oil to the stroking pistons 687, 688. The acceleration ceases when the mount reaches its upper saturation limit of velocity.

While the mount is rotating at top speed and when it is a predetermined angle, such as approximately 23 degrees, away from correspondence with new gun order, the input signal to the servo amplifier goes to zero and then increases with an opposite phase due to displacement of the rotors of synchro control transformers 556 and 558 by mechanical feedback from the rotary piston 521. Torque generator 576 accordingly begins to rotate rotary valve 520 in the opposite direction, thereby to move rotary piston 521 from against its limit stop for movement toward its neutral position. The actuating signal derived from cam 515 is diminished and the sense of the displacements of valves 526 and 527 representing first and second derivatives of the actuation signal reverses in anticipation of correspondence with the new gun order signal. Valve sleeve 629 moves in the opposite direction to reduce the speed of the mount, the valve 653 immediately transferring control of the integration control unit back to the valve 647. However, valve 655 responds to displacement of the error rate measuring valve 526 to hold the integration control unit inactive to prevent overshot. Just as cam follower 613 moves on to the constant lead contour 620 of cam 515, the deceleration of the gun mount in train is dropped smoothly, reaching a value of zero at the instant that correspondence with the new gun order signal is reached. In this manner, synchronization is secured in the minimum possible time consonant with safety requirements and with freedom from overshoot.

*Train Limit Stop Mechanism*

The purpose of the train limit stop mechanism is to limit the angular rotation of the gun mount sufficiently to prevent excessive twisting of the electrical cables extending between the rotatable gun house and the fixed carrier room therebelow. While in a preferred embodiment, the train limit stops are set to permit two complete rotations, or a full rotation in either direction from a neutral position, such stops are conveniently adjustable so that rotation may be limited, if desired, to no more than one-quarter revolution. The limit stop mechanism is also utilized to prevent the gun mount from training into an interference zone.

The train limt stop mechanism is basically similar to the elevation limit stop mechanism described above and similarly requires an input from the B-end response gear train as well as from the A-end tilt plate shaft in order that training into a limit stop may be anticipated in dependence upon the velocity of the mount as it approaches a limit stop. Accordingly, a worm gear 780 (FIG. 9b) carried on shaft 694 in the B-end response gear train 560 meshes with worm wheel 781 on hollow shaft 782 to rotate input gear 783 of differential 784. Assuming for the moment that output gear 785 of differential 784 is fixed, shaft 786, extending through hollow shaft 782 and carrying planetary gears 787 in mesh with input and output gears 783, 785 will rotate with the hollow shaft 782. In general, however, output gear 785 is not fixed but is rotated in response to stroking of the A-end tilting plate.

To supply the limit stop mechanism with a signal representing velocity of the gun mount in train, gear 788 carried on A-end tilt plate shaft 691 is in mesh with gear 789 which is corotative with limit stop lead cam 790, being connected by shaft 791. Cam 790 may be identical in configuration with cam 383 of the elevation limit mechanism, which is shown in detail in FIG. 5. Thus, cam 790 has a slot defined by a rising parabolic contour 792 and a falling parabolic contour 793 on either side of a constant lead contour at 794a, the slot receiving a pin 794 carried at one end of a lead input lever 795. As lever 795 is pivotally connected at an intermediate point 797 to an extended portion 798a of the plunger for valve 685, rotation of A-end tilt plate shaft 691 serves to rotate lead input lever 795 about its pivot 797 to turn shaft 796 an amount determined by interaction of eccentric pin 797a carried on shaft 796 and slotted end 798 of lever 795 which receives the pin 797a. Output gear 785 is carried on shaft 796 and therefore rotates as a function of the velocity of the mount in train.

Figure 10:
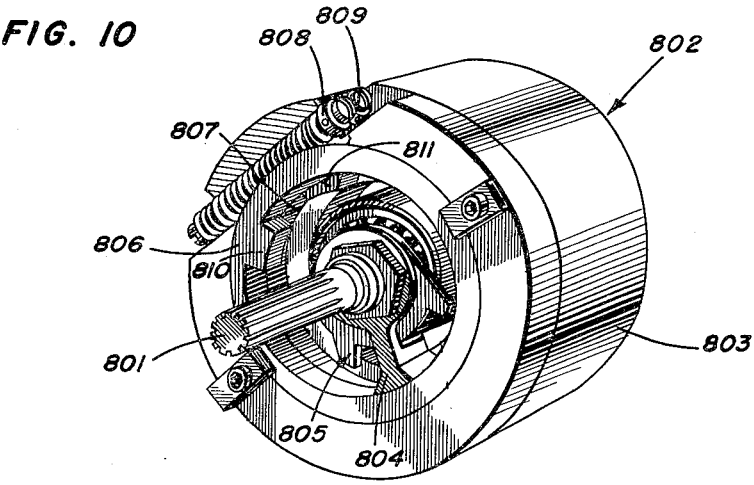
FIG. 10 is a perspective view, with portions cutaway, illustrating the limit stop unit for the train control system.

So long as spider gears 787 are free to rotate with the shaft 786, then, shaft 786 is rotated an amount proportional to the angular position of the gun mount plus an amount proportional to itss angular velocity. Rotation of shaft 786 is transmitted by meshing gears 799, 800 having a step-down gear ratio to a shaft 801. The gear ratio is such that shaft 801 completes one rotation for two rotations of the gun mount. Secured corotatively to shaft 801 are elements of the limit stop mechanism generally indicated at 802 for limiting both right and left train. The details of this mechanism are shown in greater detail in FIG. 10. Referring now to FIG. 10, shaft 801 is journaled within a cylindrical housing 803 and fixedly carries in rotatable relationship therewith, an element 805 having right and left radially extending angularly spaced projections or limit arms. Rotative motion of either projection of element 805 functions to provide engagement and rotation of the radially disposed longitudinally projecting arm 804 which is free and rotatable about shaft 801. Received within housing 803 for rotation relative to the arm 804 and element 805, respectively, are right and left limit stops rings 806, 807, each having gear teeth on its outer periphery for meshing with respective worm-type adjusting screws 808, 809 carried by the housing 803. By means of adjusting screws 808 and 809, lugs 810 and 811 which project inwardly from the right and left limit stop rings 806 and 807, and in mutually parallel planes respectively, may be positioned angularly in relation to the limit stop arm 804 and fix the point of engagement therewith to establish the angular limits of travel for the gun mount in train. When either of limit stop arms of element 805 engages arm 804 and moves it into abutment with either lug 810 or 811, further movement of shaft 801 in the direction of abutment is arrested, thereby locking the axis of planetary gears 787 against further rotation.

It may be noted that limit stop arm 804 as engaged by arm 805 is driven through an angle which corresponds with the angular position of the gun in train plus an angle which increases with increasing velocity of the gun mount.

Thus, the instant when limit stop operation is commenced is dependent upon both the position and the velocity of the gun mount and is sufficiently in advance of encounter with the actual limit stop, as may be established by mechanical buffers, to allow smooth but rapid deceleration of the gun mount. When rotation of the spider of differential 784 (FIG. 9c) is arrested by the limit stop 802, continued rotation of input gear 783 produces a corresponding rotation in opposite sense of output gear 785, thereby to rotate eccentric pin 797a about shaft 796. Assuming that the mount is encountering the right limit stop with a velocity almost zero, pin 797a is in substantially its outermost position with respect to the slotted end 798 of lever 795 and rotates the lever 795 downwardly about the pin 794. More generally, it may be observed that pin 797a rotates, after the right limit stop is encountered, in a direction tending to force the point 797 of connection between lever 795 and valve plunger 685 downwardly. Thus, while bias spring 813 normally serves to hold point 797 of arm 795 fixed as a fulcrum but yields to permit stroking of valve 685 when a limit stop is encountered.

Valve 685 is a three land, variable position valve, the upper chamber defined between upper land 814 and middle land 815 affording communication between the chamber of valve plunger 675 and the large stroking piston 687 via the conduits 684 and 686. Such communication is cut off by upper land 814 when the valve plunger 685 is moved downwardly, or by middle land 815 when it is moved upwardly. For a sensitive response, lands 814 and 815 are spaced in underlapped relation to the ports communicating with conduits 686 and 684, respectively. Displacement of the lower land 816 downwardly puts conduit 678 in communication via the lower chamber with conduit 686, thereby porting the large piston 687 to tank pressure. The A-end tilting plate is then stroked to decelerate the gun at a rate determined by the contour of limit stop cam 790. To effect a smooth transfer of control of the stroking pistons from valve sleeve 629 and plunger 675 to valve 685, middle and bottom lands 815, 816 are spaced in overlapped relation to the ports communicating with conduits 689 and 678, respectively, a distance slightly exceeding the amount of underlap of upper and middle lands 814, 815 with respect to the ports for conduits 686 and 684. In addition to effecting a transfer of control, downward movement of valve 685 compresses bias spring 813 between an upper plate 817 and a lower plate 818 each supported within a cage 819 and having connection with a scissors link 820 to open normally closed switch 822.

As seen in FIG. 9a, switch 822 is connected in series with solenoid 824 across a suitable power supply 574 and, when opened, de-energizes the push type solenoid 824 to allow bias spring 825 to displace valve 826 to the left. In the right position of valve 826, its left land 827 cuts off communication of the upper face 829 of valve 653 via conduit 830 with $P_1$ pressure in conduit 580, such upper face 829 being left in communication with tank pressure in conduit 581 which is ineffective to overcome the upward biasing force of spring 733. However, in the left position of valve 826, the right land 831 cuts conduit 830 off from tank pressure in conduit 581, while left land 827 moves to an underlapped position to port $P_1$ pressure to conduit 830. With the application of $P_1$ pressure to the upper face 829 of valve 653, such valve moves to its lower position just as it would if cam roller 728 engaged a raised portion 731 of cam element 730. Therefore, whenever valve 685 is displaced sufficiently from its neutral position to open the switch 822, the resulting de-energization of solenoid 824 serves to stroke valve 653 downwardly and to transfer control of the integration control unit from valve 647 to the neutralizing valve 712. The integration control unit therefore remains neutralized so long as valve 685 is sufficiently displaced from its neutral position by an encounter with a limit stop. It may be noted that the integration control unit is neutralized almost immediately after a limit stop is encountered and remains neutralized until just prior to termination of the limit stop operation.

Termination of the limit stop operation occurs when the A-end tilting plate is restored to its neutral position by the flow of hydraulic fluid under control of valve 685. Both the instant of stopping the gun mount and the rate at which it is decelerated to a stop are controlled by stroking of the valve 685. Such stroking is dependent not only on the travel remaining before the gun mount reaches its limit stop, represented by the displacement of the slotted end 798 of lever 795, but also upon the decreasing velocity, represented by the position of pin 794 in following the contour of cam 790. Thus, as the velocity of the gun mount is decreased by displacement of the A-end tilting plate toward neutral, A-end tilt plate shaft 691 turns correspondingly to rotate cam 790 toward its neutral position. Just as with the contour of cam 515, the contour of limit stop cam 790 serves to obtain a constant rate of deceleration. Stated otherwise, the displacement of point 797 of lever 795 which eccentric pin 797a tends to produce is exactly balanced by an opposite tendency toward displacement resulting from rotation of cam 790. This balance of displacements occurs after the valve 685 has been stroked through its full travel and continues until just short of the stopping of the gun mount. Thereupon, valve 685 is restored to its neutral position if the train gun order signal no longer requires travel into the limit stop or, more generally, returns to position just short of neutral where the lands of valve 685 are overlapped with respect to the ports controlled thereby to cut off conduit 686 from communication with either $P_1$ or tank pressure. In either case, occurrence of a gun order signal requiring movement out of the limit stop ensures return of valve 685 to its neutral position, placing valve sleeve 629 and plunger 675 in control of the stroking pistons 687, 688 for immediate response to the gun order signal.

While the directions of movement of the various parts have been given for the instance of encountering a right limit stop to exemplify the operation, the directions for encountering a left limit stop may be readily discerned. Except for certain changes of sense, the operation upon encountering either the right or the left limit stop is substantially the same. Whether the cam 790 rotates counter clock-wise after encountering a right limit stop or clockwise after encountering a left limit stop, the respective contours 792 and 793 determining the constancy of the rate of deceleration are dependent upon the geometrical relationship between the eccentric pin 797a and slotted lever 795. The required contour may readily be determined, however, by the condition that deceleration be constant during the limit stop operation.

While the bulk of the interference elimination mechanism is embodied in the elevation control system, the shaft 801 of the train limit stop mechanism does carry cams 834 and 835 having respective raised portions 836, 837 which, upon encountering cam followers 838 or 839 serve to open either switch 411 or 438 depending upon whether the position of the gun mount in train plus a lead angle determined by its velocity places the gun in either the Able or the Baker interference zone. The circuits in which the switches 411 and 438 are connected are shown in FIG. 3a and are described above in conjunction with other portions of such circuits.

In addition to the cams 834 and 835, there are provided cams 840 and 841 having raised portions 842, 843 for engaging, respectively, cam followers 844 and 845 when the gun has trained into the Able or Baker interference zone to open either the Able zone switch 410 or the Baker zone switch 439. These cams 840 and 841 are turned through one revolution for every two revolutions of the gun mount in train by a suitable gear reducing arrangement 846 associated with step down gearing 706. The switches 410 and 439 have a function described above.

Train Starting and Stopping Mechanism

The train starting and stopping mechanism is generally similar to the elevation starting and stopping mechanism and serves the same functions. Considering first the portions of the train control system which are arranged for starting, reference is made to FIG. 9c. The A-end 52 of the train hydraulic transmission is shown to have its input shaft 848 coupled through a gear reducer 51 to the drive shaft 850 of an electric motor 50, such gear reducer and motor conveniently combined as a gear motor. Except for a higher power rating, electric motor 50 may be identical to gear motor 40 of the elevation control system.

The electric motor 50 is energized from a suitable source of electric power, such as a three-phase, 440-volt line 445, through a triple pole switch 854 actuated by solenoid 855. To prevent untimely starting of the electric motor 50, solenoid 855 is arranged in series with a number of safety switches so that contacts 854 are closed only when these safety switches are closed to connect solenoid 855 with a suitable source of power, such as source 445. Among the safety switches is a switch 857 which is closed whenever the eccentric pin 797a of the limit stop is correctly positioned in the slotted end 798 of lever 795 for limit stop operation. The slot, it may be noted, is sufficiently long that the eccentric pin 797a may rotate through a full circle, this rotation occurring when, for example, the gun is being manually stowed. Thus, the lever 795 will assume the same position for two opposite positions of the eccentric pin 797a but only the outward position of the eccentric pin 797a results in a correct sequence of operations for limit stop operation. In addition to the safety switches, such as switch 857, a suitable starting switch 858 is included in series with solenoid 855. Safety switch 857 is closed to allow starting the electric motor 50 when cam 859 co-rotative with the limit stop shaft 796 has its raised portion 860 engaging cam follower 861 to close switch 857 (FIG. 9c).

Figure 9C:
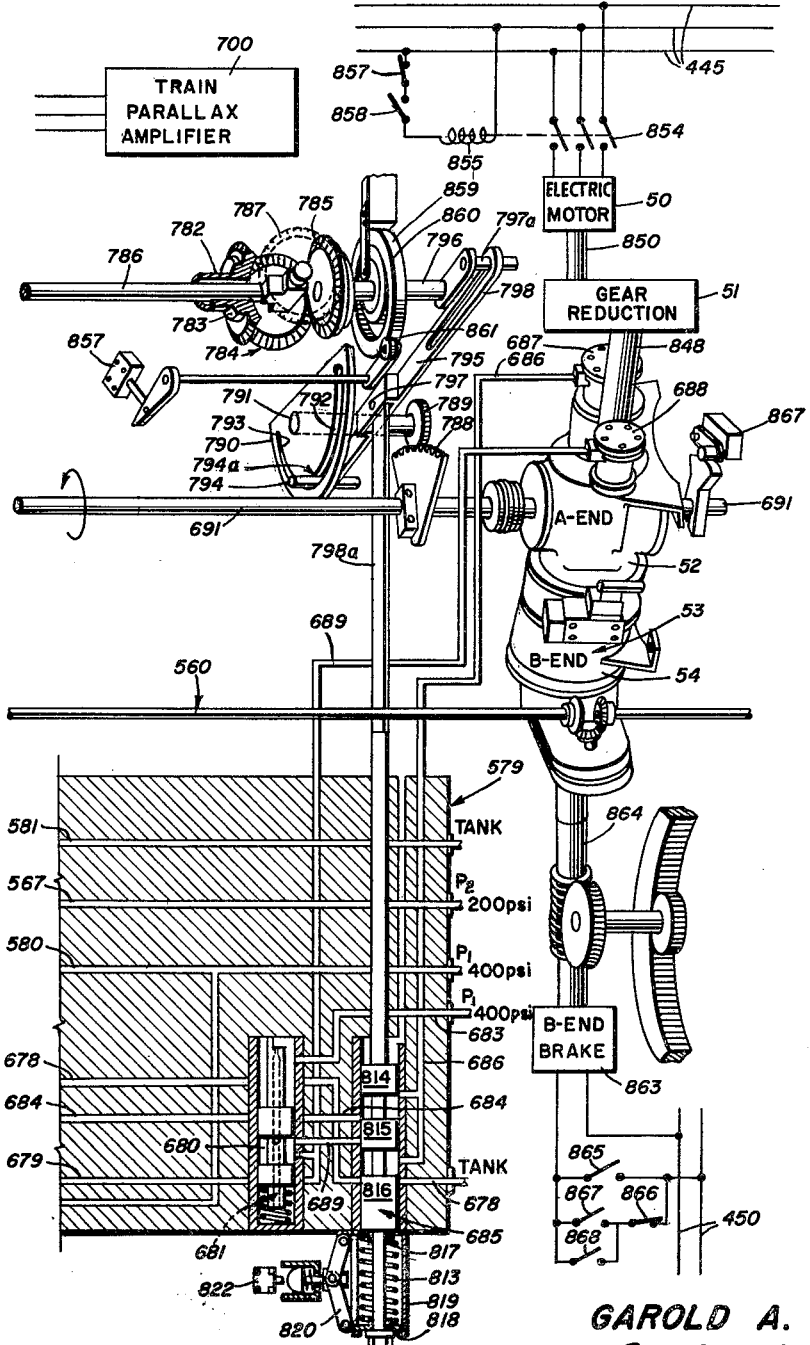

The B-end braking arrangement shown in FIG. 9c is substantially identical to the arrangement for the elevation control system shown in FIG. 3d. Thus, B-end brake 863 for the train control system is coupled to the output shaft 864 of the B-end 54 and is arranged to be set both manually and electrically to arrest rotation of the output shaft and training of the gun mount. In the electrical circuit for setting the brake 863 when energized by a suitable power source 450 are a switch 865 which is closed when the train stowing pin is in its "secure" position, switches 866 and 867 in series which are closed, respectively, when the B-end brake is set and when the A-end tilt plate is off neutral, as indicated by an actuation of the switch cam follower by the cam shown at the right end of A-end response shaft 691 and a switch 868 which is actuated by a cam driven by rotary piston shaft 589 to a closed condition when the rotary piston 521 is off neutral. Switches 866 and 867 are shunted by switch 865, while switch 867 is shunted by switch 868. Accordingly, a circuit for setting the B-end brake 863 is completed when the train stowing pin is in its "secure" position to close switch 865, or when the A-end tilt plate or the rotary piston is off neutral and the brake is manually set. The brake may also be arranged to be set automatically upon occurrence of a power failure or an undue drop in hydraulic supercharge or control fluid pressure.

In addition to the B-end brake 863, there is provided a limit stop brake 870 which may be arranged identically with the elevation limit stop brake 455' described above and shown in FIG. 3c. This limit stop brake is used to prevent the mount from moving during purging of the regulator to remove entrained air from the hydraulic fluid, and in local control whenever the B-end brake is not set and the operator has not placed the local control unit in "ready" condition. The limit stop brake is also used to prevent the gun mount from training into an interference zone.

When the limit stop brake is in a set position, a solenoid 872 acting through lever arm 873 is normally energized from a suitable power supply 574 to release the brake 870. To energize solenoid 872, three parallel switch circuits are provided, one such circuit including switch 874 which is closed when the gun is not under one man control and a switch 875 which is closed when the B-end brake is set. A second circuit includes switch 876 which is open when the gun is in an interference zone and either of parallel switches 877 and 878 which are closed, respectively, when the system is under "remote" signal control and when the gun is under one man control. The third circuit includes these parallel switches 877 and 878 as well as a switch 879 which is open when the gun is in an interference zone and a switch 880 which is open when the gun is above the interference zone and within the lead angle determined by the speed of depressing.

When the gun is in remote control and the B-end brake is not set, the state of the switches 876, 879 and 880 of the interference elimination mechanism determines whether or not the train limit stop brake 870 will be set by the de-energization of solenoid 872. Switch 880 is shown in FIG. 3c to be actuated by a cam 881 on limit stop shaft 359 through the following action of cam follower 882. Switch 879 in FIG. 3b is similarly actuated by a cam follower 883 responsive to the contour of cam 884, rotating with the stator of synchro control transformer 120 in accordance with the elevation angle of the gun. Switch 876 is closed by relay 412 shown in FIG. 3a, which is the same relay that initiates interference elimination when de-energized. Hence, switch 876 remains closed so long as the gun mount is not positioned within an interference zone plus a suitable lead angle. When the gun actually moves into an interference zone, the switches 876, 879 and 880 are all open, thereby to de-energize solenoid 872 and set the limit stop brake. When the train limit stop brake 870 is set, the train control system operates just as if both the right and left limit stops had been encountered simultaneously. That is, the mount is decelerated at a maximum rate regardless of its direction of travel to arrest training before the gun mount actually enters an interference zone. As has been explained above, however, the gun is normally elevated over an interference zone while the gun continues to respond to the train gun order signal. That is, when the gun is training into an interference zone, the gun is elevated until switches 879 and 880 close, thereby to release the limit stop brake 870 and ensure training over the interference zone.

When the train control system is switched for operation from the one man control station but the operator has not closed switches 874, 878 by pressing a hand switch (not shown) on the hand grips 468, 469 of the one man control unit (FIG. 7), the limit stop brake 870 is engaged, provided that the B-end brake is not set to close switch 875.

Train Regulator Characteristics

The train regulator characteristics are generally similar to the characteristics of the elevation control system and reference is made to the discussion of the latter characteristics given above. However, in addition to changes in the parameters of the transfer functions characterizing the various units, the train control system differs from the elevation control system by the inclusion of the compensator unit 522 and the secondary control unit 532, as well as the summing unit 537 for combining the outputs of the secondary control unit and integration control unit.

Figure 11:
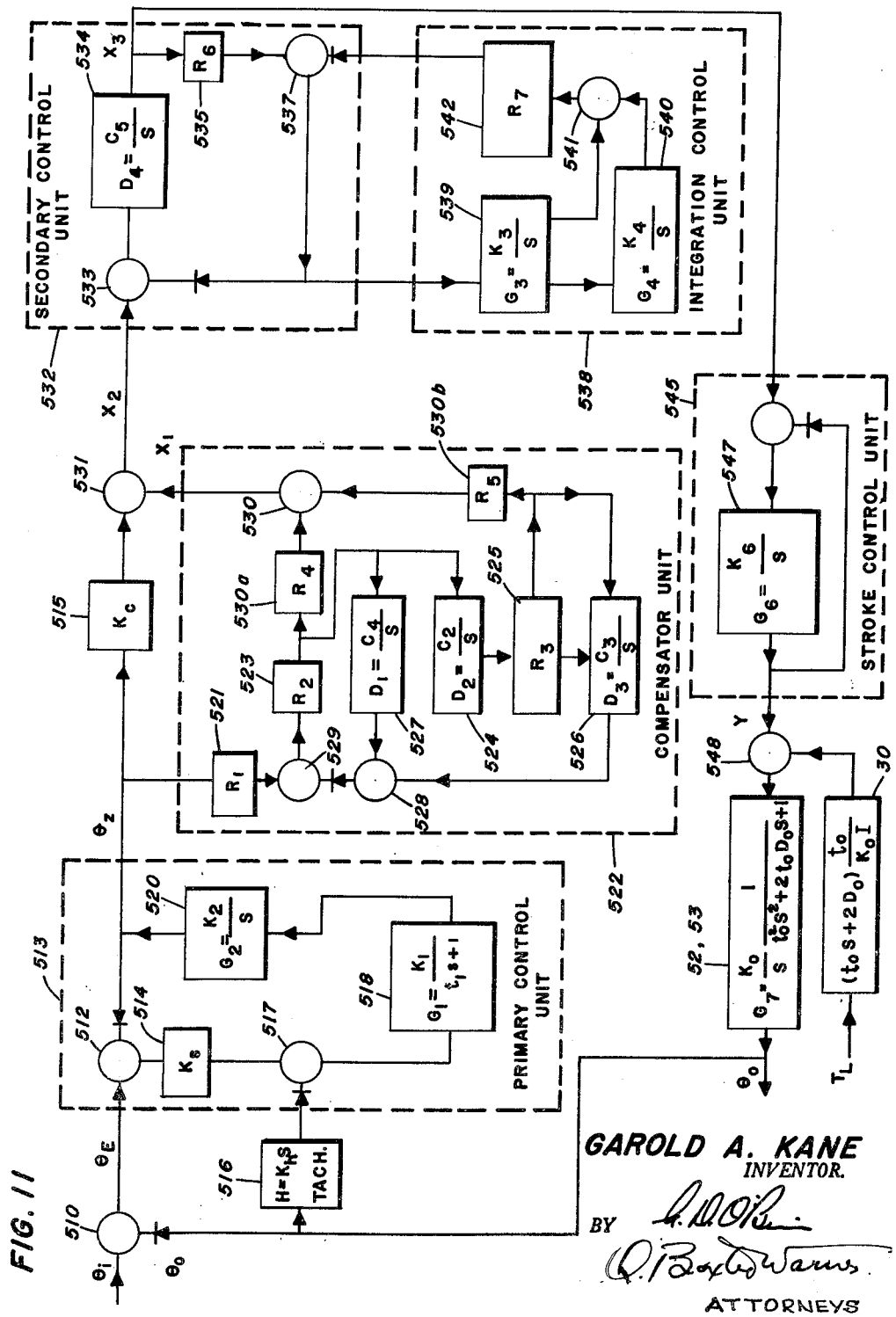
FIG. 11 is a block diagram similar to FIG. 8 but representing the transfer functions of various components of the train control system.

Referring now to FIG. 11, a transfer function block diagram is shown which is arranged in correspondence to the block diagram of FIG. 8 and employs notation similar to that which is described in conjunction with FIG. 6. The reference input $\theta_i$ and the output $\theta_o$ for the train control system are applied to the error measuring means 510 to derive an actuating error signal $\theta_E$ which is supplied to the primary control unit 513. Except for a modification in parameters, the train primary control unit has a transfer function characterizing its response which is identical to that of the elevation primary control unit.

Thus, neglecting the effect of the tachometer feedback 516, the primary control unit maintains correspondence between the position of rotary cam 515 and the actuating error signal $\theta_E$ by unity feedback of its positional output signal $\theta_2$ to the error measuring means 512. The signal representing the difference between the error signal $\theta_E$ and the positional signal $\theta_2$ is amplified by a gain $K_s$ represented at 514 prior to differencing in unit 517 with the degenerative tachometer feedback derived from tachometric generator 516. The transfer function H of the feedback element 516 is $K_h s$ representing a differentiation of the output $\theta_0$. The error signal derived from the error measuring means 512 and diminished by the amount of the tachometric feedback is subject to amplification and a lag in the servo amplifier and torque motor assembly 518 represented by its transfer function $G_1$ equaling the fraction $$\frac{K_1}{t_1 s + 1}$$

By the combined action of the valve 520 and the piston 521, the rotary cam 515 is displaced as the time integral of the rotary displacement of the torque motor shaft 577. Representing this integration is the transfer function $G_2$ which equals $K_2/s$. The overall transfer function $G_E$ of the primary control unit 513 which relates its positional output signal $\theta_2$ to the actuating error signal $\theta_e$ is as follows:

(5) $$G_E = \frac{1}{t_1 t_2 s^2 + t_2 s + 1}$$

where $t_2$ is the reciprocal of the product of the constants $K_1$, $K_2$ and $K_s$.

The transfer function $G_b$ which relates the positional output $Q_2$ to the tachometric feedback is equal to the transfer function $G_E$ divided by the constant $K_s$. The effect of introducing the tachometric feedback into the primary loop circuit is that the position of the rotary piston 515 is no longer proportional to system error alone but is proportional to the system error minus a quantity which is proportional to the training speed. The tachometric feedback thus added to the system results in an increase in the servo loop gain in the band of relatively low frequencies involved in ship roll and pitch and correspondingly results in a lower system error in this frequency band of interest.

The signal $\theta_2$ representing the angular position of the rotary piston 521 is, for small errors, transmitted by the cam 515 to the summing means 531 (link 618) linearly in accordance with a proportionality factor $K_c$. At the same time, the signal $\theta_2$ supplied to the compensator unit 522 is changed within rotary piston 521 from a mechanical displacement to a quantity of hydraulic fluid, the proportionality factor $R_1$ thus being introduced. The fluid from ports in valve 526 and from ports in valve 527 are added in summing means 528 and then subtracted from the quantity of fluid from piston 521 in summing means 525 and the net fluid results in a displacement of valve 527 introducing the proportionality constant $R_2$ in block 523. The output displacement of block 523 (displacement of valve 527) determines directly the opening of ports in valve 527 represented in block 527 so that the transfer function $D_1$ for this block is $$C_4/s$$

and also determines the opening of the second set of ports in valve 527 which control valve 526. The quantity of oil from this second set of ports is represented by the transfer function block 524, $$D_2 = \frac{C_2}{s}$$

which quantity of oil is transformed to a displacement of the valve 526 by the proportionality constant $R_3$ of block 525. The output displacement of block 525 determines the opening of ports in valve 526 represented in block 526 so that the transfer function for this block 526 is $$D_3 = \frac{C_3}{s}$$

The actual displacement of valve 527 (the output of block 523) and the actual displacement of valve 526 (the output of block 525) are, through linkage ratios $R_4$ and $R_5$, added in summing means 530 to obtain the compensating signal $X_1$. It will be noted that there is a double integration in the feedback loop around $R_2$ and a single integration in the feedback loop from $R_3$ so that the effect of a second derivative is produced by $R_2$ and the effect of a first derivative is produced by $R_3$. The overall transfer function is:

(6) $$G_{11} = \frac{X_1}{\theta_2} = \frac{R_1 R_2 [R_4 s^2 + R_3 R_5 C_2 s]}{s^2 + R_2 C_4 s + R_2 R_3 C_2 C_3}$$

The transfer function for the compensator unit 525 together with the cam 515 and summing unit 531 is then $$G_{12} = \frac{X_2}{\theta_2} = K_c + \frac{R_1 R_2 [R_4 s^2 + R_3 R_5 C_2 s]}{s^2 + R_2 C_4 s + R_2 R_3 C_2 C_3}$$

or (7) $$G_{12} = \frac{X_2}{\theta_2} = K_c \frac{t_n^2 s^2 + 2 D_n t_n s + 1}{t_m^2 s^2 + 2 D_m t_m s + 1}$$

It is thus demonstrated that, with the proper choice of parameters, the compensation network adds a double-lead feature in the controller to improve performance during operation when the error is changing, as during conditions of load acceleration, thus reducing the operating error and increasing the stability of the system. The transfer function $G_{12}$ given relates the signal $X_2$ derived from summing unit 531 to the signal $\theta_2$ representing the rotary position of rotary piston 521. The displacement $X_2$ represents the stroking of valve plunger 626 by link 618 and is thus the input to the secondary control unit 532.

The secondary control unit 532 functions as a power amplifier of the displacement $X_2$ to stroke valve sleeve 629 and also to introduce into the servo loop the integral compensation derived from the integration control unit 538. In accordance with the differential positioning of valve plunger 626 and valve sleeve 627, represented by the differencing unit 533, the stroking of the valve sleeve 629 is increased proportionately with time. Relating the stroking of valve sleeve 629 to the differential displacement of plunger 626 and sleeve 627 is the transfer function $D_4$ which is equal to $C_5/s$, as shown at 534 in FIG. 11. The stroking of the valve sleeve 629 displaces right end point 631 of link 630 and thereby displaces the summing point 632 in accordance with a ratio factor $R_6$ represented at 535. The displacement of the summing point 632 in accordance with the stroking of valve sleeve 629 and the output from the integration control unit 538 is applied as degenerative feedback, manifested by stroking of the valve sleeve 627, to the differencing unit 533, thereby to reduce the displacement of valve sleeve 627 relative to valve plunger 626. Disregarding for the moment the effect of the integration control unit upon the secondary control unit, the transfer function for the secondary control unit 532 is $$\frac{K_5}{(t_5 s + 1)}$$

that is, a gain $K_5$ in amplification with a lag having a time constant $t_5$.

Considering now the effect of the integration control unit 538, the same displacement of valve sleeve 627 at point 632 constitutes the input to the integration control unit via link 643 by a stroking of valve 647. The displacement of piston 660 is controlled by valve 647 in accordance with the transfer function $G_3$ represented at 539 as equaling $K_5/s$. That is, piston 660 is stroked in accordance with the first integral of displacement of valve 647. This stroking displaces the column 662 of hydraulic fluid thereby to displace left end point 642 of stroke control lever 630. At the same time, the length of the locked fluid column 662 is varied in accordance with the first integral of displacement of the piston 660 by stroking of valve 540 an amount corresponding to the piston displacement. This integrating action is represented by the transfer function $G_4$ which is shown at 540 to equal $K_4/s$. The locked column 662 of oil thus performs the summing function of summing unit 541. The displacement of the central point 632 of lever 630 in response to displacement of the left end point 642 is related by the ratio factor $R_7$ shown at 542.

Considering the integration control unit as part of the feed-back circuit for the secondary control unit, the transfer function $G_9$ for this feedback circuit is as follows:

$$(8) \qquad G_9 = \frac{R_6 s^2}{s^2 + R_7 K_3 s + R_7 K_3 K_4}$$

The combined transfer function $G_{10}$ for the secondary control unit and the integration control unit is then:

$$(9) \qquad G_{10} = \frac{C_5}{s} \cdot \frac{s^2 + R_7 K_3 s + R_7 K_3 K_4}{s^2 + (R_7 K_3 + R_6 C_5)s + R_7 K_3 K_4}$$

The predominant contribution made by the secondary control unit together with the integration control unit is seen to be a time integration of the displacement $X_2$ together with an amplification by the gain $C_5$.

Except for the values of the parameters, the transfer functions for the remaining portions of the train control system are identical with the transfer functions for the corresponding portions of the elevation control system. Accordingly, the operational differences between the train and elevation control systems may be represented by the contrast in the overall transfer function $G_8$ for the forward circuit of the elevation control system, as given above in expression 4, and the overall transfer function $G_{13}$ for the forward circuit of the train control system which is given as follows:

(10)
$$G_{13} = \frac{1}{t_1 t_2 s^2 + t_2 s + 1} K_c \frac{t_n^2 s^2 + 2 D_n t_n s + 1}{t_m^2 s^2 + 2 D_m t_m s + 1} \frac{C_5}{s}$$
$$\frac{s^2 + R_7 K_3 s + R_7 K_3 K_4}{s^2 + (R_7 K_3 + R_6 C_5)s + R_7 K_3 K_4} \frac{1}{t_6 s + 1} \frac{K_o}{s} \frac{1}{t_o^2 s^2 + 2 D_o t_o s + 1}$$

and the overall open loop transfer function including the tachometer feedback is:

$$\frac{\theta_o}{\theta_E} = \frac{G_{13}}{1 + G_{13} \frac{K_h}{K_s} s}$$

The values of the various parameters for the transfer functions of the train control system are selected generally to provide optimum error characteristics in accordance with the desired performance specifications.

By adjusting the compensator unit to balance the contributions of the first and second derivative components in the displacement of summing point 619 (FIG. 9b) with respect to reciprocal components or terms arising due to compliance in the hydraulic transmission and B-end output shaft, the effects of load inertia are substantially overcome. Then, by adjusting the magnitude of tachometer feedback derived from the B-end tachometer 516 to minimize the error at the roll frequency of the ship, substantially optimum performance may be obtained.

Train OMC System

The same local control stations which are employed for elevating the mount are employed also for training the gun mount. Transfer to local control establishes a new control loop which is considerably simpler and more direct than that employed in remote control. Portions of the control system which are not employed in local control, such as the compensator unit 522 and the integration control unit 538 are neutralized in readiness for transfer back to remote control.

Transfer of the control system from response to remote fire control director 60 to response to local control station 36 assuming for purposes of illustration that the system is in such a pre-existing condition, is accomplished by an opening of switch 555 (FIG. 9a) to disconnect the remote gun order signal, a closing of switches (not shown) in the servo amplifier 70 which correspond to switches 489 and 501 (FIG. 3a) of the elevation servo amplifier 65, opening a switch 900 (FIG. 9a) in series with solenoid 585, closing a switch 901 in series with a solenoid 902, and opening a switch 903 in series with solenoid 824. By these switching operations, the servo amplifier is made responsive to the one man control signal and serves to control stroking of the A-end tilt plate by direct hydraulic connection from the rotary valve 520 to the valve sleeve 629. The rotary piston 521 is returned to its neutral position and the integrating control unit is neutralized.

Referring first to FIG. 7, the one man control unit 36 is seen to be mounted on a fixed base 905 from which there extends a shaft 906 carrying bevel gear 907. In mesh with gear 907 is a bevel gear 908 rotatable on the hand grip shaft 470 but corotative with a sector gear 909 meshing with gear 910 to drive the slider of potentiometer 911. Also driven by gear 909 is a gear 913 corotative with gear 910 and meshing with a gear 914 to drive tachometric generator 915 at a rate corresponding to the rate of rotation of hand grips 468, 469 about the vertical axis of shaft 906.

Referring now to FIG. 9a, an aided tracking signal provided tachometric generator 915 is supplied directly to the servo amplifier 70 similarly to the manner in which the tachometric generator 477 of the elevation OMC system supplies its output. Also in similarity to the elevation OMC system, the train potentiometer 911 is energized from an A.C. source 917 through transformer 918 to supply a signal with reference to ground potential dependent upon the displacement of the slider for potentiometer 911 from its neutral position. The slider is connected by conductor 920 to the mid-tap of a secondary winding 921 of transformer 918 having its terminals connected across another potentiometer 922. This potentiometer 922 has a wiper which, as may be seen in FIG. 9b, is driven by a gear 924 in mesh with a rack 925 formed on valve sleeve 629 and moved therewith. Hence potentiometer 922 serves to introduce a feedback signal dependent upon the position of the valve 629 and serving to balance out the signal derived from potentiometer 911 when the valve sleeve 629 is correctly positioned. The signal developed on the wiper of potentiometer 922 is, therefore, an error signal in accordance with which the torque generator 576 displaces rotary valve 520.

When switch 901 (FIG. 9a) is closed, a circuit is completed from normally de-energized A.C. source 574 through solenoid 902 which is operative through linkage 927 to displace plunger 928 of valve 636 downwardly against the bias of spring 638. In the lower position of valve 636, lower land 637 is underlapped with respect to the portion which it controls so as to place in communication conduits 583 and 639. Thus, the hydraulic fluid in conduit 583 having a pressure determined by the position of rotary valve 520 is applied via conduit 639 to the upper face 708 of valve sleeve 629 directly to control the position of this valve sleeve. At the same time, upper land 929 of valve 636 cuts off communication between conduits 635 and 639 to remove valve sleeve 629 from control by valve 626. It may be noted that upper land 929 does not, however, cut off conduit 635 from $P_1$ pressure in conduit 580 via a choke orifice 930 so that pressure is maintained for accurate response.

Since the rotary valve 520 no longer controls the positioning of the rotary piston 521, it is desirable that rotary piston 521 be returned to its neutral position in preparation for subsequent functioning when the train control system is responsive to a remote gun order signal. To this end, opening of switch 900 de-energizes solenoid 585 to allow valve 586 to be moved to the left by its bias spring 932. This stroking of valve 586 cuts off communication of the rotary piston 521 via conduits 587 and 583 with the rotary valve 520. At the same time, conduit 934 leading from the chamber of valve 615 is placed in communication with the rotary valve 520 via conduit 587. The valve 615 is a two-land, variable position valve which, as noted above, serves to transmit the actuating signal from cam follower 613 to the left end point 617 of link 618 and hence is stroked in accordance with the position and contour of rotary cam 515. When rotary piston 521 and rotary cam 515 are at their neutral positions, valve 615 is also at its neutral position with its upper and lower lands 935, 936 spaced for line-to-line control of the ports in communication respectively with tank pressure in conduit 581 and $P_1$ pressure in conduit 580.

To exemplify the manner in which valve 615 serves to bring rotary cam 515 to its neutral position, consider the instance of rotary cam 515 being rotated clockwise from its neutral position by rotary piston 521. As cam follower 613 then engages the rising parabolic contour 622 of cam 515, valve 615 is stroked downwardly against the bias of spring 614 to port the conduit 934 to $P_1$ pressure in conduit 580. Hydraulic fluid at $P_1$ pressure passes from conduit 934 through valve 586 and conduit 587 to chamber 596 of rotary piston 521. Since the chamber 597 is maintained at $P_2$ pressure, or one-half the value of $P_1$ pressure, rotary piston 521 turns counter clockwise. The corresponding rotation of cam 515 is continued until it reaches its neutral position, whereupon valve 615 is returned to its neutral position restoring balance to the pressure in chambers 596 and 597 of rotary piston 521.

The opening of switch 903 in series with solenoid 824 operates to neutralize the integration control unit just as does opening of switch 822 by the limit stop valve 685. That is to say, solenoid 824 is deenergized to allow valve 827 to move to its left position, thereby to apply $P_1$ pressure to the upper face 829 of valve 653. Control of the positioning of piston 660 of the integration control unit is thereby transferred from valve 647 to neutralizing valve 712, a control loop being established which requires the left end point 642 of link 630 to return to its neutral position, representing a zero integration input.

It may be noted that the limit stop mechanism remains effective during operation of the train control system under local control both to arrest motion into the right or left train limit stops and to avoid entry of the gun mount into interference zones. The characteristics of operation and the response of the gun mount in train when in local control will be understood from the discussion above in connection with the elevation one-man-control system. It may be noted, however, that provision is made for adjusting the magnitude of the aided tracking signal derived from OMC tachometer 915 so that the greater inertia of the gun mount in train with respect to the gun in elevation may be overcome by a proportionately greater aided tracking train order signal.

In the foregoing description of the train and elevation portions of the gun laying system of this invention, various arrangements for accomplishing the desired control functions have been described in detail which are susceptible of numerous modifications lying within the principles of the invention. Thus, equivalent electrical, mechanical and hydraulic elements may, if desired, be substituted one for another in the performance of specified functions. The character of the input signals and of the load which is positioned may also be varied in accordance with the desired applications of the control system.

To exemplify one further application of the positional control system of the invention, there is shown in FIGS. 12–17 a positional control system for a missile launching mechanism, commonly known as a missile launcher. While this control system is usable with both land-based and ship-borne missile launchers, it is particularly well suited for the ship-borne type. Associated with the missile launcher may be a suitable missile guidance system, preferably of the type which provides a radar guidance beam serving to guide the missile toward a target destination. At the time of launching a missile, the guidance beam is directed at a given azimuth and elevation angle, generally determined by tracking of a target. The primary purpose of the missile launcher is then to determine the initial azimuth and elevation angle of the missile when launched to secure a trajectory which brings the missile into the influence of the guidance beam for "capture" or response to the guidance intelligence. Since at the instant of missile launching, the guidance beam may be moving rapidly to track a target, it will be apparent the missile must be positioned with a high degree of accuracy and speed of response.

Figure 12:
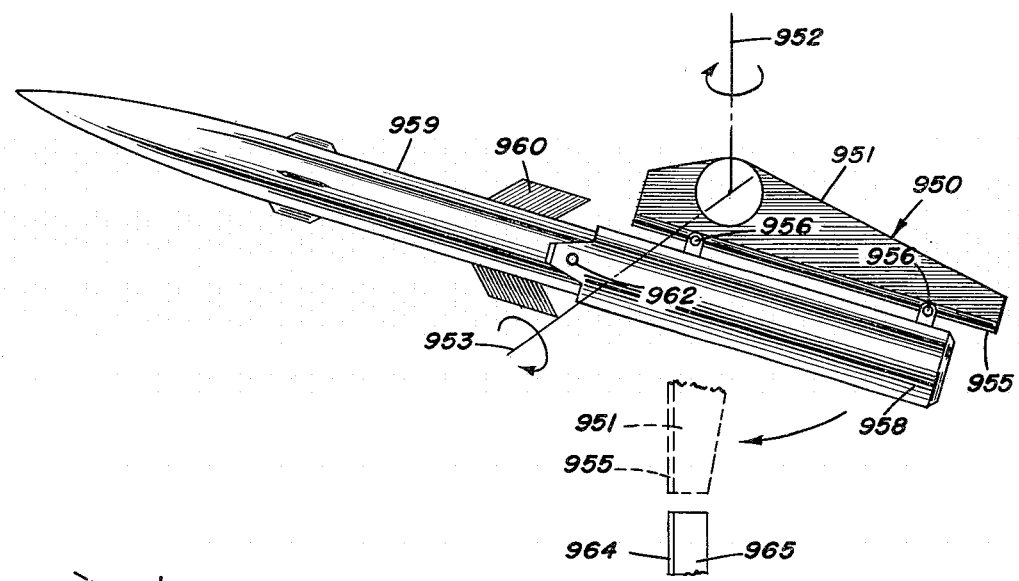
FIG. 12 is a diagrammatic representation of a missile launcher with a missile in launching position.

In the diagrammatic representation of FIG. 12, a missile launcher 950 is shown comprising a frame work 951 which may be rotated about a vertical axis 952 in accordance with an azimuth order signal and about a horizontal axis 953 in accordance with an elevation order signal. On the frame work 951 is a launcher rail 955 engaged by shoes 956 which serve to support a booster portion 958 of a missile. The principal portion 959 of the missile may suitably carry control surfaces 960 and control apparatus for such surfaces responsive to intelligence imparted by a guidance beam. In order that the primary portion 959 of the missile may be released from the booster portion 958 when the booster power is expended, a suitable releasable connection 962 between the portions is provided. In general, the connection 962 of the missile sections is not rigid but is of a type which may be represented for purposes of stress analysis as a pin connection.

It may be oberved that the shoes 956 serve to position the main section of the missile by forces acting through the connection 962 at the rear of the main section. Because the center of gravity of the main section is positioned at a considerable distance outwardly of its point of support, substantial stresses are imposed on the connection 962 particularly when the motion imparted to the missile has components of a frequency corresponding to the natural resonant frequency of the booster-supported missile. To prevent a premature breaking of the connection 962 during positioning movements, the control system of this invention is designed to repress positional movements at this resonant frequency, which may be on the order of a few cycles per second.

A further requirement upon the control system arises from the necessity of returning the missile launcher 950 to a fixed load position. This load position may, for example, correspond with a position in which the launcher rail 955 is aligned with a loading rail 964 carried by a loading framework 965. To insure the maximum effectiveness of the missile launcher, the time required for the launcher framework to move to its loading position and then back to a beam capture position must be a minimum. When parallel rails are provided so that the launcher may carry two missiles, response to the torque acting upon the launcher when one missile is "wing-fired" should be a minimum.

Figure 13:
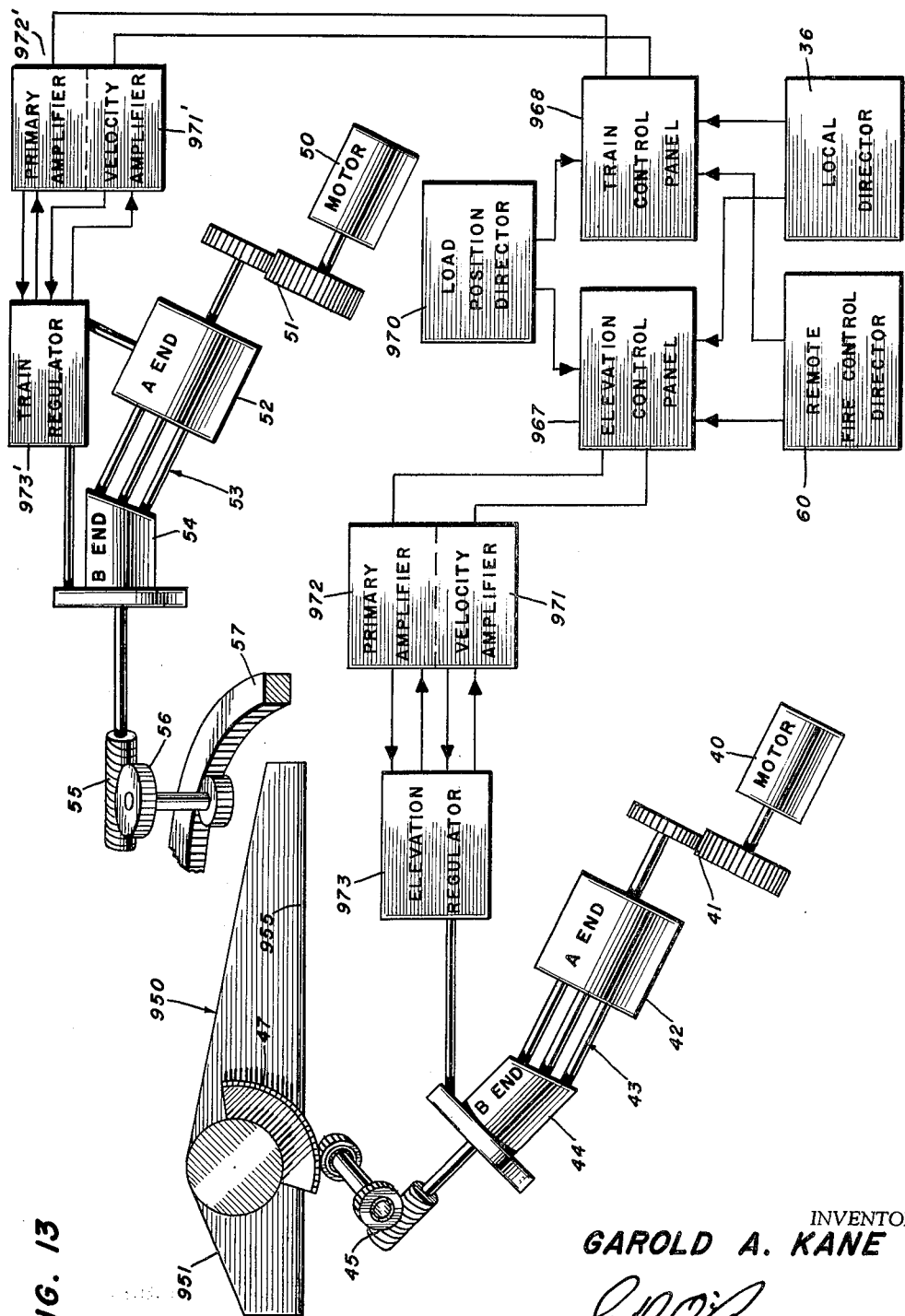
FIG. 13 is a diagrammatic representation of a control system for a missile launcher, arranged in accordance with the invention.

In the case of the missile launcher, the train and elevation control systems may have substantially the same form. For convenience, therefore, the following description is of the elevation control system, note being taken of such differences as may suitably be incorporated in the train control system. In diagrammatic form, an elevation control system is shown in FIG. 13 together with a train control system, the former incorporating the principles of the invention. The motive means coupled in driving relation to the training circle 57 and elevating arc 47 for the missile launcher 950 may be substantially identical with that illustrated in FIG. 1 for the gun laying system, the train and elevation control systems, however, being distinctive. Selective switching arrangements are incorporated in elevation and train control panels 967 and 968 to render the control system responsive to a remote fire control director 60, local director 36 or a load position director 970, as desired.

From the elevation control panel may be derived launcher elevation velocity and position orders which are supplied respectively to a velocity servo amplifier 971 and a primary servo amplifier 972, together serving to energize an elevation regulator 973. Similarly from the train-control panel 968 are derived train velocity and position orders which are supplied, respectively, to a train velocity servo amplifier 971' and a primary servo amplifier 972'. A train regulator 973' is energized by these servo amplifiers to control the train motive means having driving connection with the training circle 57.

*Missile Launcher Control System*

Referring now to the block diagram of FIG. 14, the missile launcher control system (train or elevation) is shown to have two inputs, a position order signal $\theta_i$ and a velocity order signal $d\theta_i/dt$. The position input signal $\theta_i$ is applied together with a B-end response signal $\theta_o$ to an error detecting unit 976 which serves to supply an error signal $\theta_E$ representing the difference of $\theta_i$ and $\theta_o$ to a primary control unit 978. The purpose of the primary control unit 978, like that of primary control unit 78 in FIG. 2, is to position rotary cam 80 by an amplified and somewhat modified version of the system error signal $\theta_E$. To this end, the primary control unit incorporates a closed control loop comprising an error detecting unit 981 responsive to the error signal $\theta_E$ to supply a signal via differencing unit 982 to an amplifier and torque motor assemblage 984. A valve and piston combination 986 serves, by amplification of the torque motor output, to provide a mechanical signal for displacement of the cam 80 and for degenerative feedback to the error detecting unit 981.

A mechanical output signal is derived from cam 80 which is supplied both to a summing unit 988 and to an integration control unit 990. In contrast to the integration control unit 90 of FIG. 2, the integration control unit 990 of FIG. 14 includes not only a valve and piston combination 992 but also a response potentiometer 993 driven mechanically by the valve and piston combination to produce an electrical signal which is supplied to summing unit 994. Thus, instead of supplying the output of the integration control unit 990 directly to the summing unit 988, it is added to a version of the velocity order signal derived from a low pass filter 995 and supplied to a velocity input control unit 996. In electrical form the combined signal is applied to an error detecting unit 997 of the velocity input control unit 996 to be translated into a mechanical signal by an amplifier and torque motor arrangement 998 and a valve and piston combination 999 of the velocity input control unit. To provide degenerative feedback to the error detecting unit 997, a response potentiometer 1000 is driven mechanically by the valve and piston combination 999 to supply an electrical feedback signal. The mechanical signal output of the velocity input control unit is supplied to the summing unit 988 for combination with the mechanical signal derived from cam 80.

The remainder of the missile launcher control system conforms generally to the gun elevating control system of FIG. 2. Thus, the mechanical signal derived from summing unit 988 is supplied to stroke control unit 1001 for linear amplification by the servo loop which includes error detecting unit 1002 and a valve and piston combination 1004. Mechanical output from the valve and piston combination 1004 is supplied degeneratively to the error detecting unit 1002, as well as being supplied in the form of a stroke control signal to the hydraulic transmission 43. In accordance with the stroke control signal, the hydraulic transmission 43 determines the velocity of the load which, in this case, is the missile launcher 950.

The B-end response or output signal $\theta_o$, which has a value corresponding with the position of the load 950, is supplied degeneratively to the error detecting unit 976 to close the main control loop and is also supplied to B-end tachometer 1006 which generates an electrical rate signal for application degeneratively to the differencing unit 982 of the primary control unit 978.

Comparing the control systems of FIGS. 2 and 14, it may be observed that the launcher control system differs basically from the elevation control system described in connection with FIG. 2 by virtue of the introduction of the velocity order signal $d\theta_i/dt$ for combination with the output signal of the integration control unit and injection together into the main control loop. The purpose of the open loop velocity signal circuit is to stroke the hydraulic transmission in proportion to the launcher velocity order signal and, more particularly, to repress components of control action which are at the resonant frequency of the main and booster sections of the missile.

*Launcher Primary Control Unit 978*

Figure 15A:
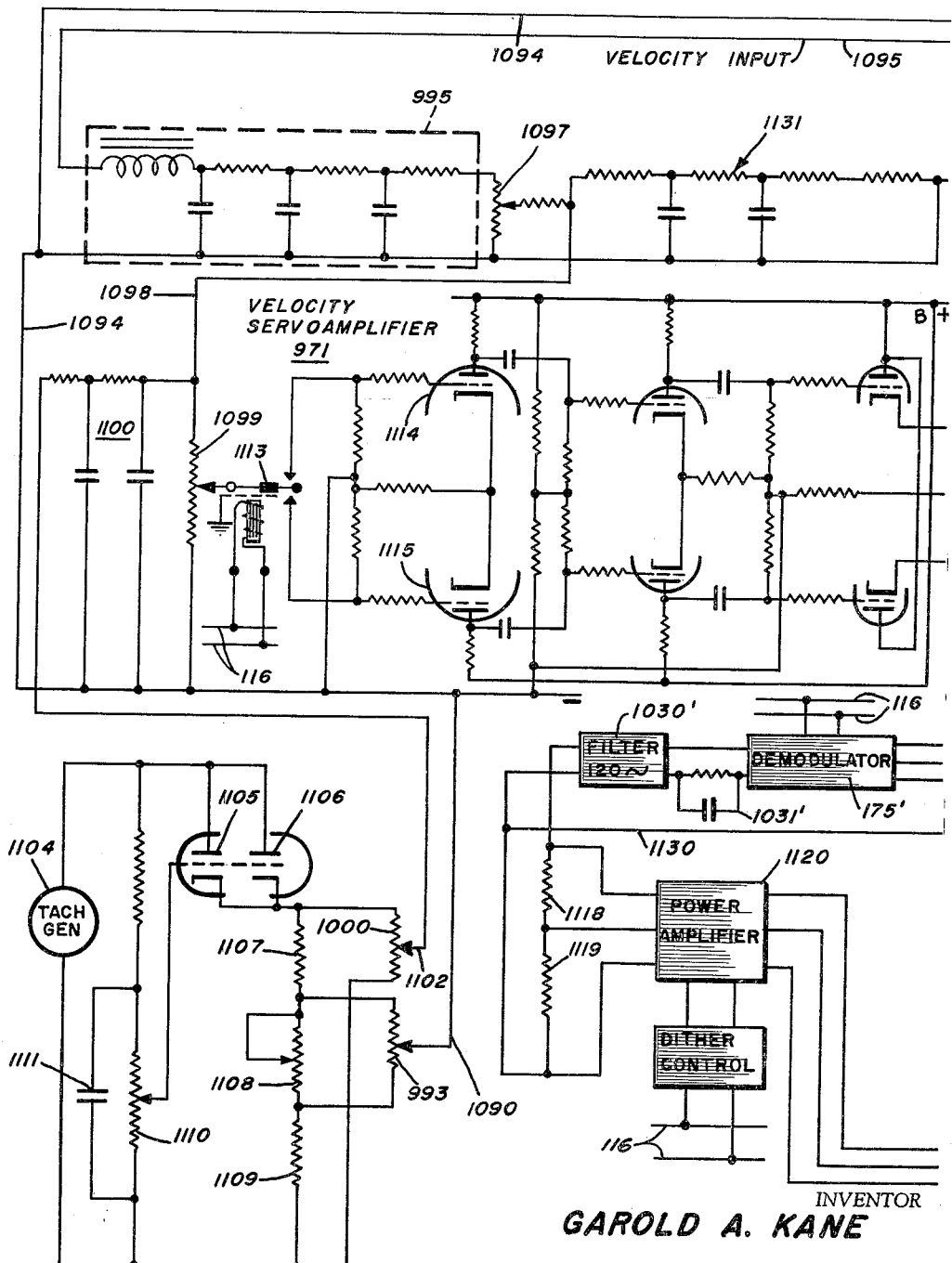
FIGS. 15a, 15b, 15c, 15d and 15e are a schematic diagram of the launcher elevation control system.
Figure 15B:
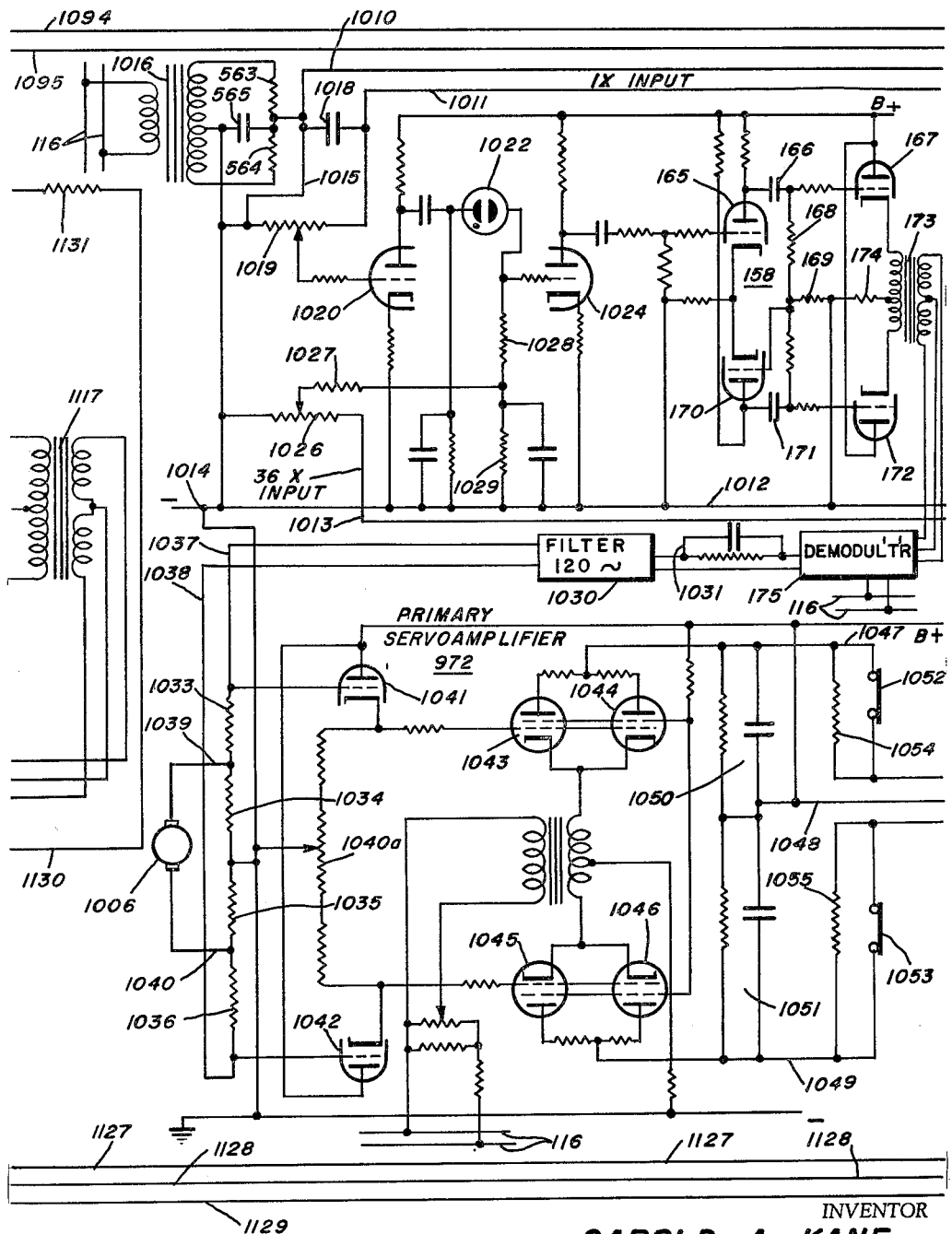
Figure 15C:
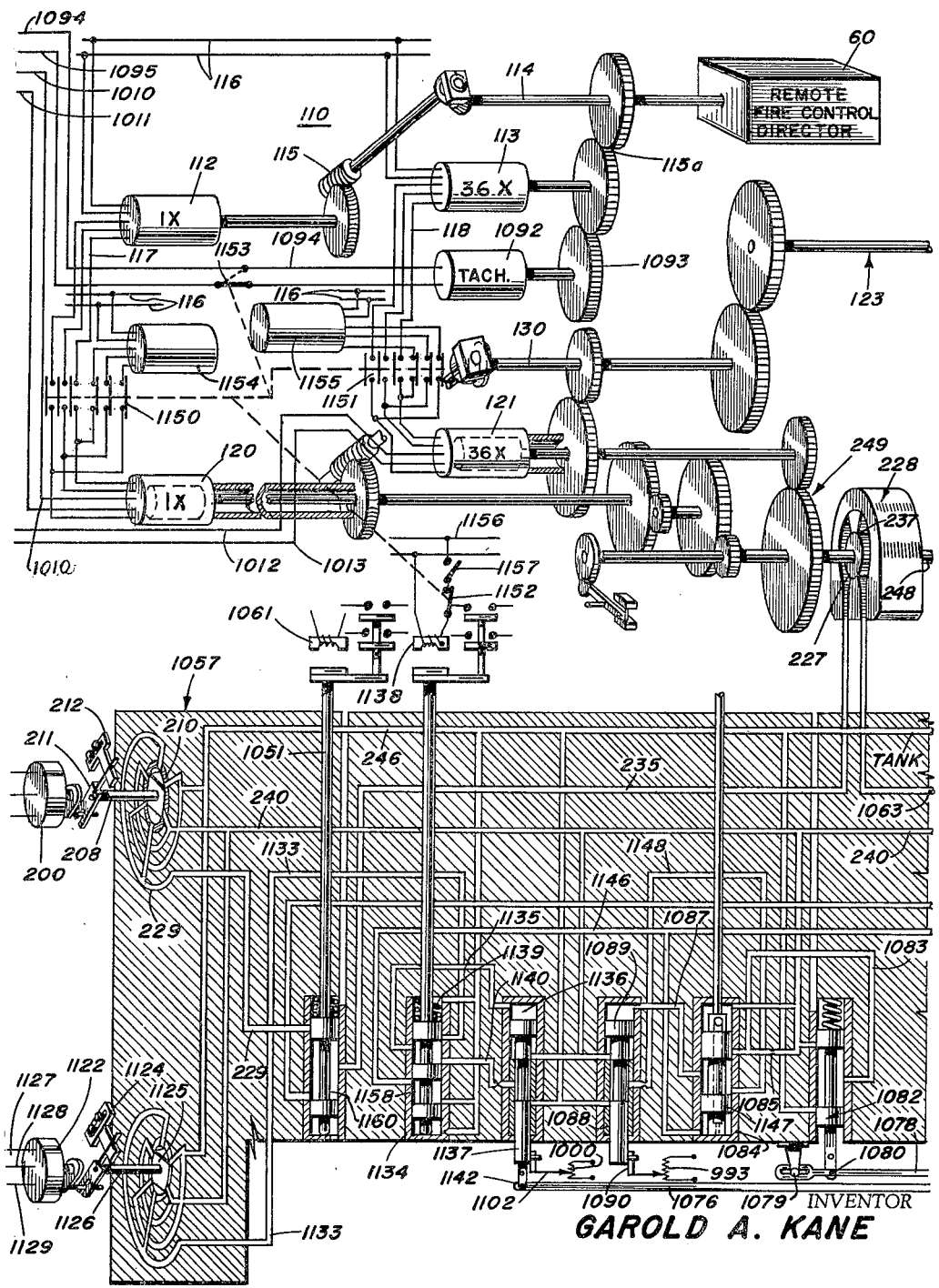

The source of 1X and 36X position order signals for the primary control unit is shown in FIG. 15c to include the remote fire control director 60 in driving connection with the one-speed synchro generator 112 and the 36-speed synchro generator 113, the identifying numerals being similar to those employed in FIG. 3b. Via conductors 117, the one-speed position order signal is impressed upon the stator of synchro control transformer 120, while conductors 118 carry the 36-speed position order signal to the stator of synchro control transformer 121. Such synchro control transformers perform the error measuring function of units 976 and 981 (FIG. 14). Thus, the stators of the synchro control transformers 120, 121 are rotationally displaced in accordance with a degenerative output position signal mechanically coupled from the B-end 44 (FIG. 15e) by driving connection 123, 130. The magnetic field direction in the rotor resulting from the differential effect of the position order signal applied to the stator windings and the mechanical displacement of the stator windings by the B-end response signal represents the system error $\theta_E$ which is applied to the primary control unit 978.

The primary control unit serves by a closed control loop to position the rotors of the synchros 120, 121 in linear corerspondence with the system error signal, thereby to similarly position rotary cam 80, neglecting for the moment the effect of tachometric feedback introduced by the B-end tachometer 1006 (FIG. 15b). Stated another way, the primary control unit serves to move the synchro rotors to a position minimizing the potential induced therein by the magnetic field generated in the stator, movement of the rotors being effected by the feedback gear train 249 driven by rotary piston 228. A primary control signal $\theta_p$ is then derived from the rotors of the synchros 120, 121, the rotor of synchro 120 being connected by conductors 1010, 1011 to the 1X input of servo amplifier 972 and the rotor of synchro 121 being connected by conductors 1012, 1013 to the 36X servo amplifier input. Both conductors 1010 and 1012 are connected to the negative terminal 1014 of a suitable anode current supply, conductor 1010 being connected via a bypass conductor 1015 which is employed in the elevation servo amplifier to prevent introduction of the so-called anti-stick-off voltage derived from the synchro offset transformer 1016 which is employed in the train servo amplifier. Conductor 1011 connects through an R-C phase correcting network 1018 to the ungrounded terminal of a potentiometer 1019 from which an adjustable amount of 1X input signal is derived for application to the control grid of triode 1020. Phase shift correction is introduced to compensate for phase shift in the synchro control transformer, thereby to bring the input signal into phase with the synchro excitation carried by conductors 116 and applied to the input of transformer 1016. The 1X input signal is amplified by triode 1020 for application across neon tube 1022 in the circuit which couples triode 1020 to the control grid of triode 1024. Due to the voltage breakdown characteristics of neon tube 1022, however, only amplified 1X signals exceeding a predetermined threshold value cause the neon tube to conduct, thereby to couple them to the grid of triode 1024. By suitably adjusting the slider of potentiometer 1019, the 1X signal may be made sufficient when the error which it represents is, for example, 2½°.

The 36X signal is applied to the input of the A.C. amplifier by conductors 1012, 1013 across potentiometer 1026 (FIG. 15b) having a wiper connected through resistor 1027 to the junction of voltage dividing grid resistors 1028, 1029 which are connected to the grid of triode 1024 and in series with neon tube 1022. Thus, the 36X signal is always applied to the grid of triode 1024 regardless of its signal strength. Because the synchros 112, 113 are excited from the same synchro power supply 116, the 1X and 36X signals applied to the grid of triode 1024 are in phase. It may be observed that when the 1X signal is sufficiently large to be transmitted via neon tube 1022, its amplification in triode 1020 ensures that it is sufficiently large relative to the 36X signal to predominate in controlling the response of the system.

The amplified signal derived from triode 1024 is coupled to a phase-inverter amplifier stage 158 including triodes 165, 170 arranged similarly to the corresponding stage of the servo amplifier described in connection with FIG. 3a here above. A balanced output is derived from transformer 173 which is coupled to the input of demodulator 175, the demodulator being energized by a reference or sensitizing signal from the synchro power supply 116. With a synchro power supply frequency of 60 cycles, a 120 cycle pulsating D.C. signal appears in the output of the demodulator along with the desired signal, and is rejected in filter 1030 coupled by a phase correcting network 1031 to the output of the demodulator 175. In a practical embodiment, the phase correcting network 1031 not only serves to correct an undesirable phase shift arising in filter 1030, which may be of the "twin T" type, for example, but also attenuates higher frequency signals, such as signals in the frequency range of 20 to 30 cycles per second and higher.

In a potentiometer comprising resistors 1033—1036, the filtered and attenuated output of the demodulator 175 is combined with the B-end velocity feedback derived from tachometric generator 1006. Thus the output terminals of filter 1030 are connected by conductors 1037, 1038 to the outer terminals of resistors 1033 and 1036, respectively, while conductors 1039, 1040 connect the terminals of the generator 1006 to the junction of resistors 1033, 1034 and of resistors 1035, 1036, respectively. The junction of resistors 1034, 1035 is connected to ground, so that a potential with respect to ground is applied to the grids of triodes 1041, 1042 representing the demodulator output and B-end velocity feedback signal combined in suitable proportion. Triodes 1041, 1042 are connected to operate as cathode follower input stages for a balanced amplification stage of the D.C. amplifier 972, which includes power amplifying tetrodes 1043, 1044 in parallel having their control grids connected to the output of triode 1041 and power amplifying tetrodes 1045, 1046 in parallel having their control grids connected to the output of triode 1042. Potentiometer 1040a in the cathode circuits of triodes 1041, 1042 has its slider grounded and adjustably positioned to achieve balance of the D.C. amplifier so that a null signal output is obtained with a zero input signal. For this null condition, then, steady equal currents are supplied to the respective coils of torque generator 200 via conductors 1047—1049 to produce a balanced torque which holds the rotary valve 210 in its neutral position. Depending upon the polarity of a signal applied to the D.C. power amplifier 972, current through one of conductors 1047, 1049 is increased, while the current through the other conductor is decreased, thereby producing a net torque in the torque generator 200 tending to deflect rotary valve 210 against the restoring force of spring 211. Surge voltages accompanying rapid changes in currents supplied to the torque generator coils are suppressed by parallel RC circuits 1050, 1051 connected between conductor 1048 and each of conductors 1047, 1049. While current flows to the coils of torque generator 200 via normally closed contracts 1052, 1053 in series, respectively, with conductors 1047 and 1049, these contacts are arranged to be opened when the rotary piston 228 reaches either of the limits of its travel. Reduced current then flows to the torque generator coils via current limiting resistor 1054 or 1055.

Valve 210 which is positioned by torque generator 200 is assembled in valve block 1057 and is arranged to function in the same manner as was described in conjunction with FIG. 3b. That is, the rotary valve 210 controls communication of either $P_1$ pressure contained in conduit 240 or tank (zero) pressure in conduit 246 with the control ports for conduit 229. Referring now to FIG. 15c, the conduit 229 is placed in communication with conduit 235 leading to chamber 227 of rotary piston 228 when plunger 1051 of valve 1160 is stroked to its upper position by solenoid 1061. That is, the upper land of valve 1160, which normally overlaps the port for conduit 229, moves to an underlapped position upon energization of solenoid 1061, whereby the pressure in chamber 227 of rotary piston 228 is controlled by rotary valve 210. The other chamber 237 of rotary piston 228 is in communication via conduit 1063 with a combination of derivative-taking valves 1064 and 1065 serving to maintain the pressure in such chamber 237 accurately at a value of one-half $P_1$ pressure or 200 p.s.i.

More particularly, conduit 1063 communicates with the annular upper surface of plunger 1066 for valve 1064 having an area twice that of the annular surface directed downwardly and exposed to $P_1$ pressure communicated via conduit 240. Whenever the pressure in conduit 1063 departs from exactly one-half $P_1$ pressure, the plunger 1066 is stroked, thereby stroking link 1067 about its fixed left end point 1068. Rotation of link 1067 strokes the plunger of valve 1065 which is connected to an intermediate point 1069 along link 1067. Valve 1065 has upper and lower lands spaced in line-to-line relation with ports for conduits 240 and 246, respectively, carrying $P_1$ and tank pressure. Conduit 1063 communicates with the chamber intermediate the upper and lower lands of valve 1065 for communication with $P_1$ or tank pressure depending upon the direction of stroking of valve 1065. To smooth or damp the action of valve 1065, thereby to prevent oscillations, $P_1$ pressure in conduit 240 also communicates through a choke orifice 1170 with the chamber of valve 1065. It will be observed that valve 1065 is maintained in its neutral position only when the pressure in conduit 1063 is one-half that in conduit 240 and that departure of the pressure in conduit 1063 from one-half of $P_1$ pressure strokes the plunger 1066 of valve 1064 in a direction to restore its value to one-half of $P_1$ pressure, thereby to return valve 1065 to its line-to-line position.

Accordingly, departure of the pressure in chamber 227 of rotary piston 228 from the substantially constant pressure maintained in chamber 237 by valves 1064, 1065 moves rotary piston 228 in a direction determined by the pressure differential.

While the feedback control loop of the primary control unit 978 is completed through gear train 249 serving to transmit mechanical feedback from rotary piston 228 to the synchros 120 and 121, the output of the primary control unit 978 is transmitted as a mechanical rotation of rotary cam 80. This cam has a configuration described above but is assembled on shaft 248 in a reversed position to preserve the proper polarity of response. The cam 80 acts through a cam follower roller 1072 to displace plunger 1073 of valve 1074, thereby to displace an intermediate point, such as the center point 1075 of stroke control lever 1076 a corresponding amount. In addition to displacing point 1075 of the stroke control lever 1076 which serves the function of the summing unit 988 of FIG. 14, cam 80 also displaces the end of link 1078, which is connected to the valve plunger 1073, for rotation about the fixed fulcrum 1079 at its opposite end. The resulting displacement of an intermediate point 1080 of link 1078 constitutes the mechanical input signal to the integration control unit 990.

*Launcher Integration Control Unit 990*

The integration control unit 990 has the purpose of augmenting low values of primary error to render the control system capable of reducing small positional errors rapidly toward zero, even when the order signal is changing rapidly. That is, the integration control unit is responsive to the output of the cam 80 which, for small values, is proportional to the primary error signal, and adds to the primary error signal an integral compensation signal which causes an additional stroking of the stroke control lever 1076. Unlike the integration control units associated with the gun laying system described above, the integration control unit 990 is characterized by only a single integration and has an electrical rather than a mechanical output.

More particularly, a mechanical input signal is applied to the integration control unit from rotary cam 80 via valve plunger 1073 and pivoted link 1078 to a valve 1082 having its plunger pivotally connected to link 1078 at the point 1080. Valve 1082 is a two-land spool-type valve, the upper and lower lands being spaced for line-to-line control of ports having communication respectively with $P_1$ pressure in conduit 240 and tank pressure in conduit 246. A control port in communication with the chamber intermediate the upper and lower lands opens upon a conduit 1083 connecting with a port of a valve 1084. To smooth the control action of valve 1082, $P_1$ pressure is placed in constant communication with the valve chamber through choke orifice 1085 and conduit 1083. When the valve 1082 is in its neutral position, as is the case when cam 80 is in its neutral position, the pressure communicated through the control port of valve 1082 via conduit 1083 is substantially one-half of $P_1$ pressure or 200 p.s.i. Downward stroking of the valve 1082 lowers the controlled pressure and upward stroking raises this pressure.

Valve 1084 is shown in the position which it assumes in order to block the integration signal. Under normal operating conditions, the plunger of valve 1084 is moved by a pressure differential to an upper position which places conduit 1083 in communication with a conduit 1087 via the chamber of valve 1084 intermediate its upper and lower lands. The conduit 1087, in turn, communicates with the upper chamber of a cylinder 1088 in which a piston-valve 1089 travels. The upper face of piston-valve 1089 defines the lower wall of the upper chamber and is thus exposed to the pressure controlled by valve 1082 and communicated via conduits 1083 and 1087. The piston-valve 1089 has a lower face which is one-half the area of the upper face and it is exposed to $P_1$ pressure in conduit 240. When the valve 1082 is at its neutral position to maintain a pressure in conduit 1083 of one-half $P_1$ pressure, the forces acting on the piston valve 1089 are balanced so that the piston-valve remains stationary. Connected to the lower end of piston-valve 1089 outwardly of the valve block 1057 is the slider 1090 of potentiometer 993 (FIGS. 15a and 15c). It will thus be seen that departure of the valve 1082 from its neutral position when stroked by the cam 80 disturbs the balance of forces acting on piston 1089 thereby to move the slider of potentiometer 993. Since the displacement of the slider continues so long as the pressure controlled by valve 1082 does not balance the $P_1$ pressure acting on piston 1089, the positioning of the slider is in accordance with the time integral of the displacement of valve 1082. Accordingly, the integration control unit supplies an electrical signal as its output which varies as the time integral of the stroking afforded by the rotary cam 80.

Before considering the manner in which this integral signal is utilized, it is convenient to consider the manner in which the velocity order signal is introduced from the remote fire control director 60. Referring still to FIG. 15c, a tachometric generator 1092 is seen to have its rotor driven through gear train 1093 by the output shaft 114 of remote fire control director 60. In accordance with the rate or velocity of the order signal from director 60 represented by the rate of rotation of its output shaft 114, there will be developed on the output terminals of tachometer 1092 a corresponding D.C. potential which is the electrical signal $d\theta_i/dt$ supplied as the velocity input. Insulated conductors 1094, 1095 connect the output terminals of the tachometer 1092 with the low pass filter 995 (FIG. 15a). Conveniently, the potential of conductor 1095 is positive with respect to that of conductor 1094 and conductor 1094 serves as a ground or B-bus.

It will be recalled from the discussion above that the missile 959 and booster 958, which are appropriately used with the missile launcher of this invention, have a mechanical construction which is particularly susceptible to failure under stresses of a particular frequency, such as about 3 cycles per second. To avoid such a structural failure the combined effect of the forward loop velocity signal and the input position signal added together by summing means 988 is made to be substantially zero at the value of critical frequency so that the output $\theta_o$ is reduced, at this frequency, to substantially zero. This is accomplished by providing the filter 995 (FIG. 15a) in the forward velocity loop which, with other elements in this forward loop, properly attenuates the velocity signal and shifts the effective phase of the velocity signal by approximately 270 degrees at the value of critical frequency. It will be appreciated that the velocity signal, when shifted 270° in the lagging direction, will be 180° out of phase or in direct opposition to the incoming signal $\theta_i$. The effective total signal will then be zero if the amplitudes of the two signals are identical, thereby to create a notch in the frequency-amplitude characteristics of the system output at the critical frequency.

There is connected across the output of the filter 995 a potentiometer 1097, the slider of which is connected by a conductor 1098 to a first terminal of potentiometer 1099 at the input of the velocity signal amplifier 971. In order to impress the output of the integration control unit upon the input of the velocity signal amplifier 971, 1090 of potentiometer 993 is connected to the second terminal of input potentiometer 1099, while wiper 1102 of potentiometer 1000 is coupled by low pass filter network 1100 with the first terminal of potentiometer 1099. Wiper 1102 of potentiometer 1000 is thus connected to the same terminal of potentiometer 1099 as is the velocity input signal and applies a feedback potential to the input of the velocity signal amplifier which varies degeneratively with respect to the potential on slider 1090 of potentiometer 993. Before considering the circuitry of the amplifier 971, the manner of energizing the potentiometers 993 and 1000 is considered.

As illustrated in FIG. 15a, the integrating potentiometer 993 and the velocity feedback potentiometer 1000 are excited with a D.C. voltage derived from a tachometric generator 1104 which may suitably be driven from the transmission motor 40, for example. Connected across the terminals of the generator 1104 is a pair of triodes 1105, 1106 arranged in parallel and having a potential divider comprising series resistors 1107, 1108, 1109 in their cathode circuits. The control grids of the triodes 1105, 1106 are connected to the slider of a high resistance potentiometer 1110 in parallel with a capacitor 1111. The capacitor 1111 and potentiometer 1110 have a relatively long time constant so as to resist changes of the bias potential applied to the control grids and thereby render substantially constant the current passed through the potential divider resistors 1107—1109. By adjusting the value of variable resistor 1108, the potential developed across the potential divider and applied to the potentiometer 1000 is suitably made approximately three times as great as the potential across variable resistor 1108 and applied to potentiometer 993. In consequence, the integration control signal is supplied to the input of the velocity signal amplifier 971 with one-third as great a sensitivity as the potential derived from the velocity feedback potentiometer 1000.

*Velocity Input Control Unit 996*

The velocity order signal together with the integration control signal and the velocity feedback signal are applied to the amplifier 971 (FIG. 15a) through a converter or vibrator 1113 which is conveniently energized by the synchro power supply 116 to have a correctly phased operation. The converter 1113 serves both to switch the input signal between the control grids of balanced triodes 1114, 1115 and to change the D.C. input signal into an A.C. signal for amplification in the plural, balanced stages of the amplifier. These stages being of conventional design, it is not deemed necessary to describe them in detail. From the cathode circuits of the last stage of the amplifier, a balanced signal output is derived which is coupled by a transformer 1117 to the input of demodulator 175'. Just as described above in connection with the demodulator 175 in the primary amplifier shown in FIG. 15b, the demodulator 175' of FIG. 15a is sensitized with a reference signal conveniently derived from the synchro power supply 116 and has its output coupled via stabilizing RC circuit 1031' to a filter 1030' for attenuating 120 cycle components. The output of the filter 1030' is a D.C. signal which is applied across potential dividing resistors 1118, 1119 having their terminals connected to the input circuit of an A.C. power amplifier 1120. While the power amplifier 1120 may be of any suitable design, conveniently it is substantially identical to the power amplifier 972 shown in FIG. 15b and described in conjunction therewith. The output of amplifier 1120 is coupled to the terminals of torque generator 1122 which, in similarity to torque generator 200, operates against bias spring 1123 secured to bracket 1124 to adjustably position a rotary valve 1125 to which it is coupled by a shaft 1126. The connection between power amplifier 1120 and torque generator 1122 is afforded by conductors 1127, 1128, and 1129, the conductor 1128 conveniently being grounded so that signals carried by either of lines 1127 or 1129 are of opposite polarity.

To minimize distortion in the balanced A.C. amplifier and thereby to linearize its response, a degenerative feedback circuit is provided between the output of filter 1030' and the input of the A.C. amplifier via conductors 1130 and 1098 and low pass filter 1131. The low pass filter 1131 serves to attenuate relatively high frequency signals which might be associated with oscillating gun order inputs.

The rotary valve 1125 (FIG. 15c) may be identical to the rotary valve 210 and is similarly connected to $P_1$ pressure in conduit 240 and tank pressure in conduit 246. The controlled port of valve 1125 is in communication via conduit 1133, a solenoid operated valve 1134 and conduit 1135 with the upper face 1136 of piston 1137. While valve 1134 is shown in its neutralizing, lower position, it is normally maintained by the energization of solenoid 1138 in its upper position against the biasing force of spring 1139. The valve 1134 is a three-land, spool-type valve, the upper and middle lands serving selectively to place either conduit 1133 or a conduit 1140 in communication with conduit 1135. When valve 1134 is drawn by solenoid 1138 to its upper position, therefore, communication is afforded between the controlled port of valve 1125 and the upper face 1136 of piston 1137, and a pressure differential across the piston may be created with respect to $P_1$ pressure communicated to the lower face of the piston. With an area of the lower face one-half that of the upper face of piston 1137, variation of the control pressure about a nominal value which is one-half of $P_1$ pressure results in upward or downward stroking of the piston 1137. Like piston 1089, piston 1137 has an exposed portion protruding from the valve block 1057 and, in this instance, carrying slider 1102 of the velocity feedback response potentiometer 1000. The electrical connection of the slider 1102 to the input of the velocity servo amplifier 971 has been described above. There is thus completed a feedback control loop which serves to maintain a correspondence between the stroking of the piston 1137 and a signal representing the weighted sum of the velocity input signal and the integration control signal, such signals being combined at the input of the velocity amplifier 971. The correspondence which is thus achieved by the velocity input control unit 996 may be likened to a linear signal amplification coupled with a conversion of the electrical signal input into a mechanical output signal.

More particularly, a mechanical output signal representing the weighted sum of the velocity input signal and integration control signal is obtained by the pivotal connection of piston 1137 to the stroke control lever 1076 at its left end point 1142. The stroke control lever 1076 which is the mechanical embodiment of summing unit 988 of FIG. 14 thus combines a movement of its left end point 1142 in accordance with the stroking of piston 1137, with a stroking of its midpoint 1075 additively to stroke plunger 263 (FIG. 15e) pivotally connected to right end point 1144 of the stroke control lever and slidable in valve sleeve 269. The plunger 263 is thus stroked in accordance with the algebraic summation of a first term which varies with system error (over the range of linear stroking of center point 1075 by rotary cam 80), a term which is a time integral of system error (the integration being obtained by displacement of piston 1089 with stroking of valve 1082), and a term varying with the velocity order signal $d\theta_i/dt$ derived from the fire control director 60. Due to the characteristics of the forward velocity signal path, therefore, the frequency components of the velocity order signal at the critical rupture frequency of the missile are subjected to a 270° phase lag so as to be combined negatively in the summation afforded by the stroke control lever 1076. Critical frequency components in the output signal are thereby attenuated. The character of the signal represented by the displacement of stroke control lever 1076 in the presence of large system errors will be considered subsequently under the heading "Launcher Synchronization."

*Launcher Stroke Control Unit 1001*

The stroke control unit 1001 of the missile launcher may be arranged structurally exactly as is the stroke control unit 100 of the elevating control for the gun laying system (FIG. 3d) and serves the same function. Like reference numerals are employed to designate these similar parts and to facilitate a reference to the foregoing description.

The stroke control unit 1001 (FIG. 15e) for the missile launcher serves to stroke the A-end 42 of the hydraulic transmission in linear correspondence to the stroking of plunger 263 by stroke control lever 1076, proportionately to adjust the velocity or angular speed of output shaft 290 for the B-end 44. While the output of the B-end 44 is seen in FIG. 13 to drive the missile launcher in elevation through worm gearing 45, the foregoing description directed to the elevation control system for the missile launcher applies equally to the train control system which responds to train order signals to correspondingly position the missile launcher in azimuth.

Figure 16:
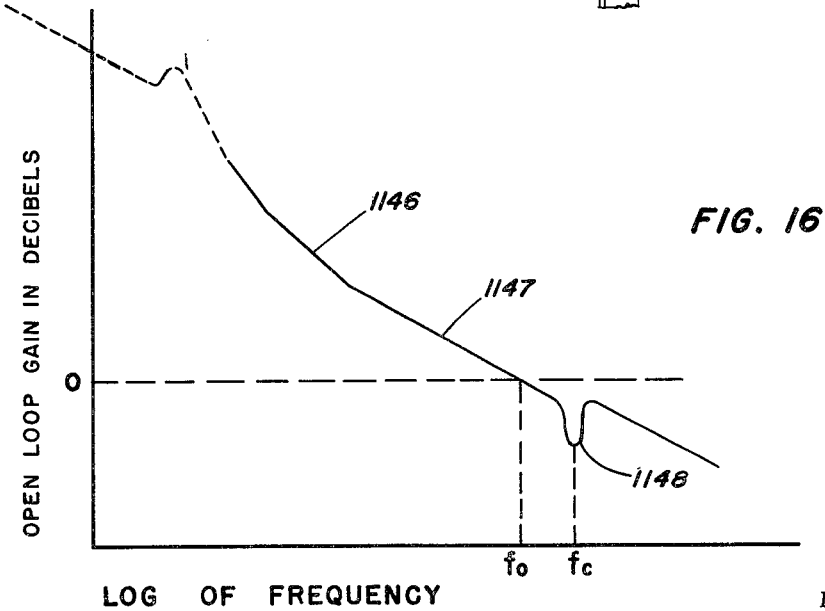
FIG. 16 is a Bode diagram or gain-frequency plot for the launcher control system.

The operating characteristics of the missile launcher positioning system afforded by the multiple loop control including the open loop velocity input is conveniently represented by the curve 1146 plotted in FIG. 16 with reference to gain or attenuation in decibels as the ordinate and frequency as the abscissa. In accordance with a straight line approximation, the curve 1146 includes a 20 db/decade characteristic 1147 extending through zero db at a frequency $f_o$ and having a notch 1148 indicating a reduction in open loop gain at the critical frequency $f_c$, which, as stated above, is the resonance frequency of the missile for rupture between the booster 958 and the guided portion 959 of the missile. By adjusting the parameters of the control loops to secure a frequency $f_o$ which is lower than the critical frequency $f_c$, stable operation is obtained despite introduction of the notch 1148 in the attenuation characteristics.

Launcher Saturation Controls

For purposes of safety, it is necessary that the velocity of the launcher be limited. Since the quantity of oil pumped from the A-end 42 to the B-end 44 determines the speed of the B-end output shaft 290 and hence of the launcher, stroking of the A-end to increase the quantity of oil pumped is limited to a fixed value which results in the desired maximum velocity, such as approximately 20° per second in elevation. In train, the stroke may be limited to obtain a maximum velocity of approximately 30° per second.

Since the velocity of the launcher is determined by the stroking of the A-end, its acceleration is proportional to the rate at which the A-end is stroked. Such rate depends upon the rate of flow of fluid into and out of the stroking pistons 272, 273 and this flow rate is limited by flow regulating valve 277 which is constructed and arranged to operate in a manner described above in connection with FIG. 3d. It may be noted that the maximum rate of stroking is the same for either direction of tilt plate movement despite the fact that the area of piston 272 is twice that of piston 273 and the maximum flow rate is fixed in either case by valve 277. This results from the fact that the smaller stroking piston 273, operating through the same lever arm as the larger stroking piston 272, transfers fluid to the large stroking piston at the same rate as fluid is supplied to it from valve 277, thus doubling the flow to the large stroking piston 272 relative to that which is alternatively supplied by valve 277 alone to the small piston 273.

Launcher Synchronization

Like the gun laying system, the launcher control system is commonly made responsive selectively to order signals from different directors. When a transfer is made between one director and another, the new order signal generally requires a large change in position of the launcher, representing a large positional error. Further, because of the size of missile which may be aimed by the launcher, the launcher may be required to respond to loading order signals corresponding to a fixed loading position displaced from the aimed position of the launcher by an amount which represents a large positional error. In a preferred embodiment to the invention, a large error may be an angular separation of two or more degrees, for example. For optimum performance, the launcher control system is required to respond rapidly to signals representing large errors. When such large errors occur, a maximum control effort must be developed to minimize control time and integral compensation must be neutralized to overcome the problem of hunting.

It may be recalled that the position of the rotary cam 80 corresponds with and represents system error, if the reduction of error by B-end tachometer feedback is ignored and the system error does not exceed the corresponding rotational limits of the rotary piston 228. Similarly, the stroking of valve 1074 corresponds with and represents the system error. In order to neutralize the integration control unit when the system error exceeds a given value, such as 2°, for example, the valve 1074 has lower and middle lands in normally overlapped relation with ports in communication with tank pressure in conduit 246. The amount of underlap which occurs when the error exceeds a predetermined value is such that displacement of valve 1074 in either direction an amount corresponding to a large system error (i.e., exceeding 2°) vents conduit 1146 to tank pressure through the controlled port of valve 1074. When the stroking of valve 1074 corresponds with a relatively small system error, that is, less than 2 degrees, for example, the valve 1074 serves merely to block the conduit 1146 from draining to tank pressure in conduit 246.

Conduit 1146 has communication at all times with the lower face of integration cut-out valve 1084. The upper face of this valve 1084, which is of lesser area than the lower face, is in communication with $P_1$ pressure in conduit 240. By means of passage 1147 extending through the valve 1084 and having a choke orifice therealong to place the upper and lower faces in restricted communication, $P_1$ pressure may be communicated through valve 1084 and established in conduit 1146 as long as that conduit is not vented to tank pressure. $P_1$ pressure normally exists opposite the lower face of the valve 1084 and the larger area of the lower face relative to the upper face provides a relationship which results in a net upward force acting on valve 1084 to stroke it to its upper position except under the condition when the lower chamber is ported to tank. In this second position of the valve, conduit 1087 is cut off from communication with conduit 1148 and is connected with conduit 1083 leading to the pilot valve 1082. In the first, lower position, pressure in conduit 1148 is controlled by the upper and lower lands of integrating piston-valve 1089, which are spaced in line-to-line relation, respectively, with ports communicating with $P_1$ pressure in conduit 240 and tank pressure in conduit 246. Thus, when $P_1$ pressure is built up in condiut 1146 so as to stroke the valve 1084 to its upper position, the position of the integrating piston-valve 1089 is controlled by the pilot valve 1082. However, when conduit 1146 is vented to tank pressure as by stroking of valve 1074 for a large system error, $P_1$ pressure acting on the top surface of valve 1084 overcomes tank pressure acting on the bottom surface and closes a hydraulic control loop including conduits 1148 and 1087. This control operates degeneratively to position piston-valve 1089 in line-to-line relation with the $P_1$ and tank ports and thus in neutral position. That is to say, whenever the system error exceeds the predetermined amount of, say 2°, the integration control unit is neutralized so as to introduce no integration control signal into the velocity signal amplifier.

In synchronizing to a director following a moving target and under certain other conditions, an error may arise of insufficient magnitude to cause neutralization of the integration control unit and yet it is again desirable to prevent overshoot. It will be recalled that the plunger 1066 of valve 1064 is stroked by reason of its hydraulic coupling with rotary piston 228 an amount corresponding to system error rate. Accordingly, the valve plunger 1066 which has upper and lower sets of lands has a lower set so disposed and spaced in overlapped relation to ports having communication with tank pressure in conduit 246 to control venting of conduit 1146 to tank pressure. The amount of overlap is such that exceeding a system error rate of, say, 5 degrees per second results in the stroking of valve plunger 1066 a sufficient amount to vent conduit 1146 to tank pressure and thereby to cause valve 1084 to move to its lower or integration neutralizing position.

Since synchronization to a new order signal is almost always accompanied by a system error or system error rate exceeding the given values at which integration neutralizing valve 1084 is operated, the use of the integration control unit to improve performance under linear operation with small errors does not lead to an impairment of control system operation, especially in respect to overshoot.

A synchronizing operation also occurs in response to a load order signal. As has been stated above, the loading position of the launcher may suitably be at 90 degrees elevation and 0 degrees azimuth and will thus differ, as a general rule, from the position taken by the launcher in response to order signals from the director. The loading operation is commenced by transferring switches 1150—1153 from their action position (i.e., response to director or order signals) to their load position. As seen in FIG. 15c, switches 1150 and 1151 are ganged and are of the three-pole, double-throw type serving to transfer connections to the stators of synchro control transformers 120 and 121 from the synchro generators 112 and 113 to load order synchro generators 1154, 1155 respectively. Synchro generators 1154, 1155 may be similar in design to synchro generators 112, 113 and have their rotors connected to the synchro supply line 116, but differ in having their rotors set in fixed relation to the stators to provide fixed order signals representing the launcher loading position on the one speed and 36 speed basis, respectively. Switch 1152 is connected in series with solenoid 1138 across a suitable source of supply voltage 1156 and is closed in its action position but opened in its load position. Also in series with the solenoid 1138 is a switch 1157 which is normally closed when the launcher is being controlled but is opened, as illustrated, when the launcher is in a standby condition. Hence, opening of load switch 1152 while the launcher is under control breaks the solenoid energizing circuit, thus deenergizing solenoid 1138 and allowing spring 1139 to restore valve 1134 to its downwardly biased position.

In the downward position of valve 1134 when the launcher is responsive to load order signals from synchro generators 1154 and 1155, conduit 1146 is ported through chamber 1158 of valve 1134 to tank pressure in conduit 246. The integration cutout valve 1084 is thereby caused to move to its lower position, neutralizing the integrating piston-valve 1089 and nullifying the integration control signal. At the same time, movement of valve 1134 to its lower position transfers conduit 1135 from communication with rotary valve 1125 via conduit 1133 to communication with the valve chamber of piston 1137 via conduit 1140. Since the upper and lower lands of piston-valve 1137 are in line-to-line relation with ports communicating respectively with $P_1$ pressure in conduit 240 and tank pressure in conduit 246, thereby to control pressure in conduit 1140, the closed loop provided by conduits 1140 and 1135 via valve 1134 serves to stroke valve 1137 into its neutral or line-to-line position.

Also, switch 1153 (FIG. 15c) in its load (dotted) position, blocks application of the velocity input signal to the input terminals of the velocity signal amplifier 971. Thus, it may be seen that switching to the load order signals results in neutralization not only of the integration control unit but also of the velocity input control unit. Since the load order signal is applied only when the launcher rails are empty, the velocity input signal is no longer required to serve the function of preventing rupture of the missile at its critical frequency.

When the launcher is returned to control by the director order signal, switch 1152 closes to energize solenoid 1138, stroking valve 1134 upwardly to restore the velocity input control unit to its active condition. Switch 1153 (FIG. 15c), which shorts the input terminals of the filter 995 in its load position, is returned to a position (as shown) completing the circuit through conductor 1095. However, throwing the switches 1150–1153 back to their active position initiates synchronization of the launcher with the order signal from the director 60 and entails an error rate which maintains the integration control unit neutralized.

As the launcher approaches synchronization from its load position or from a position corresponding to another order signal, positional feedback via the B-end response gear train 123 at first restorer the rotary piston 228 from its limit of travel towards its neutral position. In the manner described above in connection with the synchronization of the gun laying system, the contour of rotary cam 80 results in a constant maximum deceleration smoothly into synchronism. As synchronism is reached, the error and error rate fall below the values required for neutralization of the integration control unit and therefore valve 1084 restores the integrating piston-valve 1089 to control by the valve of 1082.

*Firing Cutout System*

To ensure that a missile is properly directed when fired so as to be captured in a guidance beam, the launcher firing cutout system serves to hold a firing cutout switch in open circuit position until the algebraic sum of the error plus the rate of change of error is within a prescribed limit. It is necessary that this algebraic sum be manifested with a high degree of accuracy to maximize the effectiveness of the launcher as a weapon without undue loss of missiles for lack of guidance. In accordance with the invention, an accurate determination of the algebraic sum is effected by the displacement of valve sleeve 1066 relative to valve plunger 1160.

More particularly, valve sleeve 1066 is arranged to move upwardly for an elevating order signal and downwardly for a depressing order signal an amount corresponding to the rotational velocity of the rotary piston 228 and rotary cam 80 and thus representing system error rate. Valve plunger 1160 is, on the other hand, connected to an intermediate point 1161 along a lever 1162 which is fulcrumed at one end 1163 and connected to the cam follower 1072 at its other end. Hence, plunger 1160 is stroked in proportion to the movement of cam follower 1072, which is downward for elevating order signals and upward for depressing order signals or opposite to valve sleeve 1066. The valve sleeve 1066 has upper and lower tank ports communicating with conduit 246 which are spaced apart to be in overlapped relation with the upper and lower lands of valve plunger 1160. Lower face of plunger 1160 is also vented to tank pressure so as to equalize forces acting along it. When the valve plunger 1160 is displaced relative to the valve sleeve 1066 an amount corresponding to the overlap, a controlled port in the sleeve 1066 is placed in communication with one of the tank ports. The controlled port communicates through conduit 1164 with the lower chamber of a cylinder 1165 in which a piston 1166 is slidably disposed.

The piston 1166 has a larger bottom area than its top area and has a passage 1167 to place its upper and lower surfaces in restricted communication. A spring 1168 acts upon the upper face of the piston to bias it downwardly, thereby to maintain a firing cutout switch 1169 in its open position. However, the conduit 240 supplies $P_1$ pressure to the upper chamber of the cylinder 1165 and through passage 1167 in piston 1166 to the lower chamber. So long as the control port of valve sleeve 1066 is not vented to tank pressure, $P_1$ pressure developed in the lower chamber of cylinder 1165 acts upon the larger bottom area of piston 1166 to provide a net force acting upwardly upon the piston to close the firing cutout switch 1169. That is to say, so long as the relative displacement of sleeve 1066 and plunger 1160 representing the weighted algebraic sum of error and error rate does not exceed its prescribed value, the probability of beam capture is sufficiently great to warrant closing of firing cutout switch 1169, thereby to permit completion of the firing circuit. By way of example, the overlap of valve plunger 1160 with respect to tank ports of sleeve 1066 may be such that a static launcher error less than approximately 20 minutes is not sufficient to vent the lower chamber of cylinder 1165 to tank pressure. A relative displacement corresponding with about 20 minutes system error may be equivalent to a displacement corresponding with an error rate of approximately 1 degree per second. When the error is increasing, the missile is effectively being thrown away from the guidance beam, while a decreasing error or negative error rate represents a rotation of the missile toward or into the guidance beam. Accordingly, the error alone may be less than the critical value, say 20 minutes, and if accompanied by a positive error rate results in sufficient relative displacement between plunger 1160 and sleeve 1066 to open the firing cutout switch 1169, since the missile, if launched, would be thrown out of the guidance beam by the rotary momentum imparted to it. Thus it is that the opening and closing of firing cutout switch 1169 is governed by the algebraic sum of the error and error rate.

*Launcher Limit Stop Mechanism*

The launcher limit stop mechanism is generally similar to the limit stop mechanism for the elevation control of the gun laying system described above and serves similarly to bring the launcher to a rapid, smooth stop, short of the mechanical buffers or limit stops. Such buffers are provided for the elevating structure of the launcher at 95 degrees elevation and minus 15 degrees depression, for example. By providing suitable rotatable connections along the axis of the launcher training ring, the need for limit stops in training is avoided, the launcher being free to rotate continuously in azimuth. The lower limits for the elevation structure may be modified in accordance with the azimuth position of the launcher due to the presence of interference zones, which will be referred to in greater detail hereafter.

To determine when control of the launcher elevation should be transferred to the limit stop mechanism, gear 356 of the limit stop mechanism (FIG. 15e) is rotated as the algebraic sum of the B-end response and the stroking of the A-end 42. Limit stop operation commences when arm 358 engages the upper limit stop 346 or when the rack 361 is driven into engagement with the upper end of valve plunger 436 resting on the lower limit stop. Assuming first that the upper limit stop 346 is engaged, rotation of the spider of planetary gearing 353 is arrested so that the B-end response is transmitted to the stroke control lever 365 to cause it to raise valve plunger 390 of valve 270 upwardly. A lower land of valve 270 moves upwardly to cut off the control port of valve sleeve 269 from the larger stroking piston 272, while the upper land moves to port $P_1$ pressure into the larger stroking piston. By means of mechanical feedback from the stroke response shaft 279 the limit stop cam 384 and valve plunger 390, a stroking of the A-end is neutralized in such a manner that the elevating movement of the launcher is smoothly brought to a stop. It may be noted that the contouring of cam 384 for the limit stop mechanism of the launcher is reversed with respect to that of the elevation gun laying system, just as is the contouring of rotary cam 80 reversed. This reversal is occasioned by a reversal in the response of the launcher elevating structure to a given rotation of the B-end output shaft 290 with respect to the corresponding response of the gun laying system. At any rate, the contouring of cam 384 in the launcher limit stop mechanism provides degenerative feedback from the A-end stroke response shaft 279 to the valve 270 to maintain the stroking of the A-end on neutral when a limit stop is engaged. Similarly, degenerative feedback is provided from the B-end response to prevent movement of the launcher into the mechanical limit stops or buffers.

As in the limit stop mechanism of the gun laying system, the limit stop cam 384 not only introduces lead in the positioning of rack 361 with respect to the lower and upper limit stops, respectively, but also serves to determine the rate of deceleration when entering a limit stop. In a preferred design, the cam is contoured to provide a substantially linear rate of deceleration which, when decelerating from maximum velocity, may be approximately 20 degrees per second, or slightly over half the maximum deceleration permitted by valve 277.

At times, it is necessary to hold the lancher at a fixed position which is removed from a limit stop. While a B-end brake may be provided for arresting motion of the launcher, it is desirable that the limit stop mechanism also be arranged to arrest movement of the launcher. To this end, shaft 359 of the limit stop mechanism has rotatively secured to it a brake cone 1172 which is engaged with the frictional face of brake 1173 when pressure fluid is applied against the opposite face via conduit 1174 to overcome the force of spring 1175. Such pressure fluid is derived from the lower controlled port of a solenoid-actuated valve 1177 when its solenoid 1178 is deenergized. Solenoid 1178 may be energized from supply 1156 through a starting circuit switch 1179 and a B-end brake responsive switch 1180 in series. Switch 1179 is in closed position, while the drive motor is being started, and switch 1180 is, whenever the brake is set, in its closed position. A further switch 1180a may be added in parallel with switches 1179 and 1180 and is closed when the B-end brake is released. As illustrated, deenergization of solenoid 1178 allows bias spring 1181 to hold valve 1177 in its lowermost position porting conduit 1174 to $P_1$ pressure in conduit 240. Since brake 1173 is not rotatable, its engagement with brake cone 1172 arrests rotation of shaft 359 just as if both the upper and lower limit stops were simultaneously engaged. Accordingly, A-end stroke feedback acting through the limit stop cam 384 and B-end response feedback acting through the differential 353 hold plunger 390 of valve 270 at a position which maintains the A-end stroke on neutral by adjusting the flow of pressure fluid to the stroking pistons 272, 273. After the B-end brake is released, switch 1180a is closed (as shown) to energize solenoid 1178, thereby displacing valve 1177 to cutoff $P_1$ pressure from conduit 1174 and port this conduit instead to tank pressure.

It may be observed that the slot 367 in limit stop lead input linkage 365 is sufficiently long that movement of pin 366 may be accommodated when end gear 354 makes a complete revolution. Under normal conditions, however, the rotation of end gear 354 is restricted to an arc of less than 45 degrees, for example, for proper limit stop operation. This arc corresponds with the dwell provided between cam shoulders 371, 372 of cam 370 on shaft 364, this dwell being engaged by a cam follower type of latch 373 which is positioned by piston 1183. Bias spring 1184 maintains the piston 1183 in its lower position whenever $P_1$ pressure is not supplied to the valve block, thus holding latch 373 out of engagement with the dwell of cam 370 and permitting end gear 354 to rotate through a complete revolution. Such rotation may be desirable, for example, when positioning the launcher under manual control by means of a suitable air motor or the like, to prevent damaging control element. When the launcher is being automatically positioned, however, $P_1$ pressure from conduit 240 is supplied to the lower face of piston 1183 to force the latch 373 into engagement with the dwell when the end gear 354 is properly positioned for limit stop operation.

*Launcher Interference Elimination Mechanism*

To prevent accidental firing of a missile into ship's structure disposed about the launcher, an interference elimination mechanism is provided. Such mechanism prevents pointing of the launcher into certain interference zones which have predetermined azimuth and elevation boundaries. Suitably, each zone has a given width and height, although a high and relatively narrow zone may be superimposed upon a low and relatively broad zone. While the interference elimination mechanism serves to raise the launcher over an interference zone into which it may be trained, the simpler operation of the mechanism in arresting depressing of the launcher into an interference zone is conveniently described first.

Figure 15D:
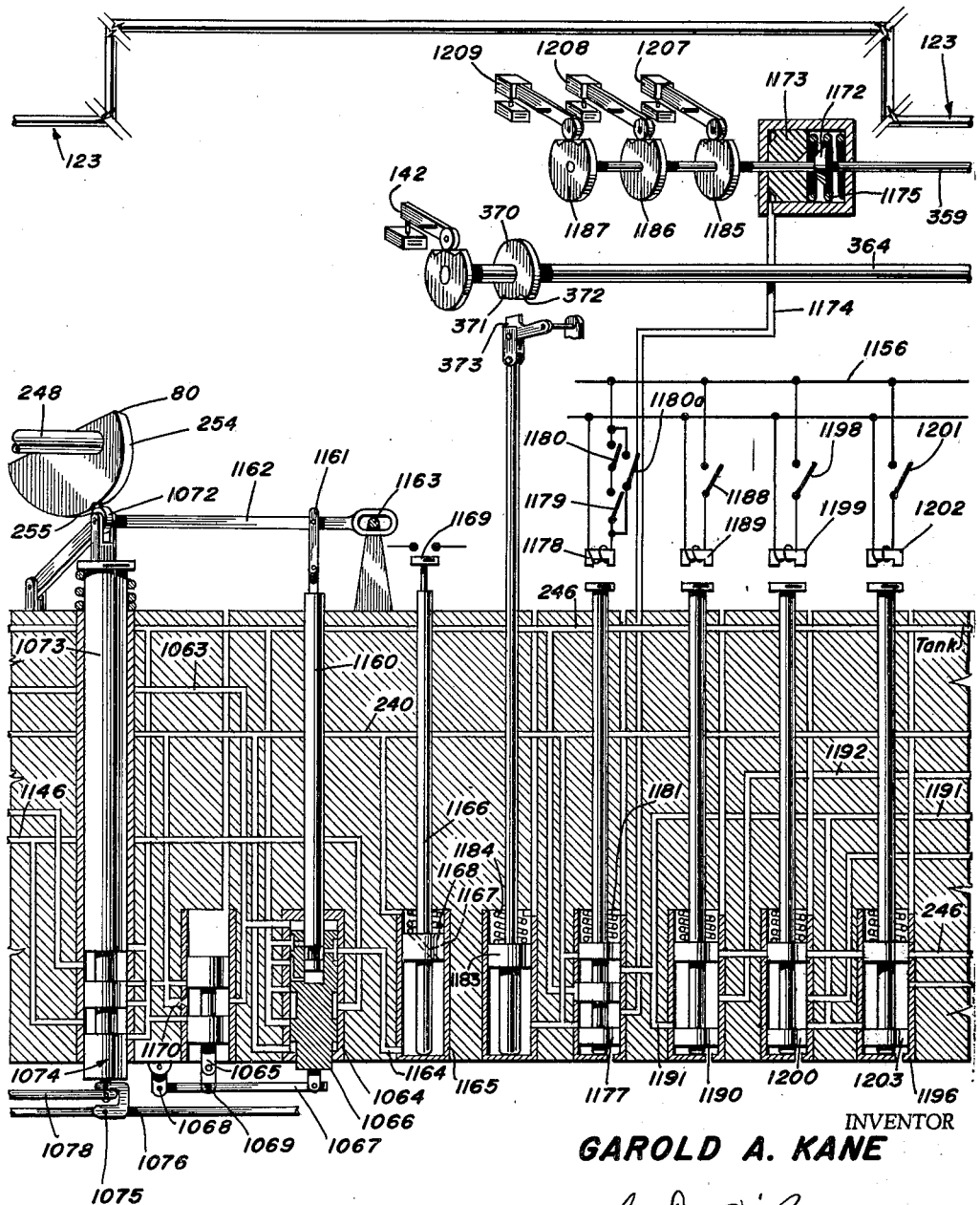
Figure 15E:
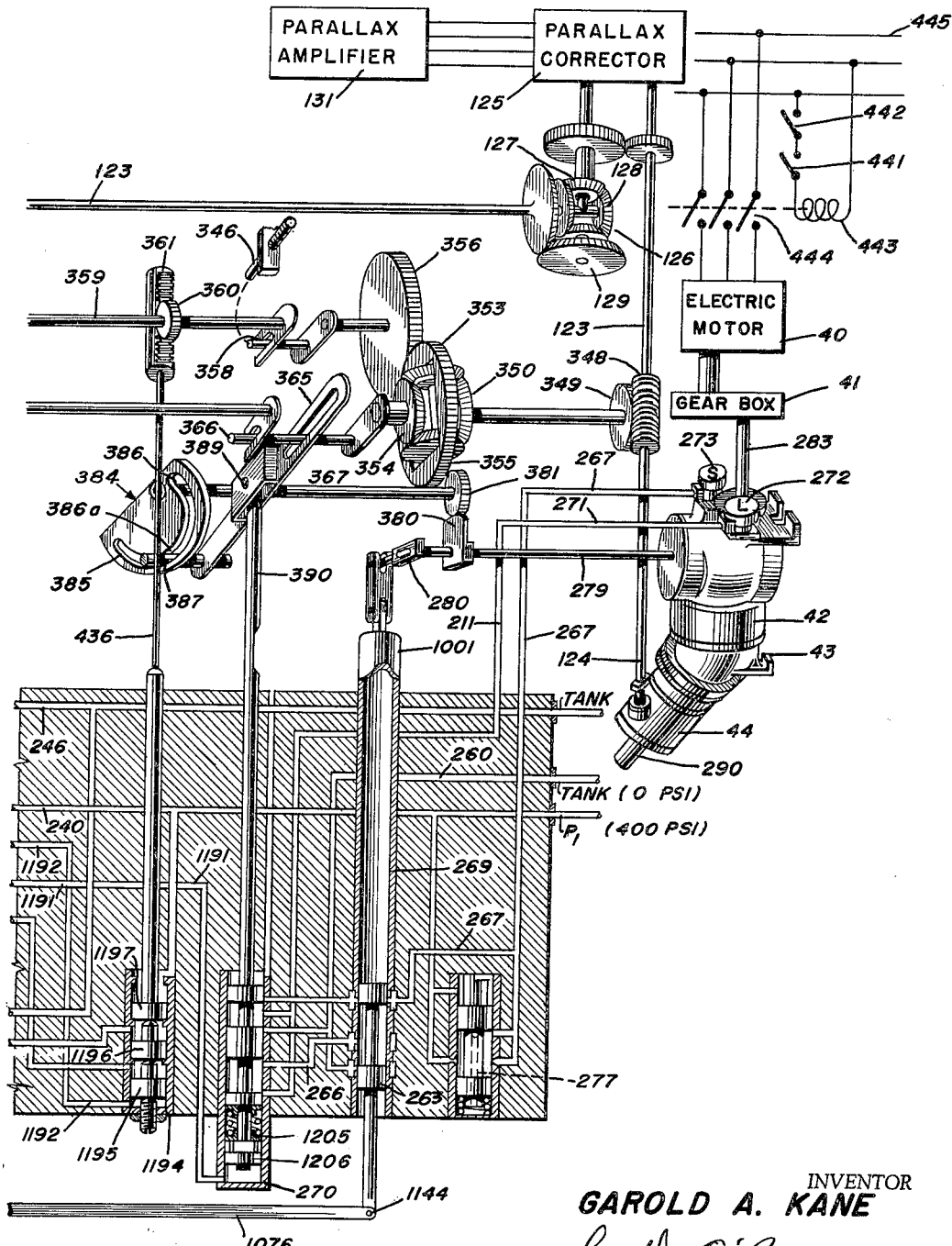

The azimuth positions defining the width of the several interference zones are determined by the contouring of cams (not shown) arranged in the launcher training control system similarly to cams 1185—1187 in the launcher elevation control system (FIG. 15d). Assuming that three blind zones A, B and C are provided of increasing height and that the launcher is positioned above zone A, switch 1188 is opened in the energizing circuit between solenoid 1189 and supply 1156. The associated valve 1190 is accordingly biased downwardly to vent its controlled port to $P_1$ pressure supplied via conduit 1191 rather than to tank pressure in conduit 246. This assumes that the solenoid 1178 is energized to hold valve 1177 in its upper position in which conduit 1191 communicates with $P_1$ pressure in conduit 240. The controlled port of valve 1190 is in communication via conduit 1192 with the lower chamber of cylinder 1194. $P_1$ pressure in this lower chamber forces lowermost piston 1195 upwardly against its stop, thereby raising pistons 1196, 1197 in a cylinder 1194 a corresponding distance short of their respective stops. Piston 1197, which is connected to plunger 436, thereby displaces the upper end of the plunger upwardly, effectively to raise the lower limit stop an amount corresponding to the displacement of piston 1195 by $P_1$ pressure. It may be noted that, although the upper surface of piston 1197 is exposed to $P_1$ pressure derived from conduit 240, the area of its upper surface is less than the area of the lower surface of piston 1195 so that a net upward force is obtained.

Had the launcher been over the interference zone B, switch 1198 would have been opened to deenergize solenoid 1199, allowing valve 1200 to port the lower face of piston 1196 to $P_1$ pressure. Piston 1196, which has a greater travel before engaging its stop, would therefore raise the upper end of plunger 436 a greater distance, effectively to establish a lower limit stop at a greater height. For interference zone C, there is provided a switch 1201 in the energizing circuit of solenoid 1202 which, when deenergized, allows valve 1203 to be biased downwardly to port the bottom face of piston 1197 to $P_1$ pressure. The lower limit stop is then raised to its greatest height. When the launcher is trained out of the given interference zone, the corresponding solenoid is energized to port the bottom face of the corresponding piston to tank pressure.

If the launcher is trained into an interference zone at an elevation less than the height of the interference zone, the switches 1188, 1198 and 1201 are each closed to energize the corresponding solenoids 1189, 1199 and 1202. Hence, the upper end of plunger 436 is at its lowermost position spaced below the limit stop rack 361 a relatively short distance corresponding to the elevation at which the launcher is being trained into the interference zone. Solenoid 1178 is similarly energized to supply $P_1$ pressure to the valves 1190, 1200 and 1203.

It is desirable that the launcher be elevated as rapidly as possible to the top of the interference zone which is encountered in order that the launcher may continue in training to keep an azimuth direction corresponding with the target. At the same time, it is desirable to limit the amount of anticipation or lead on either side of an interference zone within which limit zone operation occurs, as the launcher will, in general, not be effective against a target while encountering an interference zone. Accordingly, provision is made in the launcher train control system for rapidly decelerating the launcher when a zone is encountered, which may be accomplished in a manner similar to the deceleration of the elevating structure when encountering a limit stop. At the same time, switches 1188, 1198 and 1201 are arranged to be opened by cams arranged in the training control system similarly to cams 1185—1187 (FIG. 15d) at an instant in advance of encountering a corresponding interference zone determined by the azimuth position of the gun and its training velocity. That is, the switches are opened in sufficient time to provide a lead angle depending upon the training velocity to allow the training structure to be decelerated before entering an interference zone. During this same lead interval provided for training deceleration, the valve which has its solenoid deenergized is arranged to initiate elevating of the launcher to the top of the corresponding interference zone and no higher.

Assuming, for example, that the launcher is training into interference zone A, switch 1188 is opened with a sufficient lead interval, porting the $P_1$ pressure to the bottom of piston 1195 to cause such piston to travel upwardly into engagement with its stop. Since the launcher is assumed to be at an elevation lower than the height of the interference zone, the limit stop plunger 436 engages limit stop rack 361 and tends to force it upwardly to a position simulating a lower limit stop at the height of interference zone A. Force exerted on the limit stop rack 361 is transmitted through the differential 353 to end gear 354 and pin 366 connected with it. Pin 366 rotates the limit stop lead input linkage 365 about its end pin 387 to force plunger 390 of valve 270 downwardly to substantially its maximum allowable displacement. Just as in the case of encountering a lower limit stop, the plunger 290 of valve 270 cuts off control of the stroking pistons 272, 273 from valve plunger 263 and sleeve 269 and effects a control prescribed by the limit stop mechanism. However, because the limit stop plunger 436 is moved upwardly rather than serving merely as the lower limit stop, elevation of the launcher is at its maximum acceleration determined by valve 277.

As the B-end response approaches correspondence with the height of the interference zone, end gear 354 is turned back to stroke valve 270 upwardly towards its neutral position. Thus the launcher elevating structure will be slowed to a stop as the height of the interference zone is reached. Once the launcher is at the top of the interference zone, into which it has been trained, it will remain at this elevation because the elevation order signal energizes the control system to depress, thereby to preclude upward movement beyond the top of the interference zone, and the limit stop mechanism is operative to prevent depressing of the launcher into the interference zone. When the launcher is trained past the interference zone, switch 1188 closes to energize solenoid 1189, thereby relieving the limit stop rack 361 of the upward force from plunger 436 to permit bottle spring 1205 of valve 270 to restore this valve to its neutral position. The valve plunger 263 and sleeve 269 are then restored to control of the stroking pistons 272, 273 and the launcher resumes its response to the order signals from director 60.

Valve 1177 serves, when the control system is active, not only to furnish $P_1$ pressure to the interference zone valves 1190, 1200 and 1203, but also to furnish $P_1$ pressure to the bottom face of piston 1206 having an upper face engageable with the lower end of valve 270. While valve 270 is free to travel upwardly separately from piston 1206, its downward travel beyond its neutral position is limited by piston 1206 whenever solenoid 1178 is energized. The purpose of limiting downward travel of valve 270 is to prevent occurrence of an entry into an upper corner of an interference zone when the launcher order signal causes training into an extreme lower corner. Under such a condition, valve 270 would be stroked downwardly beyond the limit defined by piston 1206, changing the position of lead cams 1185—1187 on shaft 359 by an angle which represents a "false lead." These cams 1185—1187 control corresponding switches 1207—1209 which start and stop the training of the launcher in interference zone operation, just as switches 1188, 1198 and 1201 control starting and stopping of the elevation drive in interference zone operation. If the false lead were introduced into the position of cams 1185—1187 under certain conditions, it would allow a premature switch closure to occur before the launcher had fully elevated to the top of the interference zone, causing the launcher to train into the corner of the zone. Piston 1206, therefore prevents entry of the launcher into the upper corners of the interference zones but allows valve 270 sufficient downward travel from neutral to effect control of the stroking pistons 272, 273. Furthermore, during standby operations when solenoid 1178 is deenergized to allow movement of valve 1177 to its lowermost position, no upward pressure is applied to piston 1206, hence, end gear 354 may then turn freely during air motor or handcrank operation of the launcher.

The train control system of the launcher may be substantially identical to the elevation control system except in minor respects, certain of which have been referred to above. Accordingly, the foregoing description of the elevation control system will suffice for an understanding of the entire launcher positioning system.

Launcher Control System Characteristics

From the foregoing description of the missile launcher control system, it will be understood to comprise a closed control loop responsive to the positional error of this system, a forward control loop responsive to the time derivative of the positional input signal (i.e., the input velocity), and a subsidiary closed loop for introducing a signal into the main closed loop representing the first integral of the system error. Also associated with the main closed loop is a rate feedback loop for introducing a small degenerative output velocity signal to reduce system errors in the frequency band near ship roll frequency.

Figure 17:
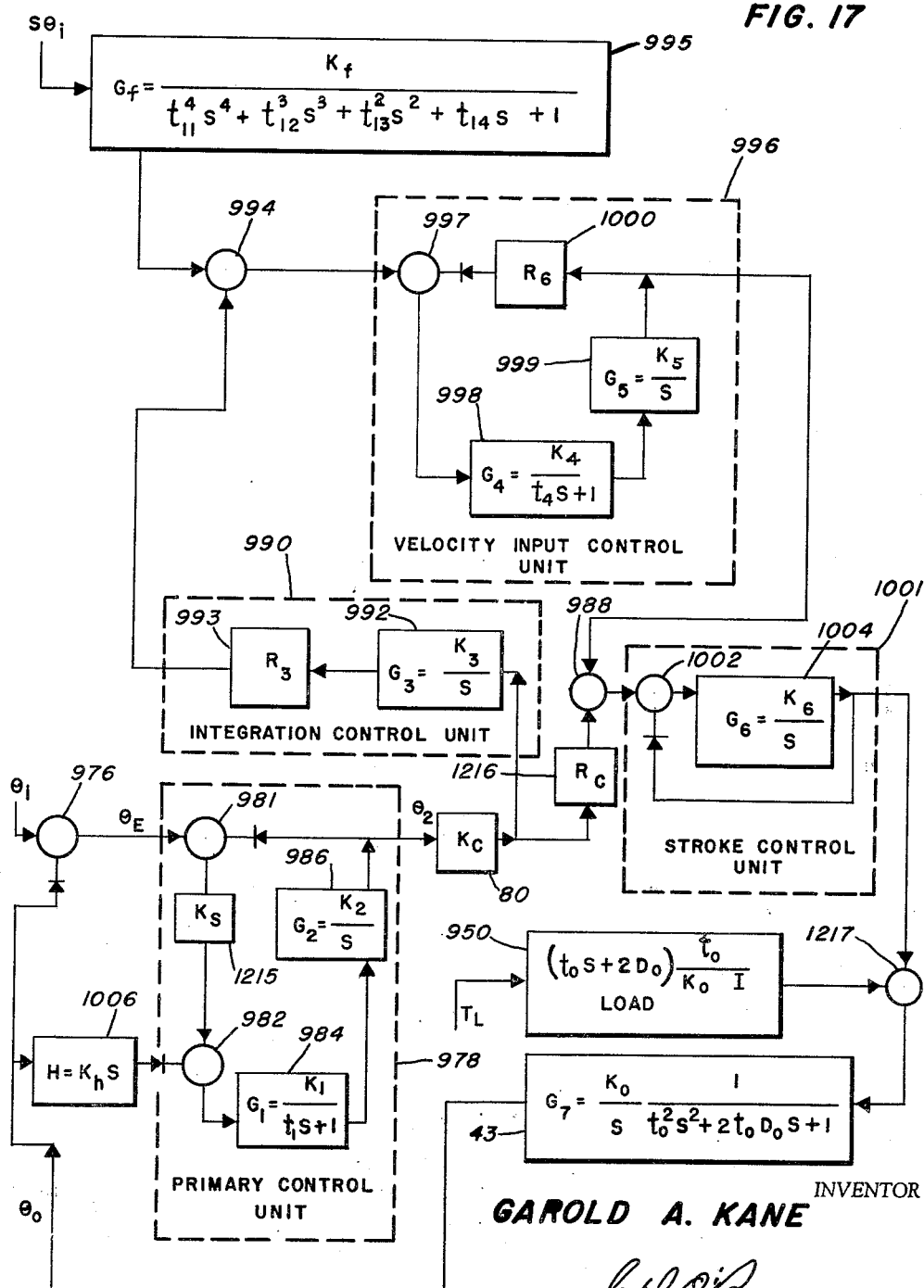
FIG. 17 is a block diagram similar to FIG. 14 but representing the transfer functions of various components of the launcher control system.

The relationships between the input and output for the control system are reasonably well expressed in terms of the system transfer functions represented in the transfer function diagram of FIG. 17. Reference is made to the discussion based upon FIG. 6 for an understanding of the similar units of the main control loop. It may also be noted that numerals are applied to the diagram of FIG. 17 to correspond with numerals applied to the block diagram of FIG. 14.

Considering now the distinctive aspects of FIG. 17, the integration control unit 990 of the launcher control system is represented as having a transfer function $$G_3 = \frac{K_3}{s}$$

for the valve and piston combination 992 and an attenuation constant $R_3$ for the response potentiometer 993. The integration control unit signal in electrical form is combined in the summing unit 994 with the velocity input signal $s\theta_i$ and together these signals are transformed by the velocity input control unit 996 into a mechanical displacement signal applied to the summing unit 988, that is, to the stroke control lever 1076 (FIG. 15c).

The velocity input signal $s\theta_i$ derived from tachometer 1092 is coupled to the summing unit 994 by low pass filter 995 having a transfer function $G_f$ given by the following expression:

$$G_f = \frac{K_f}{t_{11}^4 s^4 + t_{12}^3 s^3 + t_{13}^2 s^2 + t_{14} s + 1}$$

where $t_{11}$–$t_{14}$ are time constants which may be experimentally determined and the value $K_f$ is adjustable by means of potentiometer 1097 (FIG. 15a). The total of the velocity input signal $s\theta_i$ and the integrated error signal are supplied to velocity input control unit 996 having an overall transfer function $G_{12}$ given as follows:

$$G_{12} = \frac{G_4 G_5}{1 + R_6 G_4 G_5} = \frac{K_4 K_5}{(t_4 s^2 + s + R_6 K_4 K_5)} = \frac{1}{R_6 (t_4 t_{15} s^2 + t_{15} s + 1)}$$

where $$t_{15} = \frac{1}{K_4 R_6 K_5}$$

Figure 18:
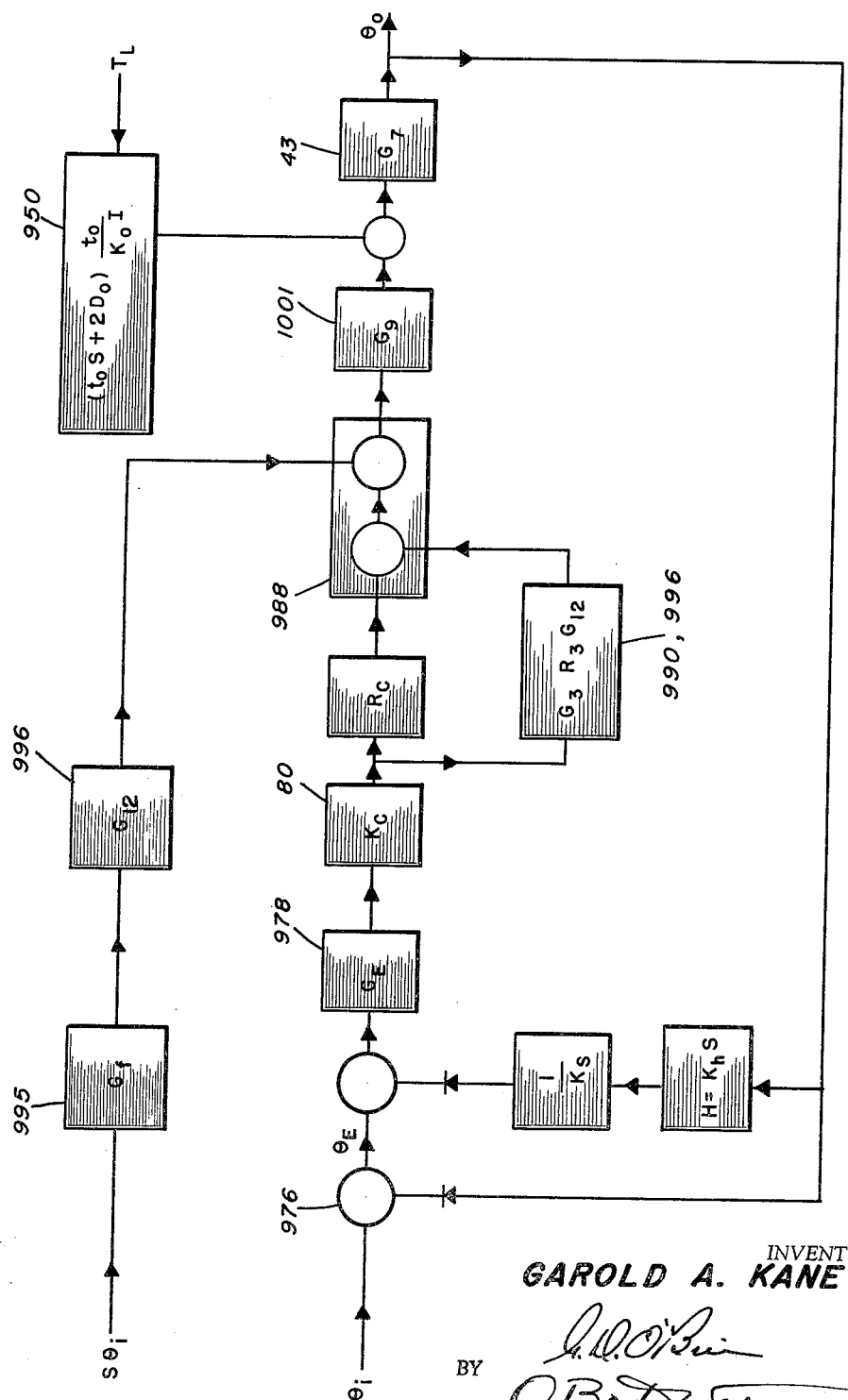
FIG. 18 is a simplified version of the block diagram of FIG. 17 to facilitate analysis.

At this point, reference is conveniently made to the simplified transfer function diagram of FIG. 18 to facilitate the following analysis. Thus, If $T_L = 0$, (1) $$\theta_o = G_7 G_9 \left\{ G_f G_{12}(s\theta_i) + G_E K_c [R_c + G_3 R_3 G_{13}] \left[ \theta_i - \theta_o - \frac{K_h}{K_s} s \theta_o \right] \right\}$$

or the equivalent closed loop gain for the entire system is (2) $$\frac{\theta_o}{\theta_i} = \frac{G_7 G_9 [G_f G_{12} s + G_E K_c (R_c + G_3 R_3 G_{12})]}{1 + G_7 G_9 [G_E K_c (R_c + G_3 R_3 G_{12})] \left[ 1 + \frac{K_h}{K_s} s \right]}$$

Letting $$G_7 G_9 G_E K_c (R_c + G_3 R_3 G_{12}) = G_{11}$$

and $$G_7 G_9 G_f G_{12} s = G_{13}$$

Then (3) $$\frac{\theta_o}{\theta_i} = \frac{G_{13} + G_{11}}{1 + G_{11} + G_{11} \frac{K_h}{K_s} s} = \frac{G_{11}}{1 + G_{11} + G_{11} \frac{K_h}{K_s} s} \left[ 1 + \frac{G_{13}}{G_{11}} \right]$$

and the equivalent open loop gain of the system is (4) $$\frac{\theta_o}{\theta_E} = \frac{G_{11} G_{13}}{1 + G_{11} \frac{K_h}{K_s} s - G_{13}}$$

Evaluation of the transfer functions $G_{11}$ and $G_{13}$ is seen to be dependent upon the following expressions (previously derived):

$$G_E = \frac{\frac{K_s K_1 K_2}{s(t_1 s + 1)}}{1 + \frac{K_s K_1 K_2}{s(t_1 s + 1)}} = \frac{K_s K_1 K_2}{t_1 s^2 + s + K_s K_1 K_2} = \frac{1}{t_1 t_2 s^2 + t_2 s + 1}$$

$$G_f = \frac{K_f}{t_{11}^4 s^4 + t_{12}^3 s^3 + t_{13}^2 s^2 + t_{14} s + 1}$$

$$G_{12} = \frac{K_4 K_5}{t_4 s^2 + s + R_6 K_4 K_5} = \frac{1}{R_6} \frac{1}{t_4 t_{15} s^2 + t_{15} s + 1}$$

where $$t_{15} = \frac{1}{R_6 K_4 K_5}$$

$$R_3 G_3 = \frac{R_3 K_3}{s}$$

$$G_9 = \frac{K_6}{s + K_6} = \frac{1}{t_6 s + 1}$$

$$G_7 = \frac{K_o}{s} \frac{1}{t_o^2 s^2 + 2 D_o t_o s + 1}$$

Hence, from the definition of $G_{11}$ and $G_{13}$, the following expressions may be derived:

(5) $$G_{11} = \frac{K_o K_c R_c}{s} \left\{ \frac{1}{t_o^2 s^2 + 2 D_o t_o s + 1} \frac{1}{t_6 s + 1} \frac{1}{t_1 t_2 s^2 + t_2 s + 1} \right\}$$
$$\left\{ 1 + \frac{R_3 K_3}{R_6 R_c s} \frac{1}{t_4 t_{15} s^2 + t_{15} s + 1} \right\}$$

(6)
$$G_{13} = \frac{K_o K_t}{R_6} \frac{1}{t_o^2 s^2 + 2 D_o t_o s + 1} \frac{1}{t_6 s + 1}$$
$$\frac{1}{t_{11}^4 s^4 + t_{12}^3 s^3 + t_{13}^2 s^2 + t_{14} s + 1} \times \frac{1}{t_4 t_{15} s^2 + t_{15} s + 1}$$

In the low frequency spectrum ($\omega < 1$ rad./sec.), these expressions become $$G_{11} \rightarrow \frac{K_v}{s}\left[1 + \frac{n}{s}\right]$$

and $$G_{13} \rightarrow K_x \frac{1}{t_{14} s + 1}$$

so that (7)
$$\frac{\theta_o}{\theta_E} \rightarrow \frac{\frac{K_v}{s}\left(1 + \frac{n}{s}\right) + \frac{K_x}{t_{14} s + 1}}{1 + \frac{K_h}{K_s} K_v\left(1 + \frac{n}{s}\right) - \frac{K_x}{t_{14} s + 1}}$$

In the preferred embodiment $K_x$ is approximately 1.0 and the second term in the numerator is then negligible compared to the first term so (8)
$$\frac{\theta_o}{\theta_E} \rightarrow \frac{\frac{K_v}{s^2}(n+s)(t_{14} s + 1)}{t_{14} s + 1 - K_x + \frac{K_h}{K_s} K_v\left(1 - \frac{n}{s}\right)(t_{14} s + 1)}$$

$$\rightarrow \frac{\frac{K_v}{s}(n+s)(t_{14} s + 1)}{t_{14} s^2 + (1 - K_x) s + \frac{K_h K_v}{K_s}(s + n)(t_{14} s + 1)}$$

$$\rightarrow \frac{\frac{K_v}{s}(n+s)(t_{14} s + 1)}{t_{14}\left(1 + \frac{K_h K_v}{K_s}\right) s^2 + \left[1 - K_x + \frac{K_h K_v}{K_s}(t_{14} n + 1)\right] s + \frac{K_h K_v}{K_s} n}$$

From this it may be seen that at zero frequency (constant velocity operation)

$$\frac{\theta_o}{\theta_E} \rightarrow \frac{K_v n}{s} \div \frac{K_h K_v n}{K_s} = \frac{K_s}{K_h s}$$

or the error under constant velocity conditions is $$\theta_E = \frac{K_h}{K_s} s \theta_o$$

In a preferred embodiment, $$\frac{K_h}{K_s}$$

may be equal to 0.003 to give an error of .06° or 3.6 minutes when $s\theta_o$, the output velocity, is constant at 20°/sec.

It may also be noted that if $K_h = 0$ and $K_x = 1.0$, then at low frequencies $$\frac{\theta_o}{\theta_E} \rightarrow \frac{K_v n}{t_{14} s^3}$$

Typical parameter values may be $K_v = 11$ sec.$^{-1}$, $n = 2.0$ sec.$^{-1}$, and $t_{14} = 0.30$ secs., so that at a frequency of .6 rads./sec.

$$\frac{\theta_o}{\theta_E} = \frac{11 \times 2}{.3 \times .216} = 340 \text{ open loop gain}$$

But if $$\frac{K_h}{K_s} = .003 \text{ and } K_x = 1.05$$

for example, then at the same frequency of $\omega = 0.6$ $$\frac{\theta_o}{\theta_E} \simeq \frac{11 \times 2}{j.6[.066 - .36 \times .3(1 + .033) + j.0027]}$$

$$\simeq \frac{22}{.6 \times .046} = 796$$

which is substantially a greater apparent open loop gain than the value of 340 obtained without the B-end tachometer feed back. Thus it may be seen that the small tachometric feed back reduces the error in the frequency range of interest.

The "notch" effect in the response characteristic introduced by the open loop input velocity signal may be made apparent by examining the relation developed above, namely, $$\frac{\theta_o}{\theta_i} = \frac{G_{13} + G_{11}}{1 + G_{11} + G_{11} \frac{K_h}{K_s} s}$$

which could theoretically be made zero if the numerator $(G_{13} + G_{11})$ were made zero at the critical frequency. Now (9)
$$G_{13} + G_{11} = \left\{\frac{1}{(t_o^2 s^2 + 2 D_o t_o s + 1)(t_o s + 1)}\right\}$$
$$\times \left\{\frac{K_t K_o}{R_6} \frac{1}{(t_{11}^4 s^4 + t_{12}^3 s^3 + t_{13}^2 s^2 + t_{14} s + 1)(t_4 t_{15} s^2 + t_{15} s + 1)} \right.$$
$$\left. + \frac{K_c R_c K_o}{s} \times \frac{1}{t_1 t_2 s^2 + t_2 s + 1}\left(1 + \frac{R_3 K_3}{R_6 R_c s} \frac{1}{t_4 t_{15} s^2 + t_{15} s + 1}\right)\right\}$$

We need only examine the second bracket term where as before $$\frac{K_t K_o}{R_6} \simeq 1.0 \text{ and } K_c R_c K_o \simeq 11, \text{ and } \frac{R_3 K_3}{R_6 R_c} \simeq 2.0$$

and where, at the critical frequency of $\omega = 20$ rads./sec. the term $$\frac{R_3 K_3}{R_6 R_c s} \frac{1}{t_4 t_{15} s^2 + t_{15} s + 1} \ll 1.0$$

and may be neglected. We therefore examine, for $\omega = 20$ the value of $$\left\{\frac{1}{(t_{11}^4 s^4 + t_{12}^3 s^3 + t_{13}^2 s^2 + t_{14} s + 1)(t_4 t_{15} s^2 + t_{15} s + 1)}\right.$$
$$\left. + \frac{11}{s} \frac{1}{t_1 t_2 s^2 + t_2 s + 1}\right\}$$

It will be apparent that the parameters may be established so that in the region of $\omega = 20$ the two components above have approximately the same magnitude and the first component has a phase lag of approximately 180° more than that of the second component, thereby making the sum substantially zero. For this critical frequency, therefore, the ratio of output to input $$\left(\frac{\theta_o}{\theta_i}\right)$$

may be made substantially zero and the desired notch effect is accomplished.

In the foregoing description, terms such as "upwardly" and "downwardly" are employed in describing the movement of valves and pistons in the valve block as illustrated in the drawings. Conveniently, the valve block is so oriented that these movements are actually in a horizontal direction, and not biased by gravity.

It will be apparent, moreover, that the illustrative embodiments of the invention described above are susceptible to various modifications within the purview of the invention. Thus, while employment of a variable stroke parallel-piston type pump has been described, a variable stroke radial-piston type pump may instead be used wherein a rotor guide yoke is the equivalent of the "tilting plate." The integration control unit 990 of the launcher control system may be arranged to provide a second integral term as well as the first integral term to control the stroking of the hydraulic transmission, in similarity to the first and second integral terms supplied by the integration control unit 90 of the gun elevation system. Other modifications will occur to those skilled in the art. Accordingly, the invention is not to be limited to the em-

I claim:

1. In a control system for a movable object having means for supplying a position order signal, a servo positioning system for controlling said movable object for movement into correspondence with said position order signal, comprising a hydraulic variable speed transmission for driving the object including a control element for controlling the output velocity of said transmission, a first and a second piston coupled to said element with first and second lever arms for oppositely displacing said element, means for regulating the pressure acting upon said second piston at a fixed value, means including a valve within a valve sleeve for controlling flow of hydraulic fluid to and from the said first piston with a pressure substantially equal to one-half said fixed value, said first piston having twice the area of said second piston with the same length lever arm which gives a two-to-one ratio of areas and corresponding lever arms, means for determining the velocity and position of said object at any given time, means for producing an error signal which comprises the difference between the actual position of said object and the correct position as indicated by said position order signal, cam means responsive to said error signal for displacing one of said valve and said valve sleeve relative to the other to displace said control element to increase or decrease the velocity of said movable object, and followup means responsive to displacement of said control element for displacing the other of said valve and valve sleeve a corresponding amount to cut off flow of fluid to said first piston when said element has been displaced by said pistons into correspondence with the displacement of said one of said valve and valve sleeve.

2. In a control system for a movable object having means for supplying a position order signal, a servo positioning system for controlling said movable object for movement into correspondence with said position order signal, comprising a variable speed hydraulic transmission for driving said object including a velocity controlling element displaceable to control the velocity of said object, means for determining the velocity and position of said object at any given time, means for producing an error signal which comprises a difference between the actual position signal of said object and the correct position as indicated by said position order signal, a lever connected to said velocity controlling element for displacing said element to control the velocity of said object, means including a valve and piston for stroking said lever at a first point, degenerative feedback means for arresting stroking of said first point when the same is displaced in correspondence with said error signal, means including a valve displaced in accordance with stroking of said first point and a piston stroked by flow of fluid thereto controlled by said last-mentioned valve for displacing a second point of said lever at a time rate corresponding to the displacement of said first point, and means including a valve within a valve sleeve mechanically coupled with said lever and with said velocity controlling element for hydraulically displacing said velocity controlling element into correspondence with displacement of a third point of said lever.

3. In a control system for a movable object having means for supplying a position order signal, a servo positioning system for controlling said movable object for movement into correspondence with said position order signal, comprising a variable speed hydraulic transmission having a tilting plate for controlling the velocity at which said object is moved, means for determining the velocity and position of said object at any given time, means for producing an error signal which comprises the difference between the actual position of said object and the correct position as indicated by said position order signal, piston means for stroking said tilting plate, a stroke control lever connected to said tilting plate and said piston means, a valve within a valve sleeve, one connected to said plate and the other to said lever for applying a flow of pressure fluid to said piston means to bring said plate and said lever into positional agreement with said position order signal, means including cam means for displacing said lever correspondingly to stroke said tilting plate, said last named means further including a rotary piston for driving said cam means, a rotary valve for controlling the rate and direction of flow of pressure fluid to said rotary piston, means including an amplifier and a torque motor energized by said amplifier and connected to said rotary valve for operating said rotary valve, and means for supplying said amplifier with a control signal dependent upon the lack of agreement between said error signal and the position of said rotary piston, whereby said rotary piston and correspondingly said cam means is positioned to control the displacement of said tilting plate.

4. In a control system for a movable object having means for supplying a position order signal, a servo positioning system for controlling said movable object for movement into correspondence with said position order signal, comprising a variable speed hydraulic transmission having a tilting plate for controlling the velocity at which said object is moved, piston means for stroking said tilting plate, a stroke control lever connected to said tilting plate and said piston means, servo valve means for controlling the application of pressure fluid to said piston means in accordance with displacement of a first point along said lever to stroke said tilting plate in correspondence with displacement of said first point, means for determining the velocity and position of said object at any given time, means for displacing a second point along said stroke control lever by an amount corresponding to any disagreement between the position of said object and the position order signal less an amount corresponding to the velocity of said movable object, and valve means responsive to displacement of said second point for controlling the displacement of a third point along said lever in accordance with the time integral of displacement of said second point, whereby displacement of said first point is determined by the displacements of said second and third points.

5. In a control system, as defined in claim 4, including means for limiting the flow of pressure fluid to said piston means thereby to limit the rate of change of velocity of said driven object.

6. In a control system for a movable object having means for supplying a position order signal, a servo positioning system for controlling said movable object for movement into correspondence with said position order signal, comprising variable speed driving means for said object including a velocity controlling element, means for determining the velocity and position of said object at any given time, means responsive to a difference between the position of said object as indicated by said position determining means and the position order signal for producing an error signal, cam means including a linear portion and an adjacent non-linear portion, cam follower means engageable with said cam means, means responsive to said error signal for producing a displacement of the linear portion of said cam means relative to said cam follower means corresponding to relatively small error signals and for producing a displacement of the non-linear portion of said cam means relative to said cam follower means corresponding to relatively large error signals, and hydraulic feedback means actuated by said cam follower means for correspondingly adjusting said element to control the velocity of said object in accordance with the positional error.

7. In a control system for a movable object having means for supplying a position order signal, a servo positioning system for controlling said movable object for movement into corrsepondence with said position order signal, comprising variable speed driving means for said object including a velocity controlling element, means for determining the velocity and position of said object at any given time, means responsive to a difference between the position of said object as indicated by said position determining means and the position order signal for producing an error signal, cam means having a linear cam surface and an adjacent non-linear surface, piston means responsive to a flow of pressure fluid applied to it for displacing said cam valve means for controlling the supply of pressure fluid to said piston means, means responsive to a difference between the displacement of said cam and the value of said error signal for actuating said valve means to supply pressure fluid to said piston means in an amount and at a rate to maintain correspondence between said cam and the error signal, and means responsive to the displacement of said cam for adjusting said velocity controlling element correspondingly to control the velocity of said object linearly and non-linearly in accordance with the magnitude of the positional error.

8. In a control system, as defined in claim 7, wherein said piston means and said cam are of the rotary type, said means for actuating said valve means including a synchro control transformer for deriving a signal representing the difference between the error signal and a signal representing the displacement of said cam, and a servo amplifier and torque motor responsive to such difference for actuating said valve means, there being provided means for maintaining constant the pressure applied to one side of said piston means.

9. In a control system for a movable object having a means for supplying a position order signal, a servo positioning system for controlling said movable object for movement into correspondence with said position order signal, comprising variable speed driving means for said object including a velocity controlling element, a cam having a substantially linear portion and a substantially parabolic portion, means for determining the velocity and position of said object at any given time, means responsive to the error between the position of said object as indicated by said position determining means and the position order signal for producing a corresponding displacement of said cam, a cam follower in contact with and displaceable by said cam in accordance with its linear portion for small errors and its parabolic portion for large errors, integrating means responsive to the displacement of said cam follower for small errors to produce a compensating displacement which is a function of the time integral of said cam follower displacement, and means responsive to the sum of said cam follower displacement and said compensating displacement for adjusting said velocity controlling element to control the velocity of said object in accordance with a function of the positional error and its time integral.

10. In a control system, as defined in claim 9, including means for nullifying said compensating displacement when the time derivative of said error signal exceeds a predetermined value and when a function of said error signal exceeds a predetermined magnitude.

11. In a control system for a movable object having means for supplying a position order signal, a servo positioning system for controlling said movable object for movement into correspondence with said position order signal, comprising variable speed driving means for said object including a velocity controlling element, means for determining the velocity and position of said object at any given time, means responsive to a difference between the position of said object as indicated by said position determining means and the position order signal for producing an error signal, a piston, means including a pressure control valve and a pressure regulating valve for controlling flow of pressure fluid to and from said piston to displace the same into substantial correspondence with said error signal, said pressure regulating valve being displaced in accordance with the time derivative of displacement of said piston, integrating piston means, integrating valve means stroked in accordance with displacement of said piston for controlling flow of pressure fluid applied to said integrating piston means to produce a displacement thereof which is an integral function of displacement of said piston, a transfer valve for hydraulically coupling said integrating valve means to said integrating piston means and responsive to stroking of said pressure regulating valve a predetermined amount for decoupling said integrating valve and piston means, and cam means responsive to a combination of the displacement of said piston and the displacement of said integrating piston means for correspondingly adjusting said velocity controlling element to control the velocity of said object.

12. In a control system, as defined in claim 11, including a servo valve stroked in accordance with displacement of said integrating piston means and coupled hydraulically by said transfer valve with said integrating piston means when said integrating valve means is decoupled for neutralizing the displacement of said integrating piston means.

13. In a control system, as defined in claim 12, further comprising integrating cutout means including a valve stroked in correspondence with the displacement of said piston for actuating said transfer valve to decouple said integrating valve means independently of the rate of displacement of said piston.

14. In a control system, as defined in claim 11, further comprising means for decelerating said object to prevent movement into a predetermined zone, and means responsive to such deceleration for actuating said transfer valve.

15. In a control system for a movable object having means for supplying a position order signal, a servo positioning system for controlling said movable object for movement into correspondence with said position order signal, comprising variable speed driving means for said object including a velocity controlling element, said element being adjustable between a neutral position and a limit position which determines the maximum velocity at which said object may be moved, a cam having a constant lead contour and rising and falling substantially parabolic contours on either side thereof, means for determining the velocity and position of said object at any given time, means responsive to an error between the position of said object as indicated by said position determining means and the position order signal and including a piston for correspondingly positioning said cam, a cam follower displaceable successively by said constant lead contour and one of said parabolic contours as said error increases in one sense, and means responsive to displacement of said cam follower with an increasing error for adjusting said element progressively to its limit position at a predetermined maximum rate and for maintaining said element at its limit position until said error decreases below a predetermined value, said parabolic contours being effective in cooperation with said element adjusting means for limiting the rate of restoration of said element to its neutral position to a predetermined maximum rate as said error decreases below its predetermined value, whereby said driven object is accelerated at a constant maximum rate to its maximum velocity and then decelerated at a predetermined maximum rate in response to large errors to come into correspondence with the position order signal.

16. In a control system, as defined in claim 15, wherein the maximum displacement of said cam relative to said cam follower from its neutral position corresponds with an error which is a relatively small fraction of the maximum possible error between the position of said movable object and the position order signal, whereby a maximum response is obtained with substantially less than the maximum error.

17. In a control system, as defined in claim 16, wherein the extent of said constant lead contour of said cam is so related to the deceleration of said driven object determined by the parabolic contour as to govern the adjustment of said velocity controlling element for decelerating said movable object from its predetermined maximum rate of acceleration into correspondence with the position order signal without appreciable overshoot.

18. In a control system for a movable ordnance piece having means for supplying train and elevation position order signals, a servo positioning system for controlling said movable ordnance piece for movement in train and elevation into correspondence with said train and elevation position order signals, comprising train and elevation variable speed hydraulic transmissions for driving said ordnance piece, each transmission including a tilting plate for controlling its output velocity, means for determining the azimuth velocity and position of said ordnance piece at any given time, means responsive to a function of the error between the azimuth position of said ordnance piece as indicated by said train position determining means and the azimuth represented by the train order signal for positioning the tilting plate of the train hydraulic transmission, means for determining the elevation velocity and position of said ordnance piece at any given time, means responsive to a function of the error between the elevation of said ordnance piece as indicated by said elevation determining means and the elevation represented by the elevation order signal for positioning the tilting plate of the elevation hydraulic transmission, means responsive to the position and velocity of said ordnance piece in train for displacing said train tilting plate toward its neutral position at substantially a constant rate to arrest training of said ordnance piece into an interference zone, means responsive to incipient training of said ordnance piece into an interference zone for displacing the tilting plate of said elevation hydraulic transmission to accelerate said ordnance piece upwardly, means for rendering said last named means ineffective when said ordnance piece has been elevated to the top of the interference zone whereupon the tilting plate of said hydraulic transmission is positioned by said last named means responsive to a function of the training error, means responsive to the velocity of said ordnance piece in elevation and to the difference between its elevation and the elevation of the interference zone for displacing said tilting plate of the elevation transmission in the opposite sense to arrest elevation of said ordnance piece at the top of the interference zone so long as the elevation order signal requires entry into the interference zone.

19. In a control system for a movable object having means for supplying a position order signal, a servo control system for controlling said movable object for movement into correspondence with said position order signal, comprising an hydraulic transmission including a variable stroke pump having a stroke control element and an hydraulic motor supplied by said pump to drive said object at a velocity controlled by the position of said control element, piston means responsive to a flow of pressure fluid for displacing said control element from its neutral position, a servo valve and valve sleeve therefor for controlling the flow of pressure fluid applied to said piston means in accordance with their relative displacement, a pilot valve and valve sleeve for hydraulically stroking said servo valve sleeve in accordance with their relative displacement, means for coupling said servo valve with said control element, link means for coupling said valve sleeves, means for determining the velocity and position of said object at any given time, cam means responsive to a difference between the position of said movable object as indicated by said position determining means and the position order signal for stroking said pilot valve, and means responsive to an integral function of said lack of correspondence and coupled by said link means with said valve sleeves for modifying the displacement of said control element to prevent hunting.

20. In a control system, as defined in claim 19, wherein said means for modifying the position of said control element includes an integrating piston coupled with said link means and a valve stroked by said pilot valve sleeve for controlling the rate at which pressure fluid is supplied to said integrating piston means.

21. In a control system for a driven object having means for supplying a position order signal, a servo control system for controlling said driven object for movement into correspondence with said position order signal, comprising an hydraulic transmission including a variable stroke pump having a stroke control element and an hydraulic motor supplied by said pump to drive said object at a velocity controlled by the displacement of said control element, a piston, means for determining the velocity and position of said object at any given time, means responsive to the error between the position of the driven object and the position order signal for hydraulically stroking said piston for positional correspondence with said error, first and second valves hydraulically coupled together for controlling the pressure of fluid applied to said piston, said second valve being displaced by a departure of the pressure applied to said piston from a predetermined value for hydraulically displacing said first valve an amount corresponding to the rate of displacement of said piston, whereby said first valve is stroked in accordance with the first time derivative of said error, said second valve being displaced an amount corresponding to the rate of displacement of said first valve and representing the second time derivative of said error, and means including cam means responsive to the displacement of said piston and of said first and second valves for positioning said control element in correspondence with a combination of said displacements.

22. In a control system, as defined in claim 21, including an integration control valve stroked in response to a combination of the displacements of said piston and said first and second valves, an integrating piston supplied with pressure fluid controlled by said integrating valve for modifying the positioning of said control element in accordance with an integral function of the error and its first and second time derivatives, and means responsive to a displacement of said first valve beyond a predetermined amount for decoupling said integrating piston from said integrating valve, whereby the position of said control element is no longer modified by said integrating piston.

23. In a control system for a movable object having means for supplying a position order signal, a servo control system for controlling said movable object for movement into correspondence with said position order signal, comprising an hydraulic transmission including a variable stroke pump having a stroke control element and an hydraulic motor supplied by said pump to drive said object to a velocity controlled by the position of said control element, a link, means for determining the velocity and position of said object at any given time, means responsive to the difference between the position of said driven object as indicated by said position determining means and the position order signal for displacing said link at one point therealong, means responsive to displacement of said point for producing a signal which varies as the time integral of such displacement, means including a filter responsive to a time derivative version of the position order signal for combining a low frequency component of said derivative version degeneratively with said integral signal to produce a compensating signal, means responsive to said compensating signal for correspondingly displacing said link at another point therealong, and means responsive to the combined displacements of said link for correspondingly positioning said control element to control the velocity at which said object is driven.

24. In a control system, as defined in claim 23, wherein said combining means introduces an amount of said derivative version of the position order signal selectively to reduce the overall response of the control system to components of the position order signal in a given frequency band.

25. In a control system, as defined in claim 24, including means responsive to the velocity of the driven object for generating a velocity feedback signal, one of said link displacing means being responsive to said velocity feedback signal to modify the displacement of the corresponding point along said link to reduce dynamic errors in the positioning of said driven object.

26. In a control system for a driven object having means for supplying a position order signal, a servo control system for controlling said driven object for movement into correspondence with said position order signal, comprising an hydraulic transmission including a variable stroke pump having a stroke control element and an hydraulic motor supplied by said pump to drive said object at a velocity controlled by the displacement of said control element from its neutral position, a link, means for determining the velocity and position of said object at any given time, means including a piston and a valve for varying the flow of pressure fluid applied to said piston responsive to the error between the position of the driven object and the position order signal for correspondingly displacing said link at one point therealong, an integrating piston, an integrating valve stroked in accordance with the displacement of said one point for producing a corresponding flow of fluid to or from said integrating piston to position the same in accordance with substantially the time integral of displacement of said one point, means responsive to the position of said integrating piston for producing an electrical signal, means for combining said electrical signal with a signal representing the time derivative of the position order signal to produce a compensating signal, servo feedback means including a piston for positioning said link at another point therealong in correspondence with said compensating signal, and means including a valve and valve sleeve, one of which is mechanically connected to said link at a third point therealong and the other of which is mechanically connected to said control element for positioning said control element hydraulically in correspondence with the position of said third point.

27. In a control system for a missile launcher having a missile firing circuit and means for supplying a position order signal, a servo control system for controlling said missile launcher for movement into correspondence with said position order signal, said servo control comprising a hydraulic transmission including a variable stroke pump having a stroke control element and a hydraulic motor supplied by said pump to drive said missile launcher at a velocity controlled by the displacement of said control element from its neutral position, a piston, means for determining the velocity and position of said missile launcher at any given time, means responsive to the error between the position of said missile launcher and the position order signal and including a valve for varying the flow of pressure fluid applied to one face of said piston for positioning said piston in correspondence with said error, means for maintaining the pressure applied to the other face of said piston at a predetermined value including a valve for controlling the regulated pressure, piston means mechanically linked with said controlling valve and responsive to departure of said regulated pressure to its predetermined value, and means responsive to the position of said piston for displacing said control element to control the velocity at which said missile launcher is driven, a pressure responsive firing circuit interrupter and a firing cutout valve and valve sleeve displaced in accordance with the displacement of said piston, and piston means for interrupting said firing circuit by actuating said interrupter upon the occurrence of a predetermined combination of error and its time derivative.

References Cited in the file of this patent

UNITED STATES PATENTS

| | | |
|---|---|---|
| 2,408,068 | Hull et al. | Sept. 24, 1946 |
| 2,536,876 | Dannatt | Jan. 2, 1951 |
| 2,548,884 | Hartman et al. | Apr. 17, 1951 |
| 2,569,571 | Newell et al. | Oct. 2, 1951 |
| 2,578,666 | Borden | Dec. 18, 1951 |
| 2,586,990 | Poitras et al. | Feb. 26, 1952 |
| 2,704,489 | Hammond et al. | Mar. 22, 1955 |
| 2,826,960 | Schiavi | Mar. 18, 1958 |
| 2,948,193 | Leathers et al. | Aug. 9, 1960 |